(12) United States Patent
Wesson et al.

(10) Patent No.: US 10,178,860 B2
(45) Date of Patent: Jan. 15, 2019

(54) MOSQUITO TRAP

(75) Inventors: Dawn Wesson, New Orleans, LA (US); Charles Apperson, Raleigh, NC (US); Loganathan Ponnusamy, Raleigh, NC (US); Ning Xu, Saskatoon (CA); Coby Schal, Cary, NC (US); Christopher Hoffmann, Portland, OR (US)

(73) Assignees: THE ADMINISTRATORS OF THE TULANE EDUCATIONAL FUND, New Orleans, LA (US); NORTH CAROLINA STATE UNIVERSITY, Raleigh, NC (US)

( * ) Notice: Subject to any disclaimer, the term of this patent is extended or adjusted under 35 U.S.C. 154(b) by 280 days.

(21) Appl. No.: 13/575,242

(22) PCT Filed: Jan. 28, 2011

(86) PCT No.: PCT/US2011/022978
§ 371 (c)(1),
(2), (4) Date: Nov. 26, 2012

(87) PCT Pub. No.: WO2011/094581
PCT Pub. Date: Aug. 4, 2011

(65) Prior Publication Data
US 2013/0067795 A1 Mar. 21, 2013

Related U.S. Application Data

(60) Provisional application No. 61/299,838, filed on Jan. 29, 2010.

(51) Int. Cl.
*A01M 1/00* (2006.01)
*A01M 1/10* (2006.01)
*A01M 1/20* (2006.01)

(52) U.S. Cl.
CPC .............. *A01M 1/106* (2013.01); *A01M 1/20* (2013.01); *A01M 1/2016* (2013.01); *Y02A 50/371* (2018.01)

(58) Field of Classification Search
CPC ....... A01M 1/106; A01M 1/20; A01M 1/2016
(Continued)

(56) References Cited

U.S. PATENT DOCUMENTS 983,977 A * 2/1911 Lilge ............................... 43/122
988,977 A * 4/1911 Lilge ......................... B63C 7/12
114/50

(Continued)

FOREIGN PATENT DOCUMENTS

CN 2904651 5/2007
CN 2917281 7/2007
(Continued)

OTHER PUBLICATIONS

International Search Report and Written Opinion for Application No. PCT/US2011/022978 dated Apr. 7, 2011 (7 pages).
(Continued)

*Primary Examiner* — Thanh Pham
(74) *Attorney, Agent, or Firm* — Michael Best & Friedrich LLP

(57) ABSTRACT

A mosquito trap includes a container having an open end and a composition positioned in the container. The composition comprises at least one active agent. The mosquito trap also includes an enclosure protruding above the open end of the container. The enclosure includes an opening to access an interior of the enclosure and the open end of the container, and at least one active agent.

25 Claims, 26 Drawing Sheets

(58) Field of Classification Search
USPC ........ 43/107, 114, 117, 118, 131, 132.1, 133
See application file for complete search history.

(56) References Cited

U.S. PATENT DOCUMENTS

| | | | | |
|---|---|---|---|---|
| 2,012,384 | A | * | 8/1935 | Gatti ................. A01M 1/02 422/22 |
| 2,569,833 | A | * | 10/1951 | Simpson, Sr. ......... A01K 69/06 43/100 |
| 3,120,075 | A | | 2/1964 | Barnhart, Sr. |
| 3,899,586 | A | | 8/1975 | Okuno et al. |
| 4,086,720 | A | * | 5/1978 | Wiser ................. A01M 1/04 362/802 |
| 4,608,774 | A | * | 9/1986 | Sherman ............... A01M 1/02 43/114 |
| 4,718,193 | A | * | 1/1988 | Rosselli .............. A01M 1/02 43/122 |
| 4,802,303 | A | * | 2/1989 | Floyd, III ............ A01M 1/02 43/114 |
| 4,813,174 | A | * | 3/1989 | Cook .................. A01M 1/02 206/0.5 |
| 5,226,254 | A | * | 7/1993 | MacMenigall .................. 43/107 |
| 5,561,936 | A | * | 10/1996 | Franke ................ A01K 74/00 43/7 |
| 5,749,168 | A | * | 5/1998 | Chrysanthis ................... 43/122 |
| 5,896,697 | A | * | 4/1999 | Kang .................. A01M 1/02 43/107 |
| 5,986,557 | A | | 11/1999 | Perich et al. |
| 5,987,810 | A | * | 11/1999 | Nash .................. A01M 1/2005 43/107 |
| 6,112,452 | A | * | 9/2000 | Campbell .............. A01M 1/02 215/319 |
| 6,158,165 | A | * | 12/2000 | Wilson ................ A01M 1/02 43/100 |
| 6,192,621 | B1 | * | 2/2001 | Fain .................. A01M 1/02 43/131 |
| 6,389,740 | B2 | | 5/2002 | Perich et al. |
| 6,401,384 | B1 | * | 6/2002 | Contadini et al. ........... 43/132.1 |
| 6,524,605 | B1 | * | 2/2003 | Coats ................. A01N 43/16 424/405 |
| 6,532,695 | B1 | * | 3/2003 | Alvarado .............. A01M 1/106 43/107 |
| 6,637,149 | B1 | * | 10/2003 | Bauer ................. A01M 1/02 43/107 |
| 6,898,896 | B1 | * | 5/2005 | McBride .............. A01M 1/023 43/107 |
| 6,910,298 | B2 | * | 6/2005 | Schneidmiller ......... A01M 1/02 43/65 |
| D515,175 | S | * | 2/2006 | Mayo .................. D22/122 |
| 2002/0116864 | A1 | * | 8/2002 | Pace ................... A01M 29/12 43/107 |
| 2003/0003126 | A1 | | 1/2003 | Mount et al. |
| 2003/0217503 | A1 | * | 11/2003 | Robison ............... A01M 1/023 43/114 |
| 2004/0040198 | A1 | * | 3/2004 | Harris et al. .................... 43/107 |
| 2004/0055207 | A1 | * | 3/2004 | Beroza ................ A01M 1/02 43/131 |
| 2004/0128903 | A1 | * | 7/2004 | Wexler ................ A01M 1/106 43/122 |
| 2004/0159040 | A1 | | 8/2004 | Chen |
| 2004/0231229 | A1 | * | 11/2004 | Lenker ................ A01M 1/02 43/107 |
| 2005/0235554 | A1 | * | 10/2005 | Uhl ................... A01M 1/04 43/107 |
| 2005/0238713 | A1 | | 10/2005 | Kollars, Jr. et al. |
| 2005/0274061 | A1 | * | 12/2005 | Zhu ................... A01M 1/02 43/139 |
| 2006/0090391 | A1 | * | 5/2006 | Huang ................. A01M 1/106 43/107 |
| 2006/0137240 | A1 | * | 6/2006 | Dismore ............... A01M 1/10 43/107 |
| 2006/0236591 | A1 | * | 10/2006 | Cwiklinski ........... A01M 1/02 43/107 |
| 2006/0242891 | A1 | * | 11/2006 | Marshall .................... 43/131 |
| 2006/0248782 | A1 | * | 11/2006 | Dancy ................. A01M 1/106 43/107 |
| 2007/0044371 | A1 | * | 3/2007 | Meier et al. .................... 43/107 |
| 2007/0124988 | A1 | | 6/2007 | Spiro et al. |
| 2008/0092433 | A1 | | 4/2008 | Durand et al. |
| 2009/0000183 | A1 | * | 1/2009 | Geier ................. A01M 1/02 43/139 |
| 2009/0126257 | A1 | * | 5/2009 | Banfield ............. A01M 1/106 43/121 |
| 2009/0288334 | A1 | | 11/2009 | Alexander et al. |
| 2010/0154289 | A1 | * | 6/2010 | Fisher ............... A01M 1/02 43/107 |

FOREIGN PATENT DOCUMENTS

| | | |
|---|---|---|
| CN | 200966280 | 10/2007 |
| CN | 201004930 | 1/2008 |
| WO | 2011094581 | 8/2011 |
| WO | 2011094600 | 8/2011 |

OTHER PUBLICATIONS

International Search Report and Written Opinion for Application No. PCT/US2011/023006 dated Apr. 12, 2011 (6 pages).

* cited by examiner

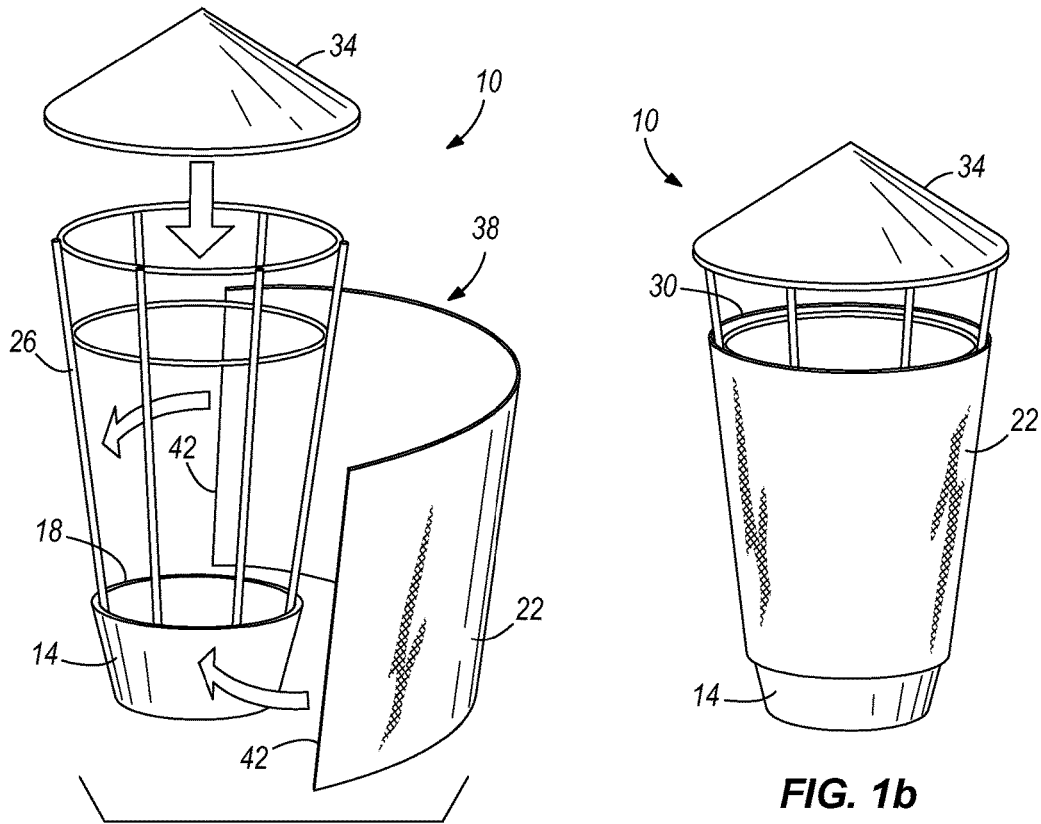
FIG. 1a
FIG. 1b
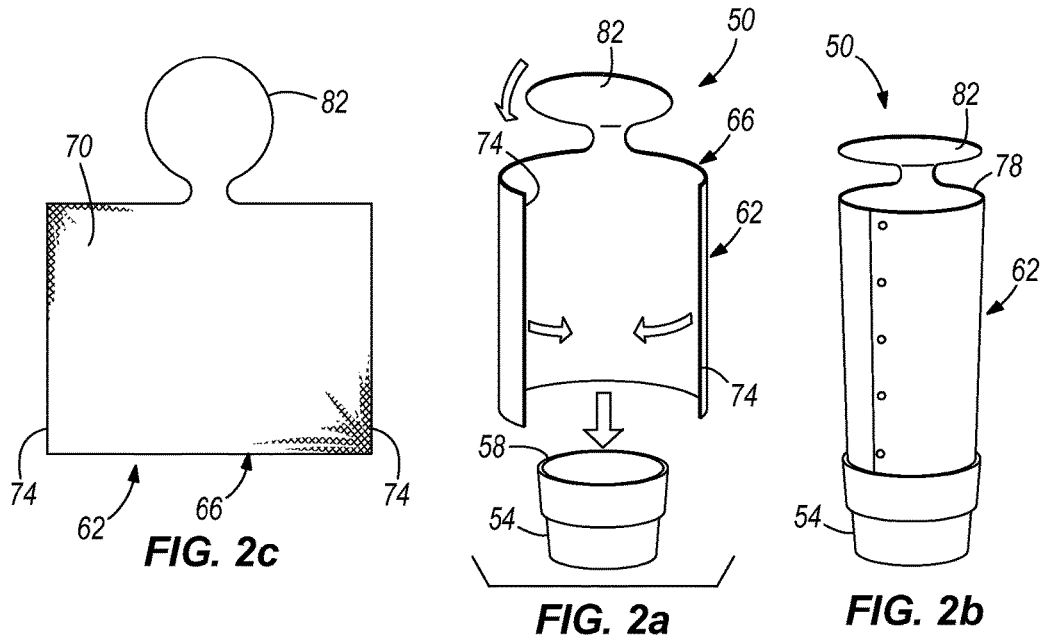
FIG. 2c
FIG. 2a
FIG. 2b

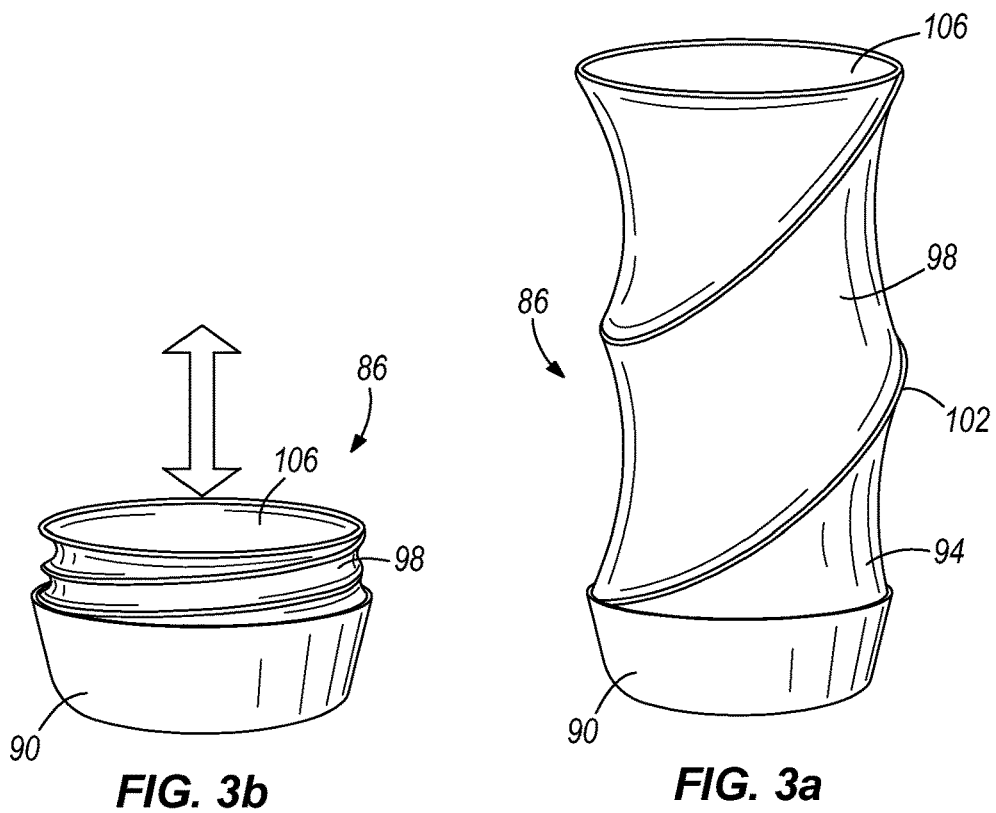
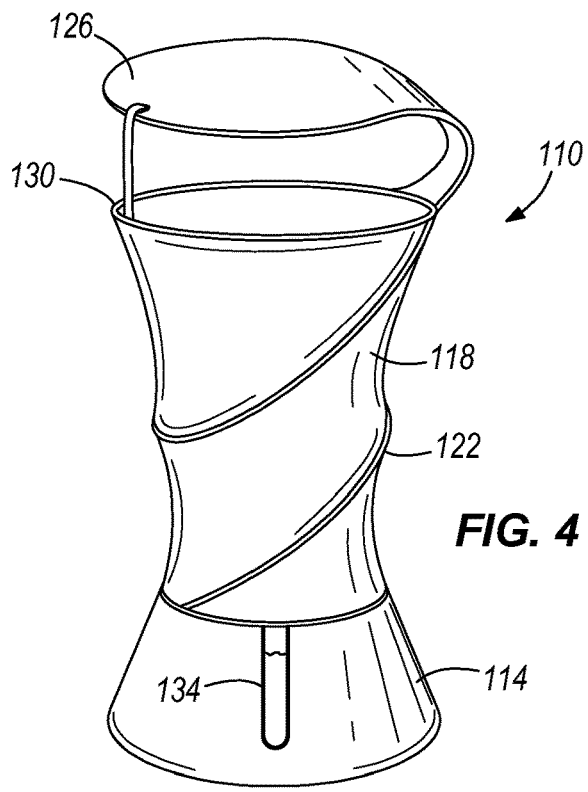

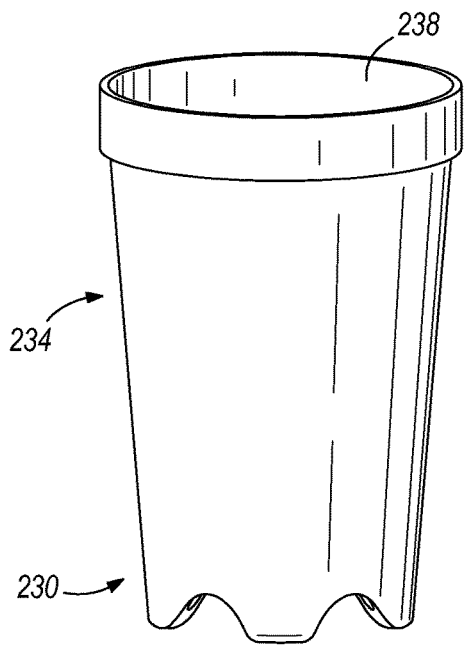 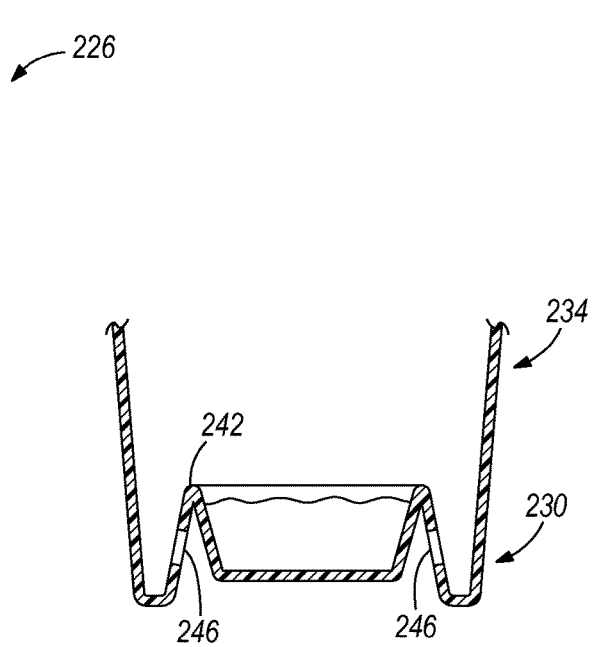
FIG. 9a  FIG. 9b
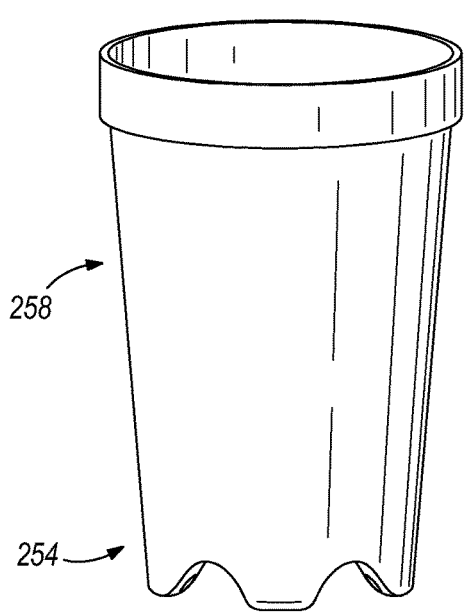 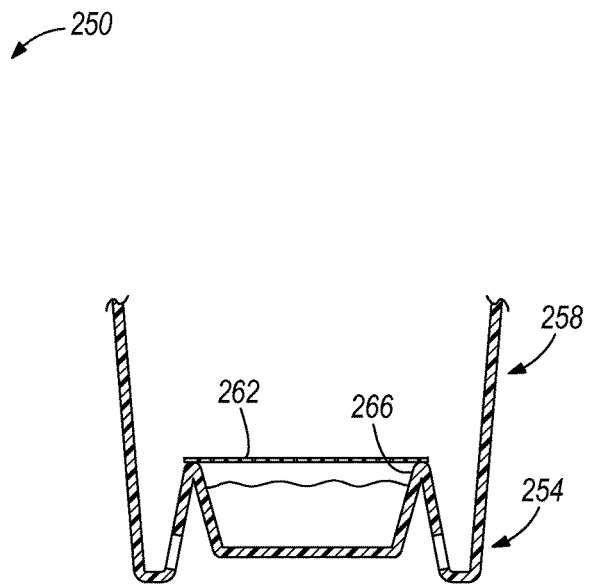
FIG. 10a  FIG. 10b

MOSQUITO TRAP

CROSS-REFERENCE TO RELATED APPLICATIONS

This application is a national stage entry under 35 U.S.C. § 371 of International Patent Application No. PCT/US2011/022978 filed Jan. 28, 2011, which claims priority to U.S. Provisional Patent Application No. 61/299,838 filed Jan. 29, 2010, the entire contents of both of which are incorporated herein by reference.

FIELD OF THE INVENTION

The present invention relates to traps, and more particularly to mosquito traps.

BACKGROUND OF THE INVENTION

Mosquito traps of many different designs exist in the marketplace. Large-scale traps designed to kill large numbers of mosquitoes, however, are often expensive and rely upon an energy source (e.g., electricity, propane) for their operation. Consequently, such traps are not feasible for use in poverty-stricken areas or remote areas where electricity or propane is not readily available.

SUMMARY OF THE INVENTION

The present invention provides, in one aspect, a mosquito trap including a container having an open end and a composition positioned in the container. The composition may comprise at least one active agent. The mosquito trap also includes an enclosure protruding above the open end of the container. The enclosure includes an opening to access an interior of the enclosure and the open end of the container, and at least one active agent.

The enclosure may be made from one of a flexible textile and a semi-rigid, pressed material. The textile may include one of hemp, ramie, cotton, and bamboo. The semi-rigid, pressed material may include one of paperboard, palm fiberboard, hemp board, ligne board, and biofoam.

The container may be made from one of a semi-rigid, pressed material and a rigid, molded material. The rigid, molded material may include one of a wood-filled plastic, cellulose, bio-HDPE, a plant-based resin, a polyactide, and a starch-based resin.

The mosquito trap may also include a frame coupled to the container. The enclosure may be at least partially supported by the frame.

The opening may be defined along a top edge of the enclosure. The mosquito trap may also include a cover at least partially positioned above the opening and spaced from the opening so as to not close the opening. The cover may be integrally formed with the enclosure as a single piece. The mosquito trap may further include a frame coupled to at least one of the container and the enclosure. The cover may be at least partially supported by the frame.

The enclosure may be made of a flexible material. The mosquito trap may also include a frame attached to the enclosure to shape the enclosure. The enclosure and the frame may be collapsible.

The enclosure may be made of a resilient material and be collapsible.

The container may include at least one opening positioned beneath the open end of the container. The opening may be configured to limit the amount of liquid that can be held by the container.

The mosquito trap may also include an absorbent structure positioned in the open end of the container. At least a portion of the absorbent structure may be immersed in a solution containing the at least one active agent when a liquid solvent is added to the composition in the container. The absorbent structure may be configured to wick the active agent solution from beneath the open end of the container toward the open end of the container.

At least a portion of the enclosure may be immersed in a solution containing the at least one active agent when a liquid solvent is added to the composition in the container. The enclosure may be configured to wick the active agent solution from beneath the open end of the container toward the open end of the container. The enclosure may be configured to wick the active agent solution from beneath the open end of the container above the open end of the container.

The container and the enclosure may be integrally formed as a single piece.

The mosquito trap may also include a screen at least partially positioned above the open end of the container. The screen may include at least one of an adhesive and an attractant.

Portions of the container and the enclosure may include complementary shapes to facilitate nesting of the enclosure within the container.

A solution including the at least one active agent may be created in the container upon adding a liquid solvent to the composition in the container. At least a portion of the container may be translucent to facilitate viewing the active agent solution. The entire container may be made of a translucent material.

The enclosure may include a substantially cylindrical shape.

The enclosure may include a substantially conical shape.

The container may be suspended relative to a horizontal support surface by the enclosure. The mosquito trap may also include a frame coupled to the enclosure and configured to suspend the enclosure and the container relative to the horizontal support surface. The frame may be coupled to a vertical support surface protruding from the horizontal support surface. The frame may alternatively be supported by the horizontal support surface. The mosquito trap may further include a cover coupled to at least one of the enclosure and the frame. The cover may be at least partially positioned above the opening and spaced from the opening so as to not close the opening.

The mosquito trap may also include a removable cover closing the open end of the container to inhibit access to an interior of the container and the material in the container.

The mosquito trap may also include a base supporting the container relative to a horizontal support surface. The base may include one of a recess and an aperture in which the container is at least partially positioned. The enclosure may be supported by the base relative to the horizontal support surface.

The mosquito trap may also include a cover integrally formed as a single piece with the container. The cover may be at least partially positioned above the open end of the container and spaced from the open end so as to not close the open end. The cover may be foldable.

The container and the enclosure may be separately supportable by a common horizontal support surface. The container may be surrounded by the enclosure.

The mosquito trap may also include an indicator coupled to the container. A solution including the at least one active agent is created in the container upon adding a liquid solvent to the composition in the container, and the indicator is at least partially immersed in the active agent solution and configured to visibly change in response to a change in efficacy of the active agent solution.

The mosquito trap may also include an indicator coupled to the enclosure. The indicator may be configured to visibly change in response to a change in efficacy of the active agent on the enclosure.

The mosquito trap may also include an expiration label coupled to at least one of the container and the enclosure.

The mosquito trap may also include a base supporting the container relative to a horizontal support surface and at least one anchor configured to secure the base to the horizontal support surface. The at least one anchor may include a plurality of stakes.

The composition positioned in the container may be liquid-soluble.

The at least one active agent in the composition and the enclosure may be a toxic agent. The toxic agent may be an insecticide.

The at least one active agent in the composition and the enclosure may be an attractant. The attractant may be a mosquito attractant.

The present invention provides, in another aspect, a method of assembling a mosquito trap. The method includes providing a container having an open end and a cover closing the open end, and removing the cover to expose the open end and access a composition positioned in the container. The composition may comprise at least one active agent. The method also includes surrounding at least a portion of the open end of the container with an enclosure. The enclosure includes an opening to access an interior of the enclosure and the open end of the container, and at least one active agent.

The enclosure may be initially formed as a flat sheet having opposite edges. The method may further include rolling the flat sheet into at least one of a cylindrical shape and a conical shape, and interconnecting the opposite edges of the sheet.

The method may further include adding a liquid solvent to the container, thereby creating a solution including the at least one active agent in the container. Adding the liquid solvent includes adding water.

The cover is a first cover. The method may further include positioning a second cover above the open end of the container and spaced from the open end so as to not close the open end.

The method may further include coating the enclosure with an additional amount of the at least one active agent.

Other features and aspects of the invention will become apparent by consideration of the following detailed description and accompanying drawings.

BRIEF DESCRIPTION OF THE DRAWINGS

FIG. 1a illustrates an exploded view of a mosquito trap according to a first embodiment of the invention.

FIG. 1b illustrates an assembled view of the mosquito trap of FIG. 1a.

FIG. 2a illustrates an exploded view of a mosquito trap according to a second embodiment of the invention.

FIG. 2b illustrates an assembled view of the mosquito trap of FIG. 2a.

FIG. 2c illustrates a portion of the mosquito trap of FIG. 2a.

FIGS. 3a and 3b illustrate a mosquito trap according to a third embodiment of the invention.

FIG. 4 illustrates a mosquito trap according to a fourth embodiment of the invention.

FIG. 7b illustrates a cross-sectional view of the mosquito trap of FIG. 7a.

FIG. 8b illustrates a cross-sectional view of the mosquito trap of FIG. 8a

FIG. 8c illustrates a cross-sectional view of an alternative construction of the mosquito trap of FIG. 8a.

FIG. 9a illustrates a perspective view of a mosquito trap according to a ninth embodiment of the invention.

FIG. 9b illustrates a partial cross-sectional view of the mosquito trap of FIG. 9a.

FIG. 10a illustrates a perspective view of a mosquito trap according to a tenth embodiment of the invention.

FIG. 10b illustrates a partial cross-sectional view of the mosquito trap of FIG. 10a.

FIG. 13a illustrates a perspective view of a mosquito trap according to a thirteenth embodiment of the invention.

FIG. 13b illustrates a cross-sectional view of the mosquito trap of FIG. 13a.

FIG. 14a illustrates a perspective view of a mosquito trap according to a fourteenth embodiment of the invention.

FIG. 14b illustrates a partial cross-sectional view of the mosquito trap of FIG. 14a.

FIGS. 16b and 16c illustrate a portion of the mosquito trap of FIG. 16a.

FIG. 18b illustrates an assembled view of the mosquito trap of FIG. 18a.

FIG. 19b illustrates an exploded view of the mosquito trap of FIG. 19a.

FIG. 19c illustrates a container including at least one of a toxic agent and an attractant for use with the mosquito trap of FIG. 19a.

DETAILED DESCRIPTION

Figures 5A, 5B:
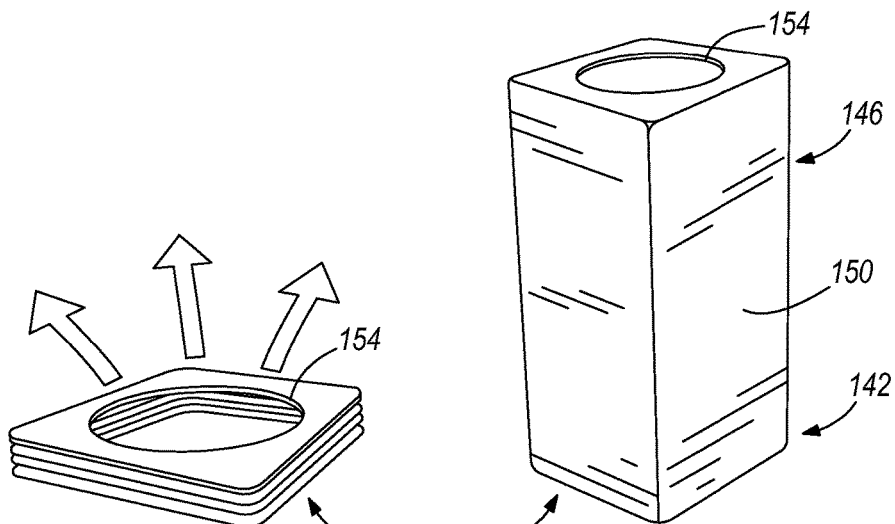
FIGS. 5a and 5b illustrate a mosquito trap according to a fifth embodiment of the invention.

"Mosquito" as used herein encompasses several species of mosquitos (e.g., *Anopheles*, *Aedes*, *Ochlerotatus*, and *Culex*), including but not limited to *Aedes aegypti*, *Aedes albopictus*, *Aedes sierrensis*, *Anopheles quadrimaculatus*, *Culex pipiens*, *Culex quinquefasciatus*, *Ochlerotatus triseriatus*, *Anopheles gambiae*, *Anopheles funestus*, *Anopheles albimanus*, and *Culex tarsalis*. Such mosquitos are gravid or egg-laying mosquitoes; however, other mosquito species are also contemplated. Mosquitoes may include, but are not limited to, gravid mosquitoes, male mosquitoes, and host-seeking female mosquitoes.

FIGS. 1a and 1b illustrate a mosquito trap 10 according to a first embodiment of the invention. The mosquito trap 10 includes a container 14 having an open end 18 and an enclosure 22 protruding above the open end 18 of the container 14. The mosquito trap 10 also includes a frame 26 coupled to the container 14 around which the enclosure 22 is wrapped, thereby providing support to the enclosure 22 and defining the shape of the enclosure 22. In the illustrated construction of the mosquito trap 10, the frame 26 is arranged in a substantially conical manner to impart a substantially conical shape to the enclosure 22. Alternatively, the frame 26 may be arranged in a substantially cylindrical manner to impart a substantially cylindrical shape to the enclosure 22.

With continued reference to FIG. 1b, the enclosure 22 does not entirely surround the frame 26. Rather, a top edge of the enclosure 22 defines an opening 30 that allows access into the interior of the enclosure 22 and the open end 18 of the container 14. Alternatively, the top end of the enclosure 22 may be closed, and the opening may be positioned between the top end and the bottom end of the enclosure 22. Such an alternative construction may be employed with any of the mosquito trap enclosures discussed herein. The mosquito trap 10 further includes a cover 34 at least partially positioned above the opening 30 and spaced from the opening 30 so as to not close the opening 30. In the illustrated construction of the mosquito trap 10, the cover 34 includes a substantially conical shape configured to deflect rain or any other falling liquid away from the opening 30 in the enclosure 22 to substantially prevent additional water or other liquid from accumulating in the container 14. Alternatively, the cover 34 may be configured in any of a number of different shapes to provide a similar function. Although not shown in FIG. 1a or 1b, the container 14 may also include one or more apertures 334 (see, for example, the apertures in FIGS. 13a and 13b) positioned beneath the open end 18 of the container 14 to provide an overflow drain, thereby effectively limiting the amount of water or other liquid that may be accumulated within the container 14.

With reference to FIGS. 1a and 1b, the container 14, the frame 26, and the cover 34 may be made from any of a number of different materials. For example, the container 14, the frame 26, and the cover 34 may be made from a semi-rigid, pressed material (e.g., paperboard, palm fiberboard, hemp board, ligne board, or biofoam). Such semi-rigid, pressed materials are lightweight and can be covered with a water-resistant coating to improve the durability of the mosquito trap 10 when situated in the outdoors. The container 14, the frame 26, and the cover 34 may alternatively be made from a rigid, molded material (e.g., a wood-filled plastic, cellulose, bio-HDPE, a plant-based resin, a polyactide, or a starch-based resin). Such rigid, molded materials are typically injection movable and may be processed using the same equipment as plastics.

In the illustrated construction of the mosquito trap 10, the enclosure 22 is made from a flexible textile (e.g., hemp, ramie, cotton, or bamboo) to facilitate wrapping the enclosure 22 around the frame 26. As is used herein, the term "textile" is not intended to be associated with any particular method of manufacture (e.g., knitting, weaving, crocheting, knotting, or pressing fibers together). Also, the term "textile" is intended to include flexible cloths and fabrics. As shown in FIG. 1a, the enclosure 22 is initially provided as a flat sheet 38 of flexible textile having opposite edges 42 that are interconnected or overlaid while attaching the sheet 38 to the frame 26. The opposite edges 42 of the sheet 38 may be secured to each other or interior portions of the sheet 38 using any of a number of different fasteners (e.g., screws, hook and eyelets, hook-and-loop fasteners, or snaps) or materials (e.g., adhesives) to maintain the enclosure 22 taught against the frame 26. Alternatively, the textile sheet 38 may be wrapped around a reusable wire infrastructure to impart a shape to the textile sheet 38. As a further alternative, the enclosure 22 may be made of a semi-rigid, pressed material such as any of those discussed above.

The enclosure 22 also includes at least one active agent to facilitate attracting mosquitoes to the trap 10, killing them, or a combination thereof. Alternatively, the trap 10 would also be useful if it only attracted mosquitoes to the trap 10 and caused them to lay their eggs in the trap 10. Accordingly, the trap 10 (and any of the traps disclosed herein) may be employed to attract mosquitoes to the trap and killing and/or stimulating oviposition. The active agent may be either impregnated in the material used in making the enclosure 22, or the active agent may be applied to the enclosure 22 as a coating. In either case, additional active agents may be applied to the enclosure 22 in the form of a spray coating from a spray can (see, for example, FIG. 21). Alternatively, additional active agents may be applied to the enclosure 22 in liquid form using a brush.

The mosquito trap 10 also includes a composition comprising the at least one active agent, positioned in the container 14. Although not shown, a removable cover 542 (see, for example, the cover in FIG. 19c) may be employed to seal the open end 18 of the container 14 prior to assembly of the mosquito trap 10. As such, the active agent composition may be provided with the mosquito trap 10 as a kit. Alternatively, refills of the active agent composition may be provided separately from the mosquito trap 10. As is discussed in more detail below, the composition in the container 14 may take the form including but not limited to a plurality of beads, pellets, or solution. The composition may be soluble in a liquid solvent such as water. In certain embodiments, water may be an attractant itself, an egg laying medium, a carrier for at least one active agent, a solvent, or a combination thereof. Alternatively, the composition in the container 14 may not require a liquid solvent for use.

"Active agent" refers to a toxic agent, attractant, or a combination thereof. Descriptions of such toxic agents and/or attractants may be found in U.S. Patent Application Publication No. 2010/0029486, and U.S. Patent Application Publication No. 2010/0192451, both of which are incorporated herein by reference.

Toxic agents may include, but are not limited to, pesticides, insecticides, larvacides, ovicides, adulticides, nematicides, acaricides, bactericides, miticides, algicides, germicides, repellents, nutrients, and combinations thereof specific examples of insecticides include, but are not limited to, a botanical, a carbamate, a microbial, a dithiocarbamate, an imidazolinone, an organophosphate, an organochlorine, a benzoylurea, an oxadiazine, a spinosyn, a triazine, a carboxamide, a tetronic acid derivative, a triazolinone, a neonicotinoid, a pyrethroid including pyrethoid esters such as deltamethrin, a pyrethrin, and a combination thereof. Specific examples of acaricides or miticides include, without limitation, rosemary oil, thymol, spirodiclogen, cyflumetofen, pyridaben, diafenthiuron, etoxazole, spirodiclofen, acequinocyl, bifenazate, and a combination thereof. One example of such a toxic agent is spinosad. Another example of such a toxic agent is commercially available under the trade name NATULAR from Clarke Products of Roselle, Ill.

Although referred to herein as "attractants," the compositions or compounds may or may not function as classical attractants, i.e., compositions that attract mosquitoes to a site. In fact, without being limited as to theory, it is believed that the compositions or compounds may serve as arrestants that cause mosquitoes to stay at a site longer and/or as stimulants that cause mosquitoes to oviposition, i.e., lay eggs, or to lay more eggs than normal at a single site.

Attractants may include, but are not limited to, an attractant bacteria, bacterial culture thereof, or attractant compound. A bacterial culture may include a bacterial cell or bacterial culture. Optionally, the attractant compound may be comprised within the bacterial culture. In some embodiments, the bacteria may be isolated bacteria.

The bacteria may include *Bacillus thuringiensis*, *Enterobacter asburiae*, *Enterobacter cancerogenus*, *Pseudomonas fulva*, *Lactococcus lactis*, *Enterobacter gergoviae*, *Enterobacter ludwigii*, *Klebsiella oxytoca*, *Klebsiella granulomatis*, *Pseudomonas plecoglossicida*, *Rhizobium huautlense*, *Shigella dysenteriae*, *Citrobacter freundii*, *Brevundimonas vesicularis*, *Porphyrobacter* sp., *Variovorax koreensis*, *Agrobacterium tumefaciens*, *Rhizobium huautlense*, *Acidiphilium rubrum*, *Acidovorax avenae*, *Pseudomonas lanceolata*, *Variovorax koreensis*, *Klebsiella granulomatis*, *Pseudomonas syringae*, *Curvibacter gracilis*, *Caulobacter fusiformis*, *Sphingomonas aromaticivorans*, *Brevibacillus brevis*, *Bacillus thuringiensis*, *Baccillus* sp., *Lactococcus lactis*, *Enterobacteraceae* sp., *Enterobacter* sp., *Pseudomonas*, *Roseomonas*, *Sphingomonas*, *Porphyrobacter*, *Sphingobium*, *Acidovorax*, *Variovorax* sp., *Hydrogenophaga* sp., *Flavobacterium* sp., and *Azorhizobium caulinodans*, or a bacterial culture supernatant thereof. In some embodiments, the attractant comprises *Bacillus thuringiensis* or a bacterial culture thereof. In some embodiments, the composition comprises *Lactococcus lactis* or a bacterial culture thereof. In some embodiments, the composition comprises *Klebsiella oxytoca* or a bacterial culture thereof. In some embodiments, the composition comprises *Shigella dysenteriae* or a bacterial culture thereof. In some embodiments, the composition comprises *Brevundimonas vesicularis* or a bacterial culture thereof. The attractants may include a single bacterial species (e.g., any one of *Bacillus thuringiensis*, *Lactococcus lactis*, *Klebsiella oxytoca*, *Shigella dysenteriae*, or *Brevundimonas vesicularis*), or a plurality of these bacterial species (e.g., two, three, four, or five or more species), in any of the possible combinations. The attractants may comprise the plurality of bacterial species as a blend.

When bacterial cultures are used, they can be unpurified or purified or partially purified from bacterial culture. When the bacterial cultures are purified or partially purified, they suitably contain active fractions (e.g., bacteria-associated carboxylic acids and/or methyl esters that function as attractants and/or stimulate oviposition). These and other attractant compounds may be identified from bacteria. Attractant compounds can be produced by any suitable means (e.g., produced by bacterial fermentation, synthesized, or purchased from a source).

Attractant compounds may be selected from carboxylic acids and esters. For example, attractant compounds may include, but are not limited to, nonanoic acid, decanoic acid, dodecanoic acid, tetradecanoic acid, tetradecanoic acid methyl ester, hexadecanoic acid, hexadecanoic acid methyl ester, or octadecanoic acid, or a combination thereof. Suitably, attractant compounds may be selected from nonanoic acid, tetradecanoic acid, and methyl tetradecanoate, and any combination of two or three thereof. Attractant compounds may be present in a blend. For example, attractant compounds may comprise a blend of nonanoic acid, tetradecanoic acid, and methyl tetradecanoic acid in a weight ratio of about 16:83:1, respectively. As one of skill in the art will appreciate, the compositions may also include other ratios of nonanoic acid, tetradecanoic acid, and methyl tetradecanoic acid. Using more than one compound may extend the range of effective dosages and/or may reduce the amount of total attractant or of a specific attractant effective to attract mosquitoes, arrest mosquitoes, or stimulate ovipositioning, or a combination thereof.

Attractants suitably may include a bacterium capable of producing nonanoic acid, tetradecanoic acid, or methyl tetradecanoate; *Bacillus thuringiensis; Lactococcus lactis; Klebsiella oxytoca; Shigella dysenteriae; Brevundimonas vesicularis*; a culture of any of the aforementioned bacteria; nonanoic acid; tetradecanoic acid; or methyl tetradecanoate, or any combination thereof.

In some embodiments, the trap 10 may comprise an additional component including, but not limited to, a classical attractant, a toxicant, or mosquito growth regulators (e.g., growth inhibitors). It is specifically envisioned that growth regulators may be horizontally transferred to mosquito eggs or larvae at other locales, e.g., by transfer to adjacent water containers through skip-oviposition.

The composition containing the active agent may be provided in a concentrated form (i.e., in a form that requires dilution prior to use or which is diluted upon delivery to the site of use) or in a dilute form that is suitable for use in the methods without dilution. The composition may comprise an effective amount of the active agent. As used herein, "effective amount" means a quantity of an active agent sufficient enough to provide a significant modification at an application site. For example, an effective amount of a toxic agent may mean a quantity of a compound sufficient enough to provide a significant elimination of pests, such as mosquitoes, at an application site. An effective amount of an attractant may mean an amount effective to increase the number of mosquitoes at a target, the time a mosquito stays at a target, and/or to increase the number of mosquito eggs laid at a target, relative to a control, wherein suitable controls include similar untreated sites, mock treated sites, e.g., sites treated with water or a carrier that does not contain an attractant.

The composition comprising the active agent may further comprise a carrier. As used herein, a carrier may comprise a solid, liquid, or gas, or combination thereof. For example, suitable carriers may include, but are not limited to, water, media, glycerol, liquid solvent such as water, or other solution, plasters, biodegradable polymers, talcs, attapulgites, diatomites, fullers earth, montmorillonites, vermiculites, synthetics (such as Hi-Sil or Cab-O-Sil), aluminum silicates, apatites, bentonites, limestones, calcium sulfate, kaolinities, micas, perlites, pyrophyllites, silica, tripolites, and botanicals (such as corn cob grits or soybean flour), and variations thereof. The solid support or carrier can be a macromer, including, but not limited to, ethylenically unsaturated derivatives of poly(ethylene oxide) (PEG) (e.g., PEG tetraacrylate), polyethylene glycol (PEG), polyvinyl alcohol (PVA), poly(vinylpyrrolidone) (PVP), poly(ethyloxazoline) (PEOX), poly(amino acids), polysaccharides, proteins, and combinations thereof. Polysaccharide solid supports include, but are not limited to, alginate, hyaluronic acid, chondroitin sulfate, dextran, dextran sulfate, heparin, heparin sulfate, heparin sulfate, chitosan, gellan gum, xanthan gum, guar gum, water soluble cellulose derivatives, carrageenan, and combinations thereof protein solid supports include, but are not limited to, gelatin, collagen, albumin, and combinations thereof. The compositions comprising toxic agent and/or attractant may be in any suitable form, including but not limited to liquid, gas, or solid forms or shapes known in the art such as pellets, particles, beads, tablets, sticks, pucks, briquettes, pellets, beads, spheres, granules, micro-granules, extrudates, cylinders, ingot, and the like. In some embodiments, live bacteria or bacterial cultures of the one or more bacteria are mixed with a macromer solution (e.g. a polysaccharide salt such as sodium alginate or calcium alginate) and the macromer solution deposited as drops or droplets into a (preferably sterile) salt solution (e.g., $CaCl_2$) to form beads. Compounds such as crystal cellulose may be added to the alginate solution to provide additional solid support. In certain embodiments, at least one active agent may be incorporated into a composition with a solid carrier, and upon contact with a solvent such as water, the active agent may be made accessible to the solvent environment while the carrier may be insoluble. A variety of techniques are known for suspending or combining live cells with solid supports, including, but not limited to, those described in U.S. Pat. Nos. 7,413,781; 6,783,964; 6,248,321; 5,858,746; 5,795,570; 5,705,270; 5,334,640; and variations thereof where compounds or supernatants/fermentation products are utilized rather than cells, the compounds can be combined with any suitable support, as described in U.S. Pat. Nos. 7,117,632; 6,800,279; 6,593,299; 4,844,892; and variations thereof. In some embodiments, the composition may be provided in a quick-release composition, an extended release composition, or a combination thereof.

To assemble the mosquito trap 10 of FIGS. 1a and 1b in which the container 14, the frame 26, and the cover 34 are preassembled, one need only to remove the cover closing the open end 18 of the container 14 and add a liquid solvent (e.g., water to the pellets in the container 14) to create a solution containing the active agent. The textile sheet 38 can then be wrapped around the frame 26 to form the enclosure 22. Alternatively, the frame 26 and/or the cover 34 may be provided as separate components requiring individual assembly.

While in use, the mosquito trap 10 may be positioned in an area having a relatively large mosquito population that needs to be reduced. The attractant in the enclosure 22 and/or the container 14 draws mosquitoes to the trap 10, where they may access the toxic composition in the container 14 via the opening 30 in the enclosure 22. Any mosquitoes that land on the enclosure 22 and/or enter the enclosure 22 will also absorb the toxic agent. The toxic agent in either the container 14 or the enclosure 22 has a sufficient potency to kill the mosquitoes when ingesting, contacting, or otherwise absorbing the toxic agent.

FIGS. 2a and 2b illustrate a mosquito trap 50 according to a second embodiment of the invention. The mosquito trap 50 includes a container 54 having an open end 58 and an enclosure 62 protruding above the open end 58 of the container 54. Unlike the mosquito trap 10 in FIGS. 1a and 1b, the mosquito trap 50 of FIGS. 2a and 2b does not include a separate frame coupled to the container 54 around which the enclosure 62 is wrapped. Rather, the enclosure 62 is sufficiently rigid to maintain its shape once assembled. The enclosure 62 is made from a flexible textile sheet 66 (e.g., hemp, ramie, cotton, or bamboo) wrapped around a reusable wire infrastructure 70 to impart a shape to the textile sheet 66. As shown in FIG. 2c, the enclosure 62 is initially provided as the flat sheet 66 of flexible textile having opposite edges 74 that are interconnected or overlaid each other while forming the enclosure 62. The opposite edges 74 of the sheet 66 may be secured to each other or interior portions of the sheet 66 using any of a number of different fasteners (e.g., screws, hook and eyelets, hook-and-loop fasteners, or snaps) or materials (e.g., adhesives). Alternatively, the enclosure 62 may be made of a semi-rigid, pressed material such as any of those discussed above.

With reference to FIG. 2b, a top edge of the enclosure 62 defines an opening 78 which allows access into the interior of the enclosure 62 and the open end 58 of the container 54. The mosquito trap 50 further includes a cover 82, integrally formed as a single piece with the enclosure 62, at least partially positioned above the opening 78 and spaced from the opening 78 so as to not close the opening 78. The cover 82 is configured to deflect rain or any other falling liquid away from the opening 78 in the enclosure 62 to substantially prevent additional water or other liquid from accumulating in the container 54. Although not shown in FIG. 2a or 2b, the container 54 may also include one or more apertures (see, for example, the apertures in FIGS. 13a and 13b) positioned beneath the open end 58 of the container 54 to provide an overflow drain, thereby effectively limiting the amount of water or other liquid that may be accumulated within the container 54.

The enclosure 62 also includes at least one active agent to facilitate attracting mosquitoes to the trap 50, killing them, or a combination thereof. The active agent may be either impregnated in the material used in making the enclosure 62, or the active agent may be applied to the enclosure 62 as a coating. The active agent includes those discussed above with respect to the mosquito trap 10 of FIGS. 1a and 1b.

The mosquito trap 50 also includes a composition comprising at least one active agent that is positioned in the container 54. Although not shown, a removable cover (see, for example, the cover in FIG. 19c) may be employed to seal the open end 58 of the container 54 prior to assembly of the mosquito trap 50. The composition in the container 54 includes at least one active agent as described above with respect to the mosquito trap 10 of FIGS. 1a and 1b.

To assemble the mosquito trap 50 of FIGS. 2a and 2b, one would remove the cover closing the open end of the container 54 (if a cover is used) and add a liquid solvent (e.g., water) to the pellets in the container 54 to create a solution containing the at least one active agent. The textile sheet 66 can then be wrapped into its cylindrical form and the respective edges 74 of the sheet 66 are secured to each other as described above to form the enclosure 62. Lastly, the enclosure 62 may be at least partially inserted within the open end 58 of the container 54 using an interference fit with the container 54. The usage of the mosquito trap 50 is substantially identical to the mosquito trap 10 of FIGS. 1a and 1b.

FIGS. 3a and 3b illustrate a mosquito trap 86 according to a third embodiment of the invention. The mosquito trap 86 includes a container 90 having an open end 94 and an enclosure 98 protruding above the open end 94 of the container 90. Unlike the mosquito trap 10 in FIGS. 1a and 1b, the mosquito trap 86 of FIGS. 3a and 3b does not include a separate frame coupled to the container 90 around which the enclosure 98 is wrapped. Rather, the enclosure 98 includes a frame 102 that is stitched into the material of the enclosure 98 to give an appearance that the frame 102 is integral with the enclosure 98. Particularly, the enclosure 98 is made from a flexible textile sheet (e.g., hemp, ramie, cotton, or bamboo), and a resilient wire (made of metal or plastic, for example) is trapped within a helical guide sleeve attached to the sheet (e.g., by stitching) to impart a generally cylindrical shape to the textile sheet. With this configuration, the enclosure 98 may be collapsible to facilitate transport of the mosquito trap 86 (see FIG. 3b).

Figure 24:
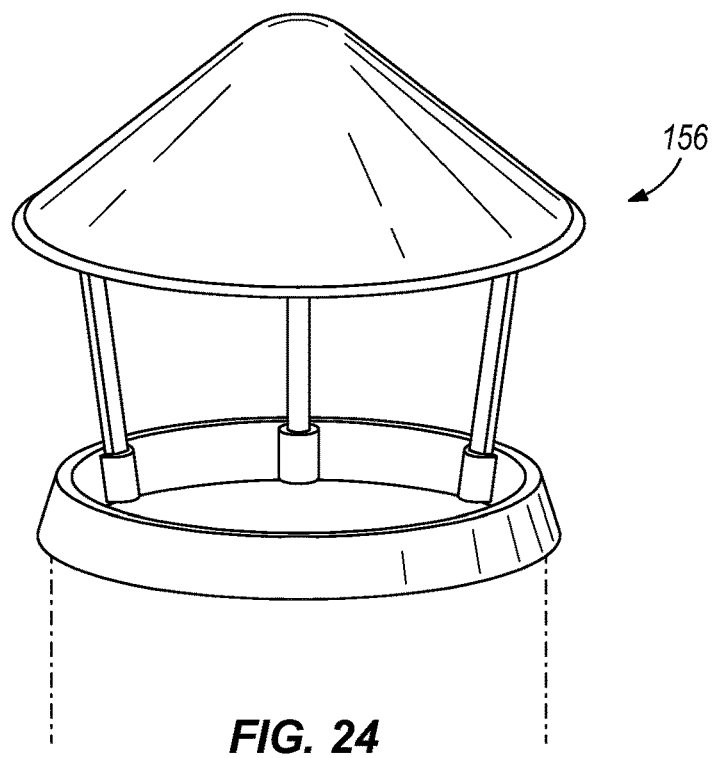
FIG. 24 illustrates a cover configured for use with some of the mosquito traps in FIGS. 1a-23.

With reference to FIGS. 3a and 3b, a top edge of the enclosure 98 defines an opening 106 which allows access into the interior of the enclosure 98 and the open end 94 of the container 90. The mosquito trap 86 may include a cover (see, for example, the cover in FIG. 24) at least partially positioned above the opening 106 and spaced from the opening 106 so as to not close the opening 106. Such a cover would be configured to deflect rain or any other falling liquid away from the opening 106 in the enclosure 98 to substantially prevent additional water or other liquid from accumulating in the container 90. Although not shown in FIG. 3a or 3b, the container 90 may also include one or more apertures 334 (see, for example, the apertures in FIGS. 13a and 13b) positioned beneath the open end 94 of the container 90 to provide an overflow drain, thereby effectively limiting the amount of water or other liquid that may be accumulated within the container 90.

The enclosure 98 also includes at least one active agent to facilitate attracting mosquitoes to the trap 86, killing them, or a combination thereof. The active agent may be either impregnated in the material used in making the enclosure 98, or the active agent may be applied to the enclosure 98 as a coating. The active agent includes those discussed above with respect to the mosquito trap 86 of FIGS. 1a and 1b.

The mosquito trap 86 also includes a composition comprising at least one active agent that is positioned in the container 90. Although not shown, a removable cover (see, for example, the cover in FIG. 19c) may be employed to seal the open end of the container 90 prior to assembly of the mosquito trap 86. The composition in the container 90 includes at least one active agent as described above with respect to the mosquito trap 10 of FIGS. 1a and 1b.

To assemble the mosquito trap 86 of FIGS. 3a and 3b, one would remove the cover closing the open end 94 of the container 90 (if a cover is used) and add a liquid solvent (e.g., water) to the pellets in the container 90 to create a solution containing the active agent. The enclosure 98 is then unpacked to allow the enclosure 98 to resume its uncollapsed shape and positioned on the container 90 such that the enclosure 98 protrudes above the open end 94 of the container 90. For example, the enclosure 98 may be at least partially inserted within the open end 94 of the container 90 using an interference fit with the container 90. Alternatively, the enclosure 98 may be positioned over the container 90, such that the container 90 is positioned within the interior of the enclosure 98. The usage of the mosquito trap 86 is substantially identical to the mosquito trap 10 of FIGS. 1a and 1b.

FIG. 4 illustrates a mosquito trap 110 according to a fourth embodiment of the invention. The mosquito trap 110 includes a container 114 having an open end (not shown) and an enclosure 118 protruding above the open end of the container 114. In a similar manner as the mosquito trap 86 in FIGS. 3a and 3b, the mosquito trap 110 of FIG. 4 includes a frame 122 that is stitched into the material of the enclosure 118 to give an appearance that the frame 122 is integral with the enclosure 118. Particularly, the enclosure 118 is made from a flexible textile sheet (e.g., hemp, ramie, cotton, or bamboo), and a resilient wire (made of metal or plastic, for example) is trapped within a helical guide sleeve attached to the sheet (e.g., by stitching) to impart a generally cylindrical shape to the textile sheet. With this configuration, the enclosure 118 may be collapsible to facilitate transport of the mosquito trap 110 in a similar manner as the enclosure 98 of FIGS. 3a and 3b.

With reference to FIG. 4, the mosquito trap 110 further includes a cover 126, integrally formed as a single piece with the enclosure 118, at least partially positioned above an opening 130 and spaced from the opening 130 so as to not close the opening 130. The cover 126 is configured to deflect rain or any other falling liquid away from the opening 130 in the enclosure 118 to substantially prevent additional water or other liquid from accumulating in the container 114. Although not shown in FIG. 4, the container 114 may also include one or more apertures (see, for example, the apertures 334 in FIGS. 13a and 13b) positioned beneath the open end of the container 114 to provide an overflow drain, thereby effectively limiting the amount of water or other liquid that may be accumulated within the container 114.

The enclosure 118 also includes at least one active agent to facilitate attracting mosquitoes to the trap 110, killing them, or a combination thereof. The active agent may be either impregnated in the material used in making the enclosure 118, or the active agent may be applied to the enclosure 118 as a coating. The active agent includes those discussed above with respect to the mosquito trap 10 of FIGS. 1a and 1b.

The mosquito trap 110 also includes a composition comprising at least one active agent, positioned in the container 114. As shown in FIG. 4, at least a portion of the container 114 is translucent to facilitate viewing the solution created when a liquid solvent is added to the composition. In the illustrated construction of the mosquito trap 110, the container 114 includes a transparent viewing window 134 through which the level of the solution may be monitored. Alternatively, the entire container 114 may be made of a translucent material to facilitate monitoring the level of the solution in the container 114. Although not shown, a removable cover (see, for example, the cover in FIG. 19c) may be employed to seal the open end of the container 114 prior to assembly of the mosquito trap 110. The composition in the container 114 includes at least one active agent as described above with respect to the mosquito trap 10 of FIGS. 1a and 1b.

To assemble the mosquito trap 110 of FIG. 4, one would remove the cover closing the open end of the container 114 (if a cover is used) and add a liquid solvent (e.g., water) to the pellets in the container 114 to create a solution containing the active agent. The enclosure 118 is then unpacked to allow the enclosure 118 to resume its uncollapsed shape and positioned on the container 114 such that the enclosure 118 protrudes above the open end of the container 114. For example, the enclosure 118 may be at least partially inserted within the open end of the container 114 using an interference fit with the container 114. Alternatively, the enclosure 118 may be positioned over a portion of the container 114, such that the open end of the container 114 is surrounded by the enclosure 118. The usage of the mosquito trap 110 is substantially identical to the mosquito trap 10 of FIGS. 1a and 1b.

FIGS. 5 and 5b illustrate a mosquito trap 138 according to a fifth embodiment of the invention. Rather than including a separate container and an enclosure like the mosquito traps in FIGS. 1a-4, the mosquito trap 138 in FIGS. 5a and 5b includes a container 142 and an enclosure 146 that are integral with each other. In this manner, a bottom portion of the mosquito trap 138 that contains the active agent solution can be considered the container 142, while an upper portion of the mosquito trap 138 protruding above the solution can be considered the enclosure 146. As such, the bottom portion of the mosquito trap 138 may be made from a material that is substantially impermeable to water and other liquids to allow the active agent solution to be contained directly within the trap 138 without significantly degrading the bottom portion of the trap 138.

Like the mosquito traps of FIGS. 3a and 3b and FIG. 4, the mosquito trap 138 of FIGS. 5a and 5b includes a frame 150 that is stitched into the material of the container 142 and the enclosure 146 to give an appearance that the frame 150 is integral with the container 142 and the enclosure 146. Particularly, the enclosure 146 is made from a flexible textile sheet (e.g., hemp, ramie, cotton, or bamboo), and a resilient wire (made of metal or plastic, for example) is trapped within respective horizontal and vertical guide sleeves attached to the sheet (e.g., by stitching) to impart a generally rectangular shape to the textile sheet. With this configuration, the enclosure 146 may be collapsible to facilitate transport of the mosquito trap 138 (see FIG. 5b).

With reference to FIGS. 5a and 5b, a top edge of the enclosure 146 defines an opening 154 which allows access into the interior of the enclosure 146 and the container 142. The mosquito trap 138 may include a cover 156 (see, for example, the cover in FIG. 24) at least partially positioned above the opening 154 and spaced from the opening 154 so as to not close the opening 154. Such a cover would be configured to deflect rain or any other falling liquid away from the opening 154 in the enclosure 146 to substantially prevent additional water or other liquid from accumulating in the container 142. Although not shown in FIG. 5a or 5b, the container 142 may also include one or more apertures (see, for example, the apertures 334 in FIGS. 13a and 13b) to provide an overflow drain, thereby effectively limiting the amount of water or other liquid that may be accumulated within the container 142.

The enclosure 146 also includes at least one active agent to facilitate attracting mosquitoes to the trap 138, killing them, or a combination thereof. The active agent may be either impregnated in the material used in making the enclosure 146, or the active agent may be applied to the enclosure 146 as a coating. The active agent includes those discussed above with respect to the mosquito trap 10 of FIGS. 1a and 1b.

The mosquito trap 138 also includes a composition comprising at least one active agent that is positioned in the container 142. The composition in the container 142 includes an active agent as described above with respect to the mosquito trap 10 of FIGS. 1a and 1b.

To assemble the mosquito trap 138 of FIGS. 5a and 5b, one would unpack the trap 138 to allow the enclosure 146 to resume its uncollapsed shape. Then, a liquid solvent (e.g., water) is added to the pellets in the container 142 to create a solution containing the active agent. Alternatively, a separate container (e.g., a bowl) may be positioned within the trap 138 rather than using a bottom portion of the trap 138 as the container 142. The usage of the mosquito trap 138 is substantially identical to the mosquito trap 10 of FIGS. 1a and 1b.

Figures 6A, 6B:
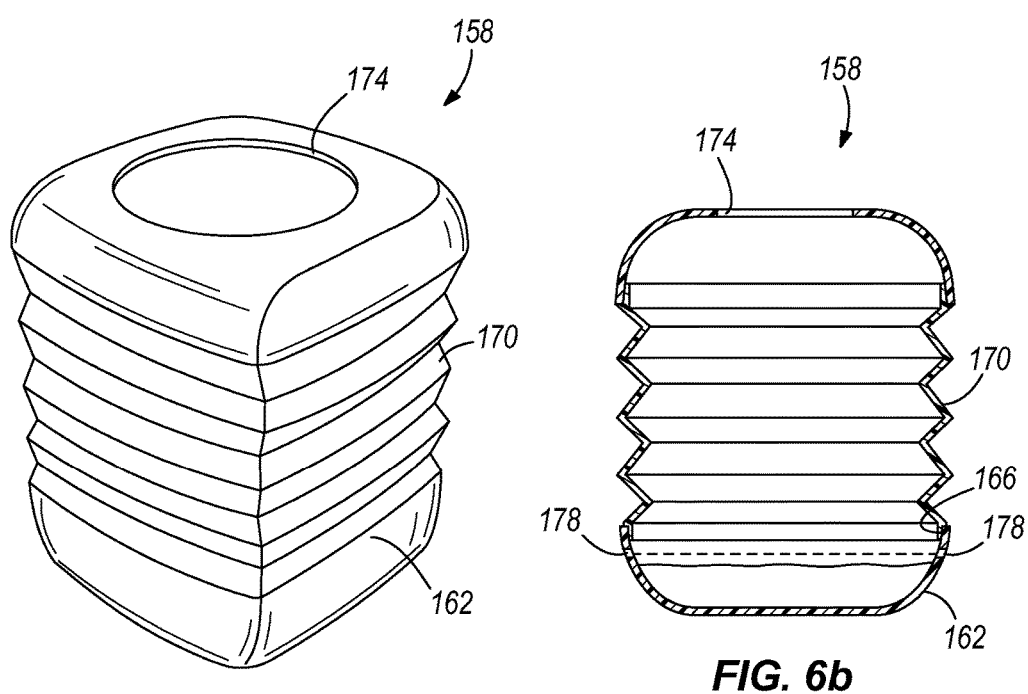
FIGS. 6a and 6b illustrate a mosquito trap according to a sixth embodiment of the invention.

FIGS. 6a and 6b illustrate a mosquito trap 158 according to a sixth embodiment of the invention. The mosquito trap 158 includes a container 162 having an open end 166 and an enclosure 170 protruding above the open end 166 of the container 162. Unlike the mosquito traps in FIGS. 3a-5b, the mosquito trap 158 of FIGS. 6a and 6b does not include a separate frame for imparting shape to the enclosure 170. Rather, the enclosure 170 is configured having a bellows shape that does not require any additional supporting structure. Accordingly, the enclosure 170 may be collapsible to facilitate transport of the mosquito trap 158. The enclosure 170 may be made from a folded, semi-rigid, pressed material (e.g., paperboard, palm fiberboard, hemp board, ligne board, or biofoam) to provide the bellows shape.

With reference to FIGS. 6a and 6b, a top edge of the enclosure 170 defines an opening 174 which allows access into the interior of the enclosure 170 and the open end 166 of the container 162. The mosquito trap 158 may include a cover (see, for example, the cover in FIG. 24) at least partially positioned above the opening 174 and spaced from the opening 174 so as to not close the opening 174. Such a cover would be configured to deflect rain or any other falling liquid away from the opening 174 in the enclosure 170 to substantially prevent additional water or other liquid from accumulating in the container 162. The container 162 also includes a plurality of apertures 178 positioned beneath the open end 166 of the container 162 to provide an overflow drain, thereby effectively limiting the amount of water or other liquid that may be accumulated within the container 162.

The enclosure 170 also includes at least one active agent to facilitate attracting mosquitoes to the trap 158, killing them, or a combination thereof. The active agent may be either impregnated in the material used in making the enclosure 170, or the active agent may be applied to the enclosure 170 as a coating. The active agent includes those discussed above with respect to the mosquito trap 10 of FIGS. 1a and 1b.

The mosquito trap 158 also includes a composition comprising at least one active agent that is positioned in the container 162. Although not shown, a removable cover (see, for example, the cover 542 in FIG. 19c) may be employed to seal the open end 166 of the container 162 prior to assembly of the mosquito trap 158. The composition in the container 162 includes at least one active agent as described above with respect to the mosquito trap 10 of FIGS. 1a and 1b.

To assemble the mosquito trap 158 of FIGS. 6a and 6b, one would remove the cover closing the open end 166 of the container 162 (if a cover is used) and add a liquid solvent (e.g., water) to the pellets in the container 162 to create a solution containing the active agent. The enclosure 170 is then unpacked to allow the enclosure 170 to resume its uncollapsed shape and positioned on the container 162 such that the enclosure 170 protrudes above the open end 166 of the container 162. In the illustrated construction of the trap 158, the enclosure 170 may be at least partially inserted within the open end 166 of the container 162 using an interference fit with the container 162. Alternatively, the enclosure 170 may be positioned over the container 162, such that the container 162 is positioned within the interior of the enclosure 170. The usage of the mosquito trap 158 is substantially identical to the mosquito trap 10 of FIGS. 1a and 1b.

Figure 7A:
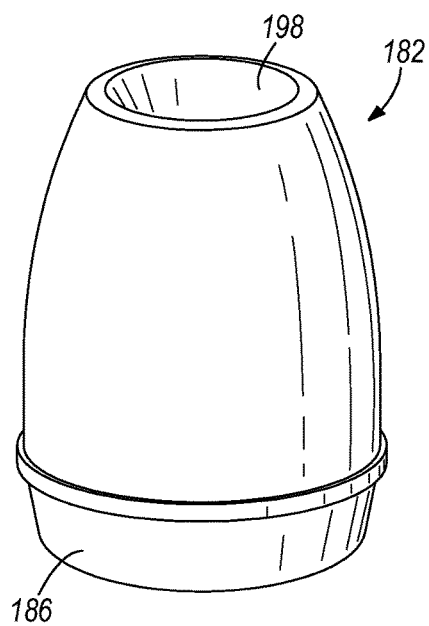
FIG. 7a illustrates a perspective view of a mosquito trap according to a seventh embodiment of the invention.
Figure 7B:
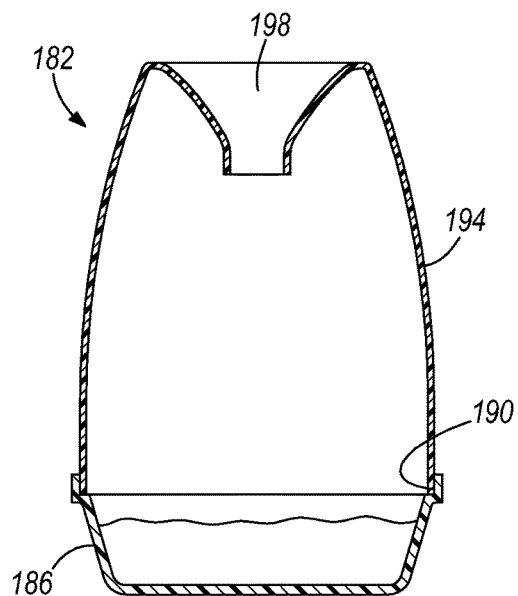

FIGS. 7a and 7b illustrate a mosquito trap 182 according to a seventh embodiment of the invention. The mosquito trap 182 includes a container 186 having an open end 190 and an enclosure 194 protruding above the open end 190 of the container 186. Unlike the mosquito trap 10 in FIGS. 1a and 1b, the mosquito trap 182 of FIGS. 7a and 7b does not include a separate frame coupled to the container 186 for supporting the enclosure 194. Rather, the enclosure 194 is made from a material that is sufficiently rigid to maintain its shape without any additional supporting structure. For example, the enclosure 194 may be made from a semi-rigid, pressed material (e.g., paperboard, palm fiberboard, hemp board, ligne board, biofoam, a biodegradable molded paper, or a plant fiber composite). The container 186 and the enclosure 194 may each include a generally tapered shape to facilitate nesting a plurality of containers 186 with each other, and a plurality of enclosures 194 with each other, for shipping or transport.

With reference to FIGS. 7a and 7b, the enclosure 194 includes an opening 198, positioned near the top of the enclosure 194, which allows access into the interior of the enclosure 194 and the open end 190 of the container 186. At least a portion of the opening 198 is necked or is defined by a continuously decreasing cross-sectional area to facilitate trapping mosquitoes within the interior of the enclosure 194. The mosquito trap 182 may include a cover (see, for example, the cover 156 in FIG. 24) at least partially positioned above the opening 198 and spaced from the opening 198 so as to not close the opening 198. Such a cover would be configured to deflect rain or any other falling liquid away from the opening 198 in the enclosure 194 to substantially prevent additional water or other liquid from accumulating in the container 186. Although not shown in FIG. 7a or 7b, the container 186 may also include one or more apertures (see, for example, the apertures 334 in FIGS. 13a and 13b) positioned beneath the open end 190 of the container 186 to provide an overflow drain, thereby effectively limiting the amount of water or other liquid that may be accumulated within the container 186.

The enclosure 194 also includes at least one active agent to facilitate attracting mosquitoes to the trap 182, killing them, or a combination thereof. The active agent may be either impregnated in the material used in making the enclosure 194, or the active agent may be applied to the enclosure 194 as a coating. The active agent includes those discussed above with respect to the mosquito trap 10 of FIGS. 1a and 1b.

The mosquito trap 182 also includes a composition comprising at least one active agent that is positioned in the container 186. Although not shown, a removable cover (see, for example, the cover in FIG. 19c) may be employed to seal the open end 190 of the container 186 prior to assembly of the mosquito trap 182. The composition in the container 186 includes at least one active agent as described above with respect to the mosquito trap 10 of FIGS. 1a and 1b.

To assemble the mosquito trap 182 of FIGS. 7a and 7b, one would remove the cover closing the open end of the container 186 (if a cover is used) and add a liquid solvent (e.g., water) to the pellets in the container 186 to create a solution containing the active agent. The bottom of the enclosure 194 is then inserted within the open end 190 of the container 186 using an interference fit with the container 186. The usage of the mosquito trap 182 is substantially identical to the mosquito trap 10 of FIGS. 1a and 1b.

Figure 8A:
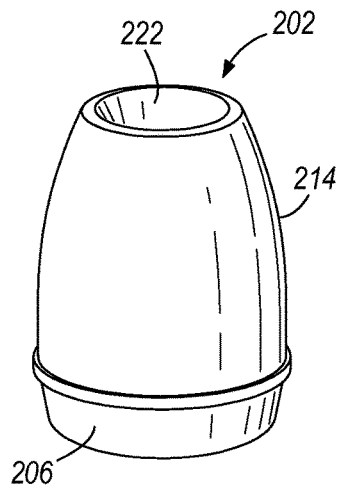
FIG. 8a illustrates a perspective view of a mosquito trap according to an eighth embodiment of the invention.
Figure 8B:
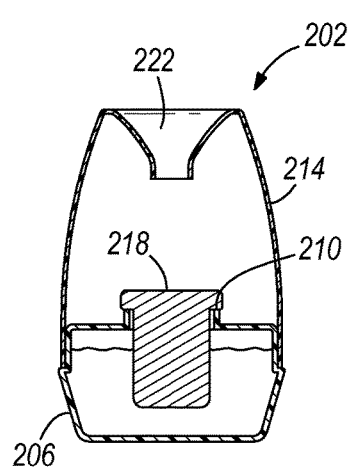
Figure 8C:
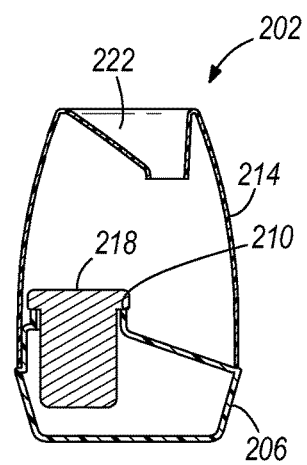

FIGS. 8a-8c illustrate a mosquito trap 202 according to an eighth embodiment of the invention. The mosquito trap 202 includes a container 206 having an open end 210 and an enclosure 214 protruding above the open end 210 of the container 206. The trap 202 also includes an absorbent structure 218 (e.g., foam or a sponge) positioned in the open end 210 of the container 206. At least a portion of the absorbent structure 218 is immersed in a solution containing at least one active agent. When the trap 202 is in use, the absorbent structure 218 wicks the solution from beneath the open end 210 of the container 206 toward the open end 210 of the container 206. The enclosure 214 is substantially similar to the enclosure 194 shown in FIGS. 7a and 7b, and will not be described again in detail. With reference to FIG. 8c, however, an alternative construction of the enclosure 214 may include a funnel beneath an opening 222 of the enclosure 214 that is offset from the absorbent structure 218. As such, any liquid entering the trap 202 through the opening 222 may be redirected away from the absorbent structure. The container 186 and the enclosure 214 may each include a generally tapered shape to facilitate nesting a plurality of containers 206 with each other, and a plurality of enclosures 214 with each other, for shipping or transport.

The mosquito trap 202 may include a cover (see, for example, the cover 156 in FIG. 24) at least partially positioned above an opening 222 in the enclosure 214 and spaced from the opening 222 so as to not close the opening 222. Such a cover would be configured to deflect rain or any other falling liquid away from the opening 222 in the enclosure 214 to substantially prevent additional water or other liquid from accumulating in the container 206.

The enclosure 214 also includes at least one active agent to facilitate attracting mosquitoes to the trap 202, killing them, or a combination thereof. The active agent may be either impregnated in the material used in making the enclosure 214, or the active agent may be applied to the enclosure 214 as a coating. The active agent includes those discussed above with respect to the mosquito trap 10 of FIGS. 1a and 1b.

The mosquito trap 202 also includes a composition comprising at least one active agent that is positioned in the container 206. Although not shown, a removable cover (see, for example, the cover 542 in FIG. 19c) may be employed to seal the open end 210 of the container 206 prior to assembly of the mosquito trap 202. The composition in the container 206 includes at least one active agent as described above with respect to the mosquito trap 10 of FIGS. 1a and 1b.

To assemble the mosquito trap 202 of FIGS. 8a-8c, one would remove the cover closing the open end 210 of the container 206 (if a cover is used) and add a liquid solvent (e.g., water) to the pellets in the container 206 to create a solution containing the active agent. The bottom of the enclosure 214 is then secured to the container 206 using an interference fit with the container 206. The usage of the mosquito trap 202 is substantially identical to the mosquito trap 10 of FIGS. 1a and 1b. The absorbent structure 218, however, wicks the active agent solution toward and above the open end 210 of the container 206, thereby providing a place for mosquitoes to land and ingest the solution.

FIGS. 9a and 9b illustrate a mosquito trap 226 according to a ninth embodiment of the invention. Rather than including a separate container and an enclosure like the mosquito traps in FIGS. 1a-4 and 6a-8c, the mosquito trap 226 in FIGS. 9a and 9b includes a container 230 and an enclosure 234 that are integrally formed as a single piece. In this manner, a bottom portion of the mosquito trap 226 that contains the active agent solution can be considered the container 230, while an upper portion of the mosquito trap 226 protruding above the solution can be considered the enclosure 234. The mosquito trap 226 may be made from a semi-rigid, lightweight, pressed material (e.g., paperboard, palm fiberboard, hemp board, ligne board, biofoam, a biodegradable molded paper, or a plant fiber composite) covered with a water-resistant coating to improve the durability of the mosquito trap 226 when situated in the outdoors. Alternatively, the mosquito trap 226 may be made from a rigid, molded material (e.g., a wood-filled plastic, cellulose, bio-HDPE, a plant-based resin, a polyactide, or a starch-based resin).

With reference to FIG. 9a, a top edge of the enclosure 234 defines an opening 238 which allows access into the interior of the enclosure 234 and an open end 242 of the container 230. The mosquito trap 226 may include a cover (see, for example, the cover 156 in FIG. 24) at least partially positioned above the opening 238 and spaced from the opening 238 so as to not close the opening 238. Such a cover would be configured to deflect rain or any other falling liquid away from the opening 238 in the enclosure 234 to substantially prevent additional water or other liquid from accumulating in the container 230. The container 230 also includes a plurality of apertures 246 to provide an overflow drain, thereby effectively limiting the amount of water or other liquid that may be accumulated within the container 230.

The enclosure 234 also includes at least one active agent to facilitate attracting mosquitoes to the trap 226, killing them, or a combination thereof. The active agent may be either impregnated in the material used in making the enclosure 234, or the active agent may be applied to the enclosure 234 as a coating. The active agent includes those discussed above with respect to the mosquito trap 10 of FIGS. 1a and 1b.

The mosquito trap 226 also includes a composition comprising at least one active agent, positioned in the container 230. The composition in the container 230 includes at least one active agent as described above with respect to the mosquito trap 10 of FIGS. 1a and 1b.

To assemble the mosquito trap 226 of FIGS. 9a and 9b, one would remove the cover closing the open end of the container 230 (if a cover is used) and add a liquid solvent (e.g., water) to the pellets in the container 230 to create a solution containing the active agent. The usage of the mosquito trap 226 is substantially identical to the mosquito trap 10 of FIGS. 1a and 1b.

FIGS. 10a and 10b illustrate a mosquito trap 250 according to a tenth embodiment of the invention. Like the mosquito trap 226 of FIGS. 9a and 9b, the mosquito trap 250 of FIGS. 10a and 10b includes a container 254 and an enclosure 258 that are integrally formed as a single piece. Accordingly, the container 254 and the enclosure 258 are substantially identical to the container 230 and the enclosure 234 of FIGS. 9a and 9b, and will not be described again in detail. However, the mosquito trap 250 of FIGS. 10a and 10b includes a screen 262, having at least one active agent, at least partially positioned above an open end 266 of the container 254 upon which mosquitoes may land. The screen 262 may be integrally formed with the container 254 and the enclosure 258 as a single piece. Alternatively, the screen 262 may be a separate and distinct component that is coupled to the container 254 during assembly of the trap 250. In the illustrated construction of the trap 250, the screen 262 uses the same adhesive otherwise used for trapping the mosquitoes to secure the screen 262 to the container 254. Alternatively, any of a number of different fasteners or materials may be used to secure the screen 262 to the container 254.

To assemble the mosquito trap 250 of FIGS. 10a and 10b, one would remove the cover closing the open end 266 of the container 254 (if a cover is used) and add a liquid solvent (e.g., water) to the pellets in the container 254 to create a solution containing the active agent. If the screen 262 is provided as a separate component, the screen 262 may be secured to the container 254 either before or after adding the liquid solvent to the pellets in the container 254. The usage of the mosquito trap 250 is substantially identical to the mosquito trap 10 of FIGS. 1a and 1b.

Figures 11A, 11B:
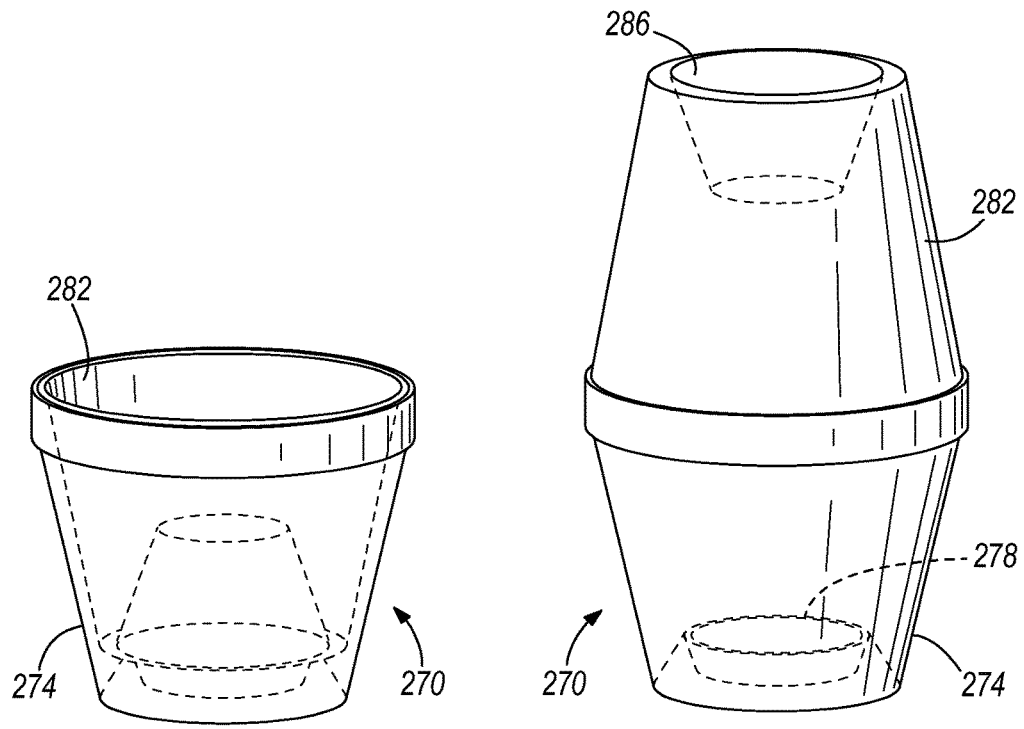
FIGS. 11a and 11b illustrate a mosquito trap according to an eleventh embodiment of the invention.

FIGS. 11a and 11b illustrate a mosquito trap 270 according to an eleventh embodiment of the invention. The mosquito trap 270 includes a container 274 having an open end 278 and an enclosure 282 protruding above the open end of the container 274. The enclosure 282 is made from a material that is sufficiently rigid to maintain its shape without any additional supporting structure. For example, the enclosure 282 may be made from a semi-rigid, pressed material (e.g., paperboard, palm fiberboard, hemp board, ligne board, biofoam, a biodegradable molded paper, or a plant fiber composite). The container 274 and the enclosure 282 may each include a generally tapered shape to facilitate nesting the enclosure 282 with the container 274 to facilitate shipping or transporting the traps 270.

With reference to FIG. 11a, the enclosure 282 includes an opening 286, positioned near the top of the enclosure 282, which allows access into the interior of the enclosure 282 and the open end 278 of the container 274. At least a portion of the opening 286 is necked or is defined by a continuously decreasing cross-sectional area to facilitate trapping mosquitoes within the interior of the enclosure 282. The mosquito trap 270 may include a cover (see, for example, the cover 156 in FIG. 24) at least partially positioned above the opening 286 and spaced from the opening 286 so as to not close the opening 286. Such a cover would be configured to deflect rain or any other falling liquid away from the opening 286 in the enclosure 282 to substantially prevent additional water or other liquid from accumulating in the container 274. Although not shown in FIG. 11a or 11b, the container 274 may also include one or more apertures (see, for example, the apertures 246 in FIGS. 9a-10b) positioned beneath the open end 278 of the container 274 to provide an overflow drain, thereby effectively limiting the amount of water or other liquid that may be accumulated within the container 274.

The enclosure 282 also includes at least one active agent to facilitate attracting mosquitoes to the trap 270, killing them, or a combination thereof. The active agent may be either impregnated in the material used in making the enclosure 282, or the active agent may be applied to the enclosure 282 as a coating. The active agent includes those discussed above with respect to the mosquito trap 10 of FIGS. 1a and 1b.

The mosquito trap 270 also includes a composition comprising at least one active agent that is positioned in the container 274. Although not shown, a removable cover (see, for example, the cover 542 in FIG. 19c) may be employed to seal the open end 278 of the container 274 prior to assembly of the mosquito trap 270. The material in the container 274 includes at least one active agent as described above with respect to the mosquito trap 10 of FIGS. 1a and 1b.

To assemble the mosquito trap 270 of FIGS. 11a and 11b, the enclosure 282 is first removed from its nested position within the container 274 (FIG. 11b). Then, one would remove the cover closing the open end 278 of the container 274 (if a cover is used) and add a liquid solvent (e.g., water) to the pellets in the container 274 to create a solution containing the active agent. The enclosure 282 is then stacked onto the container 274 and secured to the container 274 (e.g., using an interference fit with the container 274). The usage of the mosquito trap 270 is substantially identical to the mosquito trap 10 of FIGS. 1a and 1b.

Figure 12:
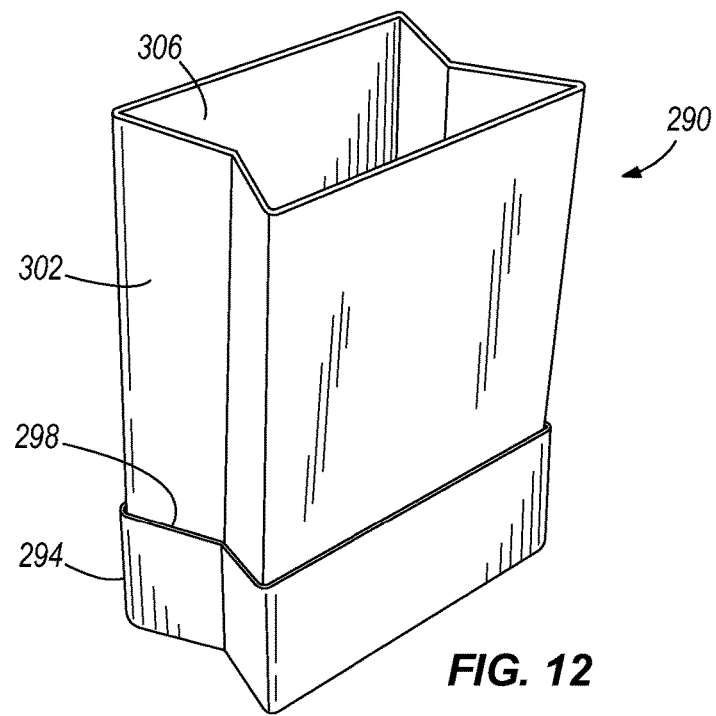
FIG. 12 illustrates a mosquito trap according to a twelfth embodiment of the invention.

FIG. 12 illustrates a mosquito trap 290 according to a twelfth embodiment of the invention. The mosquito trap 290 includes a container 294 having an open end 298 and an enclosure 302 protruding above the open end 298 of the container 294. The mosquito trap 290 does not include a separate frame for imparting a shape to the enclosure 302. Rather, the enclosure 302 is configured having a paper-bag shape that does not require any additional supporting structure. Accordingly, the enclosure 302 may be collapsible or foldable like a paper bag to facilitate transport of the mosquito trap 290. The enclosure 302 may be made from a folded, semi-rigid, pressed material (e.g., paperboard, palm fiberboard, hemp board, ligne board, or biofoam) to provide the paper-bag shape.

With continued reference to FIG. 12, a top edge of the enclosure 302 defines an opening 306 which allows access into the interior of the enclosure 302 and the open end 298 of the container 294. The mosquito trap 290 may include a cover (see, for example, the cover 156 in FIG. 24) at least partially positioned above the opening 306 and spaced from the opening 306 so as to not close the opening 306. Such a cover would be configured to deflect rain or any other falling liquid away from the opening 306 in the enclosure 302 to substantially prevent additional water or other liquid from accumulating in the container 294. Although not shown in FIG. 12, the container 294 may also include one or more apertures (see, for example, the apertures 334 in FIGS. 13a and 13b) positioned beneath the open end 298 of the container 294 to provide an overflow drain, thereby effectively limiting the amount of water or other liquid that may be accumulated within the container 294.

The enclosure 302 also includes at least one active agent to facilitate attracting mosquitoes to the trap 290, killing them, or a combination thereof. The active agent may be either impregnated in the material used in making the enclosure 302, or the active agent may be applied to the enclosure 302 as a coating. The active agent includes those discussed above with respect to the mosquito trap 10 of FIGS. 1a and 1b.

The mosquito trap 290 also includes a composition comprising at least one active agent that is positioned in the container 294. Although not shown, a removable cover (see, for example, the cover 542 in FIG. 19c) may be employed to seal the open end 298 of the container 294 prior to assembly of the mosquito trap 290. The composition in the container 294 includes at least one active agent as described above with respect to the mosquito trap 10 of FIGS. 1a and 1b.

To assemble the mosquito trap 290 of FIG. 12, one would remove the cover closing the open end of the container 294 (if a cover is used) and add a liquid solvent (e.g., water) to the pellets in the container 294 to create a solution containing the active agent. The enclosure 302 is then unfolded and at least partially inserted within the open end 298 of the container 294 using an interference fit with the container 294. The usage of the mosquito trap 290 is substantially identical to the mosquito trap 10 of FIGS. 1a and 1b.

Figures 13A, 13B:
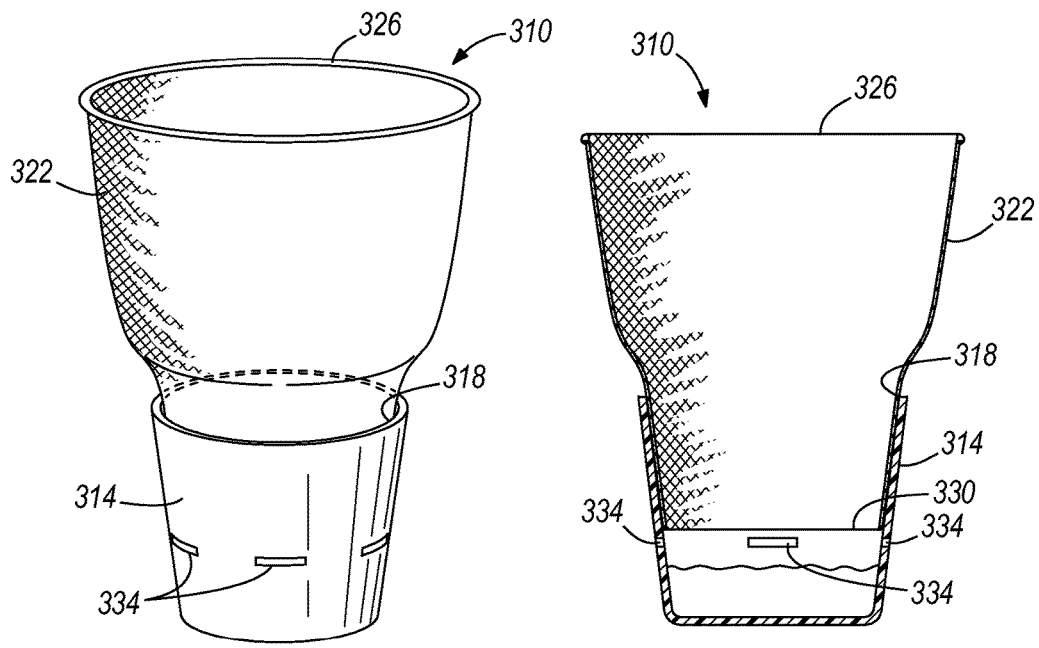

FIGS. 13a and 13b illustrate a mosquito trap 310 according to a thirteenth embodiment of the invention. The mosquito trap 310 includes a container 314 having an open end 318 and an enclosure 322 protruding above the open end 318 of the container 314. The mosquito trap 310 does not include a separate frame for imparting a shape to the enclosure 322. Rather, the enclosure 322 is made from a flexible textile sheet (e.g., hemp, ramie, cotton, or bamboo) wrapped around a reusable wire infrastructure to impart a shape to the textile sheet. Alternatively, the enclosure 322 may be made of a semi-rigid, pressed material such as any of those discussed above. The container 314 and the enclosure 322 are each generally tapered to facilitate nesting the enclosure 322 with the container 314 during assembly of the trap 310.

With reference to FIGS. 13a and 13b, a top edge of the enclosure 322 defines an opening 326 which allows access into the interior of the enclosure 322 and the open end 318 of the container 314. The enclosure 322 also includes a bottom wall 330 substantially preventing any mosquitoes from directly accessing the active agent solution in the container 314. The bottom wall 330 of the enclosure 322 may also be coated with an adhesive for trapping mosquitoes. The mosquito trap 310 may include a cover (see, for example, the cover 156 in FIG. 24) at least partially positioned above the opening 326 and spaced from the opening 326 so as to not close the opening 326. The cover may be configured to deflect rain or any other falling liquid away from the opening 326 in the enclosure 322 to substantially prevent additional water or other liquid from accumulating in the container 314. The container 314 also includes a plurality of apertures 334 positioned beneath the open end 318 of the container 314 to provide an overflow drain, thereby effectively limiting the amount of water or other liquid that may be accumulated within the container 314.

The enclosure 322 also includes at least one active agent to facilitate attracting mosquitoes to the trap 310, killing them, or a combination thereof. The active agent may be either impregnated in the material used in making the enclosure 322, or the active agent may be applied to the enclosure 322 as a coating. The active agent includes those discussed above with respect to the mosquito trap 10 of FIGS. 1a and 1b.

The mosquito trap 310 also includes a composition comprising at least one active agent that is positioned in the container 314. Although not shown, a removable cover (see, for example, the cover 542 in FIG. 19c) may be employed to seal the open end 318 of the container 314 prior to assembly of the mosquito trap 310. The composition in the container 314 includes at least one active agent as described above with respect to the mosquito trap 10 of FIGS. 1a and 1b.

To assemble the mosquito trap 310 of FIGS. 13a and 13b, one would remove the cover closing the open end 318 of the container 314 (if a cover is used) and add a liquid solvent (e.g., water) to the pellets in the container 314 to create a solution containing the active agent. The enclosure 322 may then be at least partially inserted within the open end 318 of the container 314 using an interference fit with the container 314. The usage of the mosquito trap 310 is substantially identical to the mosquito trap 10 of FIGS. 1a and 1b.

Figures 14A, 14B:
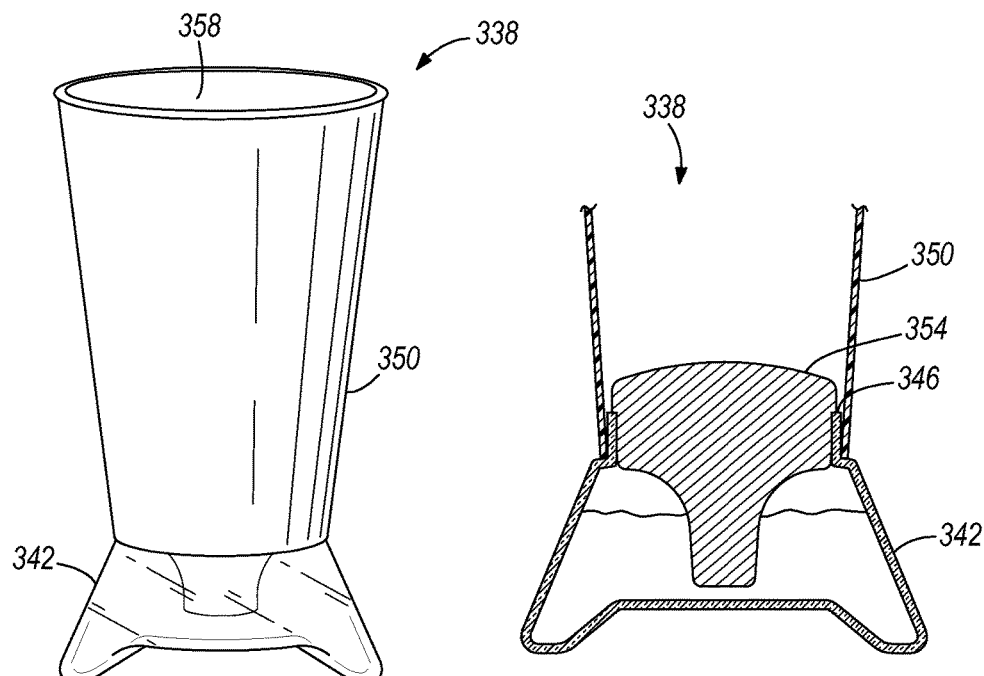

FIGS. 14a and 14b illustrate a mosquito trap 338 according to a fourteenth embodiment of the invention. The mosquito trap 338 includes a container 342 having an open end 346 and an enclosure 350 protruding above the open end 346 of the container 342. The trap 338 also includes an absorbent structure 354 positioned in the open end 346 of the container 342. At least a portion of the absorbent structure 354 is immersed in a solution containing at least one active agent. When the trap 338 is in use, the absorbent structure 354 wicks the solution from beneath the open end 346 of the container 342 toward the open end 346 of the container 342. The enclosure 350 is made from a material that is sufficiently rigid to maintain its shape without any additional supporting structure. For example, the enclosure 350 may be made from a semi-rigid, pressed material (e.g., paperboard, palm fiberboard, hemp board, ligne board, biofoam, a biodegradable molded paper, or a plant fiber composite).

With reference to FIG. 14a, a top edge of the enclosure 350 defines an opening 358 which allows access into the interior of the enclosure 350 and the open end 346 of the container 342. The mosquito trap 338 may include a cover (see, for example, the cover 156 in FIG. 24) at least partially positioned above the opening 358 and spaced from the opening 358 so as to not close the opening 358. Such a cover would be configured to deflect rain or any other falling liquid away from the opening 358 in the enclosure 350 to substantially prevent additional water or other liquid from accumulating in the container 342. Although not shown in FIG. 14a or 14b, the container 342 may also include one or more apertures (see, for example, the apertures 334 in FIGS. 13a and 13b) positioned beneath the open end 346 of the container 342 to provide an overflow drain, thereby effectively limiting the amount of water or other liquid that may be accumulated within the container 342.

The enclosure 350 also includes at least one active agent to facilitate attracting mosquitoes to the trap 338, killing them, or a combination thereof. The active agent may be either impregnated in the material used in making the enclosure 350, or the active agent may be applied to the enclosure 350 as a coating. The active agent includes those discussed above with respect to the mosquito trap 10 of FIGS. 1a and 1b.

The mosquito trap 338 also includes a composition comprising at least one active agent that is positioned in the container 342. At least a portion of the container 342 is translucent to facilitate viewing the solution created when a liquid solvent is added to the material. In the illustrated construction of the mosquito trap 338, the entire container 342 is made from a transparent material to facilitate monitoring the level of the solution in the container 342. Alternatively, the container 342 may include a transparent or translucent viewing window through which the level of the solution may be monitored. Although not shown, a removable cover (see, for example, the cover 542 in FIG. 19c) may be employed to seal the open end 346 of the container 342 prior to assembly of the mosquito trap 338. The composition in the container 342 includes at least one active agent as described above with respect to the mosquito trap 10 of FIGS. 1a and 1b.

To assemble the mosquito trap 338 of FIGS. 14a and 14b, one would remove the cover closing the open end 346 of the container 342 (if a cover is used) and add a liquid solvent (e.g., water) to the pellets in the container 342 to create a solution containing the active agent. The bottom of the enclosure 350 is then secured to the container 342 using an interference fit with the container 342. The usage of the mosquito trap 338 is substantially identical to the mosquito trap 10 of FIGS. 1a and 1b. The absorbent material 354, however, wicks the toxic solution toward and above the open end 346 of the container 342, thereby providing a place for mosquitoes to land and to ingest or otherwise absorb the toxic solution.

Figure 15:
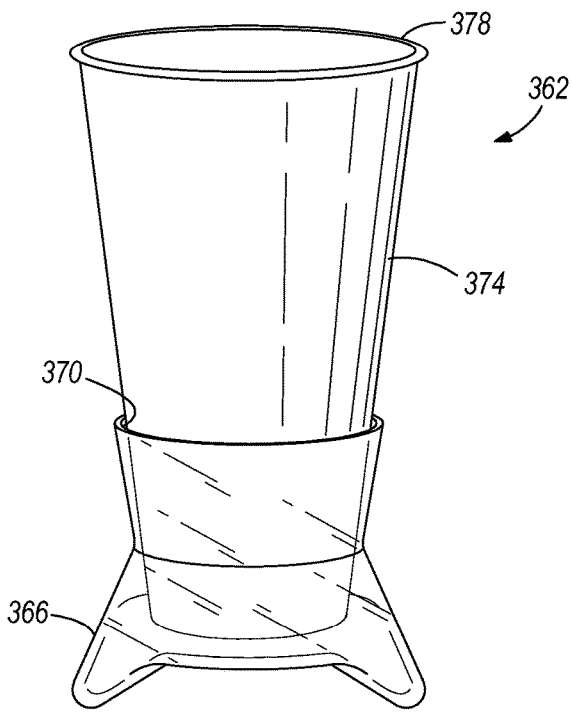
FIG. 15 illustrates a mosquito trap according to a fifteenth embodiment of the invention.

FIG. 15 illustrates a mosquito trap 362 according to a fifteenth embodiment of the invention. The mosquito trap 362 includes a container 366 having an open end 370 and an enclosure 374 protruding above the open end 370 of the container 366. The mosquito trap 362 does not include a separate frame for imparting a shape to the enclosure 374. Rather, the enclosure 374 is made from a flexible textile sheet (e.g., hemp, ramie, cotton, or bamboo) wrapped around a reusable wire infrastructure to impart a shape to the textile sheet. Alternatively, the enclosure 374 may be made of a semi-rigid, pressed material such as any of those discussed above. The container 366 and the enclosure 374 are each generally tapered to facilitate nesting the enclosure 374 with the container 366 during assembly of the trap 362.

With continued reference to FIG. 15, a top edge of the enclosure 374 defines an opening 378 which allows access into the interior of the enclosure 374 and the open end 370 of the container 366. The mosquito trap 362 may include a cover (see, for example, the cover 156 in FIG. 24) at least partially positioned above the opening 378 and spaced from the opening 378 so as to not close the opening 378. The cover is configured to deflect rain or any other falling liquid away from the opening 378 in the enclosure 374 to substantially prevent additional water or other liquid from accumulating in the container 366. The container 366 may also include one or more apertures (see, for example, the apertures 334 in FIGS. 13a and 13b) positioned beneath the open end 370 of the container 366 to provide an overflow drain, thereby effectively limiting the amount of water or other liquid that may be accumulated within the container 366.

The enclosure 374 also includes at least one active agent to facilitate attracting mosquitoes to the trap 362, killing them, or a combination thereof. The active agent may be either impregnated in the material used in making the enclosure 374, or the active agent may be applied to the enclosure 374 as a coating. The active agent includes those discussed above with respect to the mosquito trap 10 of FIGS. 1a and 1b.

The mosquito trap 362 also includes a composition comprising at least one active agent, positioned in the container 366. At least a portion of the container 366 is translucent to facilitate viewing the solution created when a liquid solvent is added to the composition. In the illustrated construction of the mosquito trap 362, the entire container 366 is made from a transparent material to facilitate monitoring the level of the solution in the container 366. Alternatively, the container 366 may include a transparent or translucent viewing window through which the level of the solution may be monitored. Although not shown, a removable cover (see, for example, the cover 542 in FIG. 19c) may be employed to seal the open end 370 of the container 366 prior to assembly of the mosquito trap 362. Particularly, the composition in the container 366 includes at least one active agent as described above with respect to the mosquito trap 10 of FIGS. 1a and 1b.

To assemble the mosquito trap 362 of FIG. 15, one would remove the cover closing the open end 370 of the container 366 (if a cover is used) and add a liquid solvent (e.g., water) to the pellets in the container 366 to create a composition containing the active agent. The enclosure 374 may then be at least partially inserted within the open end 370 of the container 366 using an interference fit with the container 366. The enclosure 374 is also at least partially immersed within the solution to wick the solution from beneath the open end 370 of the container 366 and toward the open end 370 of the container 366. Depending upon the height of the container 366, the enclosure 374 may also wick the solution above the open end 370 of the container 366. The usage of the mosquito trap 362 is substantially identical to the mosquito trap 10 of FIGS. 1a and 1b.

Figure 16B:
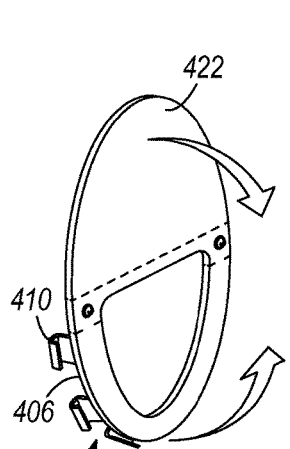
Figure 16C:
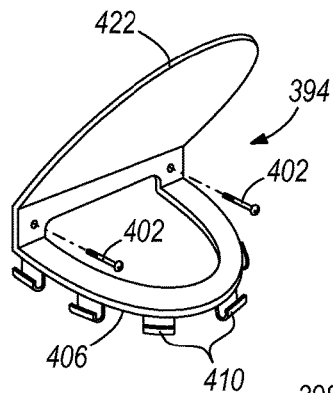
Figure 16A:
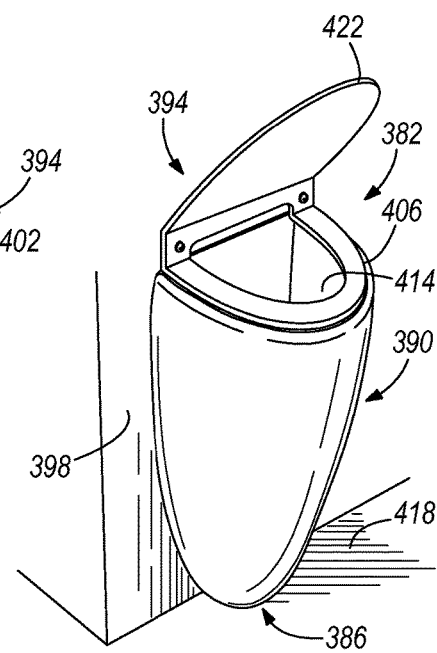
FIG. 16a illustrates a mosquito trap according to a sixteenth embodiment of the invention.

FIG. 16a illustrates a mosquito trap 382 according to a sixteenth embodiment of the invention. Rather than including a separate container and an enclosure like the mosquito traps in FIGS. 1a-4, 6a-8c, and 11a-15, the mosquito trap 382 in FIG. 16a includes a container 386 and an enclosure 390 that are integral with each other. In this manner, a bottom portion of the mosquito trap 382 that contains the active agent solution can be considered the container 386, while an upper portion of the mosquito trap 382 protruding above the solution can be considered the enclosure 390. As such, the bottom portion of the mosquito trap 382 may be made from a material that is substantially impermeable to water and other liquids to allow the active agent solution to be contained directly within the trap without significantly degrading the bottom portion of the trap 382.

The mosquito trap 382 also includes a frame 394 that is secured to a vertical support surface 398 (e.g., a wall) using fasteners 402 (e.g., screws). The frame 394 includes a hoop 406 and a plurality of hooks or hangers 410 extending from the hoop 406, from which the integral container 386/enclosure 390 is suspended. With continued reference to FIG. 16, a top edge of the enclosure 390 defines an opening 414 which allows access into the interior of the enclosure 390 and the container 386. The hoop 406 maintains the shape of the opening 414 in addition to suspending the integral container 386/enclosure 390 relative to an underlying horizontal support surface 418 (e.g., the ground).

The frame 394 also includes a cover 422, integrally formed as a single piece with the hoop 406, that is at least partially positioned above the opening 414 and spaced from the opening 414 so as to not close the opening 414. The cover 422 is configured to deflect rain or any other falling liquid away from the opening 414 in the enclosure 390 to substantially prevent additional water or other liquid from accumulating in the integral container 386/enclosure 390. Although not shown in FIG. 16a, the container 386 may also include one or more apertures (see, for example, the apertures 334 in FIGS. 13a and 13b) to provide an overflow drain, thereby effectively limiting the amount of water or other liquid that may be accumulated within the container 386.

The enclosure 390 also includes at least one active agent to facilitate attracting mosquitoes to the trap 382, killing them, or a combination thereof. The active agent may be either impregnated in the material used in making the enclosure 390, or the active agent may be applied to the enclosure 390 as a coating. The active agent includes those discussed above with respect to the mosquito trap 10 of FIGS. 1a and 1b.

The mosquito trap 382 also includes a composition comprising at least one active agent that is positioned in the container 386. The composition in the container 386 includes at least one active agent as described above with respect to the mosquito trap 10 of FIGS. 1a and 1b.

Prior to assembly of the mosquito trap 382, the frame 394 is initially provided such that the cover 422 and the hoop 406 are oriented substantially parallel to each other (FIG. 16b). To assemble the mosquito trap 382, one would fold the cover 422 and the hoop 406 along parallel perforations on the frame 394 (FIG. 16c), and then mount the frame 394 to the vertical support surface 398. Then, the integral container 386/enclosure 390 is suspended from the hangers 410 relative to the horizontal support surface 418 such that the enclosure opening 414 is held taught by the hoop 406. Lastly, a liquid solvent (e.g., water) is added to the pellets in the container 386 to create a solution containing the active agent. Alternatively, a separate container (e.g., a bowl) may be positioned within the trap 382 rather than using a bottom portion of the trap 382 as the container 386. The usage of the mosquito trap 382 is substantially identical to the mosquito trap 10 of FIGS. 1a and 1b.

Figure 17A:
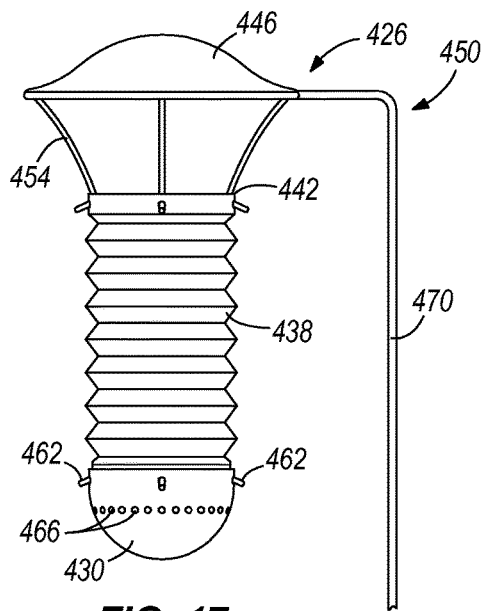
FIGS. 17a and 17b illustrate a mosquito trap according to a seventeenth embodiment of the invention.
Figure 17B:
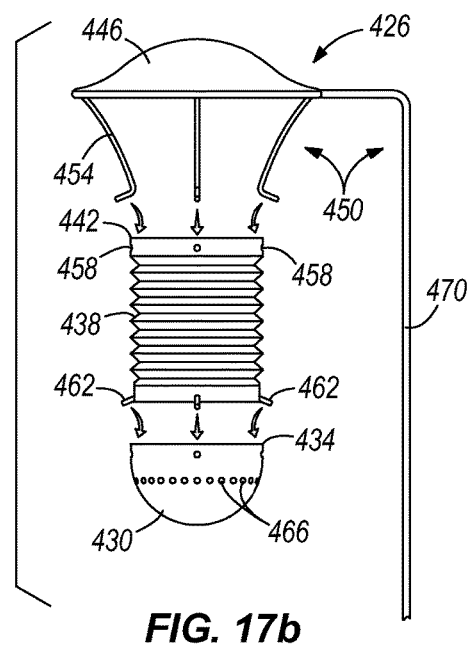

FIGS. 17a and 17b illustrate a mosquito trap 426 according to a seventeenth embodiment of the invention. The mosquito trap 426 includes a container 430 having an open end 434 and an enclosure 438 protruding above the open end 434 of the container 430. The enclosure 438 is configured having a bellows shape that does not require any additional supporting structure. Accordingly, the enclosure 438 may be collapsible to facilitate shipping or transport of the mosquito trap 426. The enclosure 438 may be made from a folded, semi-rigid, pressed material (e.g., paperboard, palm fiberboard, hemp board, ligne board, or biofoam) to provide the bellows shape.

With continued reference to FIGS. 17*a* and 17*b*, a top edge of the enclosure 438 defines an opening 442 which allows access into the interior of the enclosure 438 and the open end 434 of the container 430. The mosquito trap 426 also includes a cover 446 at least partially positioned above the opening 442 and spaced from the opening 442 so as to not close the opening 442. The cover 446 is configured to deflect rain or any other falling liquid away from the opening 442 in the enclosure 438 to substantially prevent additional water or other liquid from accumulating in the container 430. The trap 426 further includes a frame 450, including a plurality of arms 454, interconnecting the cover 446 and the top of the enclosure 438. In the illustrated construction, the enclosure 438 includes a plurality of apertures 458 through which the arms 454 extend to suspend the enclosure 438 from the cover 446 and maintain the shape of the opening 442. Likewise, the enclosure 438 includes a plurality of hooks or hangers 462 extending from the bottom of the enclosure 438 from which the container 430 is suspended. The container 430 also includes a plurality of apertures 466 positioned beneath the open end 434 of the container 430 to provide an overflow drain, thereby effectively limiting the amount of water or other liquid that may be accumulated within the container 430.

The frame 450 also includes a pole 470 anchored to a horizontal support surface (e.g., staked in the ground) or a vertical support surface (e.g., mounted to a wall) to which the cover 446 and/or the plurality of arms 454 are attached.

The enclosure 438 also includes at least one active agent to facilitate attracting mosquitoes to the trap 426, killing them, or a combination thereof. The active agent may be either impregnated in the material used in making the enclosure 438, or the active agent may be applied to the enclosure 438 as a coating. The active agent includes those discussed above with respect to the mosquito trap 10 of FIGS. 1*a* and 1*b*.

The mosquito trap 426 also includes a composition comprising at least one active agent that is positioned in the container 430. The composition in the container 430 includes at least one active agent as described above with respect to the mosquito trap 10 of FIGS. 1*a* and 1*b*.

To assemble the mosquito trap 426 of FIGS. 17*a* and 17*b*, one would anchor the pole 470 in either a horizontal or vertical support surface as described above and then suspend the enclosure 438 from the arms 454 by inserting the arms 454 through the apertures 458 near the top of the enclosure 438. One would then remove the cover closing the open end 434 of the container 430 (if a cover is used) and suspend the container 430 from the bottom of the enclosure 438 using the hangers 462. A liquid solvent (e.g., water) is then added to the composition in the container 430 to create a solution containing the active agent. The usage of the mosquito trap 426 is substantially identical to the mosquito trap 10 of FIGS. 1*a* and 1*b*.

Figure 18A:
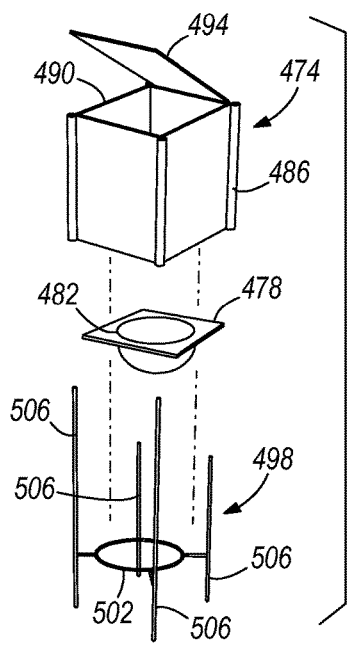
FIG. 18a illustrates an exploded view of a mosquito trap according to an eighteenth embodiment of the invention.
Figure 18B:
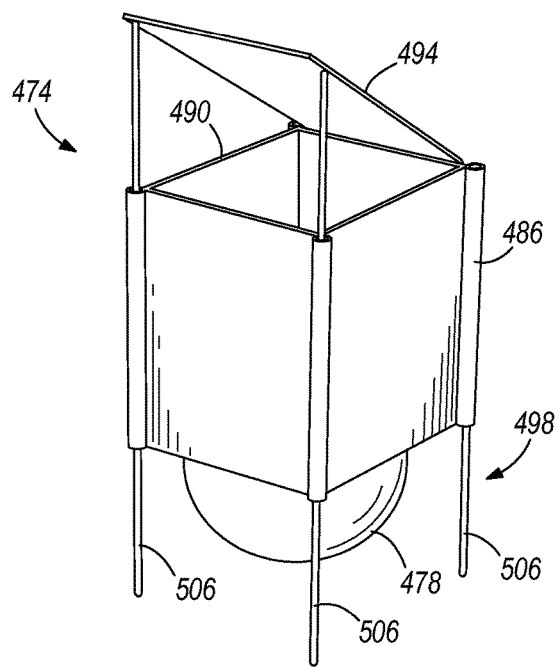

FIGS. 18*a* and 18*b* illustrate a mosquito trap 474 according to an eighteenth embodiment of the invention. The mosquito trap 474 includes a container 478 having an open end 482 and an enclosure 486 protruding above the open end 482 of the container 478. The enclosure 486 is made from a flexible textile (e.g., hemp, ramie, cotton, bamboo, or felt) having a plurality of vertical guide sleeves corresponding with each corner of the enclosure 486. A top edge of the enclosure 486 defines an opening 490 which allows access into the interior of the enclosure 486 and the open end 482 of the container 478. The mosquito trap 474 also includes a cover 494, integrally formed as a single piece with the enclosure 486, at least partially positioned above the opening 490 and spaced from the opening 490 so as to not close the opening 490. The cover 494 is configured to deflect rain or any other falling liquid away from the opening 490 in the enclosure 486 to substantially prevent additional water or other liquid from accumulating in the container 478.

The trap 474 further includes a frame 498 including a central mounting portion 502 for receiving and supporting the container 478 and a plurality of arms 506 extending substantially transversely to the central mounting portion 502. The lower portions of the respective arms 506 are anchored to a horizontal support surface (e.g., staked in the ground), while the upper portions of the arms 506 are received within the respective vertical guide sleeves of the enclosure 486. Accordingly, the container 478 and the enclosure 486 sit on top of the central mounting portion 502 and the container 478. Although not shown in FIG. 18*a* or 18*b*, the container 478 may include a plurality of apertures positioned beneath the open end 482 of the container 478 to provide an overflow drain, thereby effectively limiting the amount of water or other liquid that may be accumulated within the container 478.

The enclosure 486 also includes at least one active agent to facilitate attracting mosquitoes to the trap 474, killing them, or a combination thereof. The active agent may be either impregnated in the material used in making the enclosure 486, or the active agent may be applied to the enclosure 486 as a coating. The active agent includes those discussed above with respect to the mosquito trap 10 of FIGS. 1*a* and 1*b*.

The mosquito trap 474 also includes a composition comprising at least one active agent that is positioned in the container 478. Although not shown, a removable cover (see, for example, the cover 542 in FIG. 19*c*) may be employed to seal the open end 482 of the container 478 prior to assembly of the mosquito trap 474. The composition in the container 478 includes at least one active agent as described above with respect to the mosquito trap 10 of FIGS. 1*a* and 1*b*.

To assemble the mosquito trap 474 of FIGS. 18*a* and 18*b*, one would anchor the bottom portions of the arms 506 in a horizontal support surface (e.g., the ground) as described above and then insert the container within the central mounting portion 502. One would then remove the cover closing the open end 482 of the container 478 (if a cover is used) and add a liquid solvent (e.g., water) to the composition in the container 478 to create a solution containing the active agent. Lastly, the upper portions of the arms 506 would be inserted through the respective vertical guide sleeves on the enclosure 486 to suspend the enclosure 486 on the frame 498 relative to the horizontal support surface. The usage of the mosquito trap 474 is substantially identical to the mosquito trap 10 of FIGS. 1*a* and 1*b*.

Figure 19B:
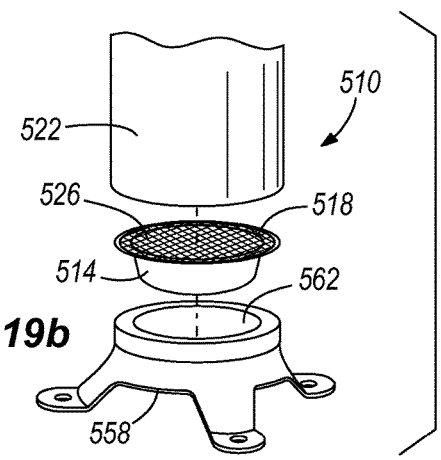
Figure 19C:
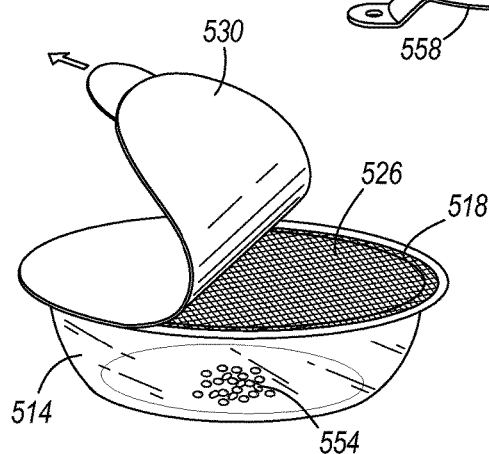
Figure 19A:
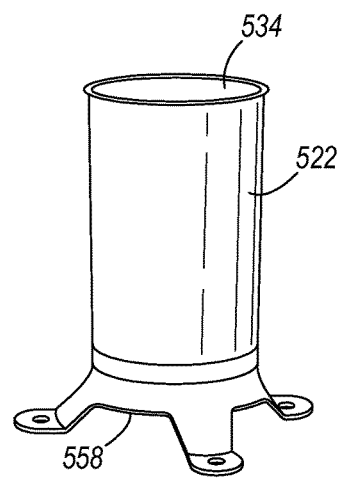
FIG. 19a illustrates a mosquito trap according to a nineteenth embodiment of the invention.

FIGS. 19*a* and 19*b* illustrate a mosquito trap 510 according to a nineteenth embodiment of the invention. The mosquito trap 510 includes a container 514 having an open end 518 and an enclosure 522 protruding above the open end 518 of the container 514. As shown in FIG. 19*c*, the container 514 includes a porous screen 526 positioned over the open end 518 of the container 514 and a removable cover 530 employed to seal the open end 518 of the container 514 prior to assembly of the mosquito trap 510. The enclosure 522 is made from a material that is sufficiently rigid to maintain its shape without any additional supporting structure. For example, the enclosure 522 may be made from a semi-rigid, pressed material (e.g., paperboard, palm fiberboard, hemp board, ligne board, biofoam, a biodegradable molded paper, or a plant fiber composite).

With reference to FIG. 19a, a top edge of the enclosure 522 defines an opening 534 which allows access into the interior of the enclosure 522 and the open end 518 of the container 514. The mosquito trap 510 may include a cover (see, for example, the cover 156 in FIG. 24) at least partially positioned above the opening 534 and spaced from the opening 534 so as to not close the opening 534. Such a cover would be configured to deflect rain or any other falling liquid away from the opening 534 in the enclosure 522 to substantially prevent additional water or other liquid from accumulating in the container 514. Although not shown in FIGS. 19a-19c, the container 514 may also include one or more apertures (see, for example, the apertures 334 in FIGS. 13a and 13b) positioned beneath the open end 518 of the container 514 to provide an overflow drain, thereby effectively limiting the amount of water or other liquid that may be accumulated within the container 514.

Figure 20A:
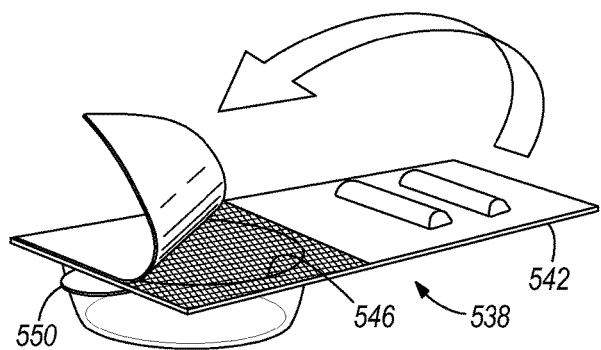
FIGS. 20a and 20b illustrate a container including at least one of a toxic agent and an attractant for use with any of the mosquito traps in FIGS. 1a-19b.
Figure 20B:
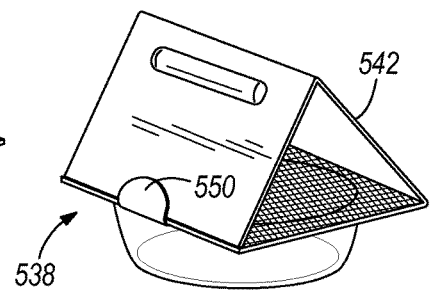

Alternatively, the trap 510 may utilize the container 538 illustrated in FIGS. 20a and 20b rather than the container 514 in FIG. 19c. The container 538 of FIGS. 20a and 20b includes a cover 542 integrally formed as a single piece with the container 538. The cover 542 is foldable into an inverted "V" shape, and is at least partially positioned above an open end 546 of the container 538 and spaced from the open end 546 so as to not close the open end 546. An adhesive strip or tab 550 is used to secure the cover 542 in the inverted "V" shape shown in the right-side image in FIG. 20. Alternatively, the container 538 of FIGS. 20a and 20b may be utilized with other embodiments of the mosquito trap disclosed herein.

With reference to FIGS. 19a and 19b, the enclosure 522 includes at least one active agent to facilitate attracting mosquitoes to the trap 510, killing them, or a combination thereof. The active agent may be either impregnated in the material used in making the enclosure 522, or the active agent may be applied to the enclosure 522 as a coating. The active agent includes those discussed above with respect to the mosquito trap 10 of FIGS. 1a and 1b.

The mosquito trap 510 also includes a composition comprising at least one active agent that is positioned in the container 514. The composition in the container 514 includes at least one active agent as described above with respect to the mosquito trap 10 of FIGS. 1a and 1b.

Figure 26:
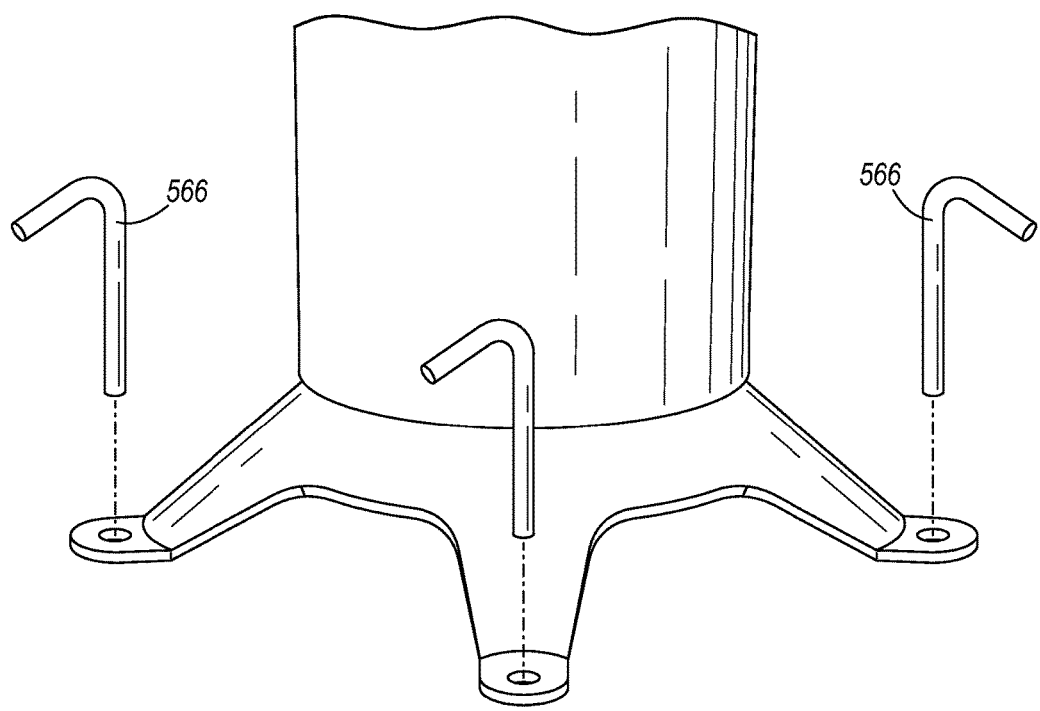
FIG. 26 illustrates a plurality of stakes configured for use with some of the mosquito traps in FIGS. 1a-23.

With reference to FIGS. 19a and 19b, the mosquito trap 510 further includes a base 558 supporting the container 514 relative to a horizontal support surface (e.g., the ground). In the illustrated construction of the trap 510, the base 558 includes an aperture 562 (FIG. 19b) in which the container 514 is at least partially positioned, and the enclosure 522 is supported by the base 558 relative to the horizontal support surface. Alternatively, the base 558 may include a recess within which to at least partially receive the container 514. The base 558 may be anchored to the horizontal support surface using a plurality of anchors or stakes 566 (see FIG. 26).

To assemble the mosquito trap 510 of FIGS. 19a and 19b, one would remove the cover closing the open end 518 of the container (if a cover is used) and insert the container 514 within the aperture 562 in the base 558. A liquid solvent (e.g., water) is then added to the pellets 554 in the container 514 to dissolve the pellets 554 and create a solution containing the active agent. The enclosure 522 is then inserted over the container 514 and a portion of the base 558 and secured to the base 558 using an interference fit with the base 558. The stakes 566 may be driven into the horizontal support surface at any time after the base 558 is positioned in its final location. The usage of the mosquito trap 510 is substantially identical to the mosquito trap 10 of FIGS. 1a and 1b.

Figure 21:
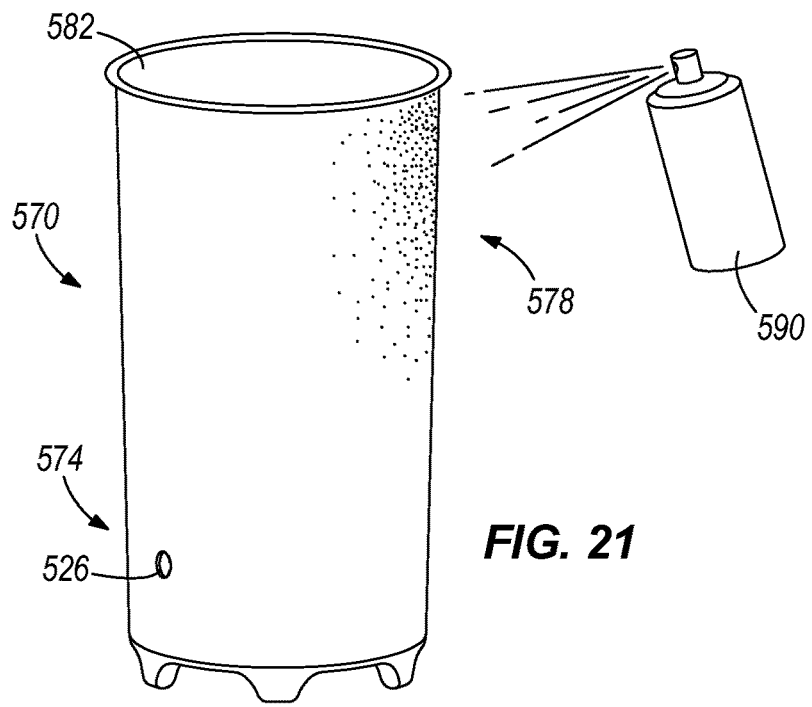
FIG. 21 illustrates a mosquito trap according to a twentieth embodiment of the invention.

FIG. 21 illustrates a mosquito trap 570 according to a twentieth embodiment of the invention. Rather than including a separate container and an enclosure like some of the other mosquito traps disclosed herein, the mosquito trap 570 in FIG. 21 includes a container 574 and an enclosure 578 that are integrally formed as a single piece. In this manner, a bottom portion of the mosquito trap 570 that contains the active agent solution can be considered the container 574, while an upper portion of the mosquito trap 570 protruding above the solution can be considered the enclosure 578. The mosquito trap 570 may be made from a semi-rigid, lightweight, pressed material (e.g., paperboard, palm fiberboard, hemp board, ligne board, biofoam, a biodegradable molded paper, or a plant fiber composite) covered with a water-resistant coating to improve the durability of the mosquito trap 570 when situated in the outdoors. Alternatively, the mosquito trap 570 may be made from a rigid, molded material (e.g., a wood-filled plastic, cellulose, bio-HDPE, a plant-based resin, a polyactide, or a starch-based resin).

With continued reference to FIG. 21, a top edge of the enclosure 578 defines an opening 582 which allows access into the interior of the enclosure 578 and the container 574. The mosquito trap 570 may include a cover (see, for example, the cover 156 in FIG. 24) at least partially positioned above the opening 582 and spaced from the opening 582 so as to not close the opening 582. Such a cover would be configured to deflect rain or any other falling liquid away from the opening 582 in the enclosure 578 to substantially prevent additional water or other liquid from accumulating in the container 574. The container 574 also includes an aperture 586 to provide an overflow drain, thereby effectively limiting the amount of water or other liquid that may be accumulated within the container 574.

The enclosure 578 also includes at least one active agent to facilitate attracting mosquitoes to the trap 570, killing them, or a combination thereof. The active agent may be either impregnated in the material used in making the enclosure 578, or the active agent may be applied to the enclosure 578 as a coating. The active agent includes those discussed above with respect to the mosquito trap 10 of FIGS. 1a and 1b. In addition, additional active agents may be periodically applied to the enclosure 578 in the form of a spray coating from a spray can 590. The active agent spray coating may be configured to fade over time to provide an indicator of the efficacy of the active agent. Alternatively, additional active agents applied to the enclosure 578 in liquid form using a brush.

The mosquito trap 570 also includes a composition comprising at least one active agent that is positioned in the container 574. The material in the container 574 includes at least one active agent as described above with respect to the mosquito trap 10 of FIGS. 1a and 1b.

To assemble the mosquito trap 570 of FIG. 21, one would add a liquid solvent (e.g., water) to the composition in the container 574 to create a solution containing the active agent. The active agent spray coating may be periodically re-applied as necessary. The usage of the mosquito trap 570 is substantially identical to the mosquito trap 10 of FIGS. 1a and 1b.

Figure 22:
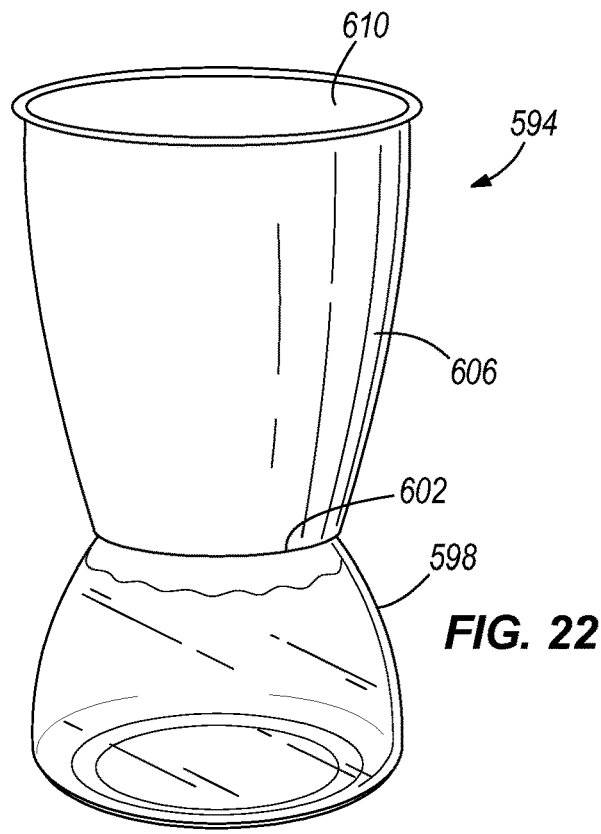
FIG. 22 illustrates a mosquito trap according to a twenty-first embodiment of the invention.

FIG. 22 illustrates a mosquito trap 594 according to a twenty-first embodiment of the invention. The mosquito trap 594 includes a container 598 having an open end 602 and an enclosure 606 protruding above the open end 602 of the container 598. The enclosure 606 is made from a material that is sufficiently rigid to maintain its shape without any additional supporting structure. For example, the enclosure 606 may be made from a semi-rigid, pressed material (e.g., paperboard, palm fiberboard, hemp board, ligne board, biofoam, a biodegradable molded paper, or a plant fiber composite).

With continued reference to FIG. 22, a top edge of the enclosure 606 defines an opening 610 which allows access into the interior of the enclosure 606 and the open end 602 of the container 598. The mosquito trap 594 may include a cover (see, for example, the cover 156 in FIG. 24) at least partially positioned above the opening 610 and spaced from the opening 610 so as to not close the opening 610. Such a cover would be configured to deflect rain or any other falling liquid away from the opening 610 in the enclosure 606 to substantially prevent additional water or other liquid from accumulating in the container 598. Although not shown in FIG. 22, the container 598 may also include one or more apertures (see, for example, the apertures 334 in FIGS. 13a and 13b) positioned beneath the open end 602 of the container 598 to provide an overflow drain, thereby effectively limiting the amount of water or other liquid that may be accumulated within the container 598.

The enclosure 606 also includes at least one active agent to facilitate attracting mosquitoes to the trap 594, killing them, or a combination thereof. The active agent may be either impregnated in the material used in making the enclosure 606, or the active agent may be applied to the enclosure 606 as a coating. The active agent includes those discussed above with respect to the mosquito trap 10 of FIGS. 1a and 1b.

The mosquito trap 594 also includes a composition comprising at least one active agent, positioned in the container 598. At least a portion of the container 598 is translucent to facilitate viewing the solution created when a liquid solvent (e.g., water) is added to the composition. In the illustrated construction of the mosquito trap 594, the entire container 598 is made from a transparent material to facilitate monitoring the level of the solution in the container 598. Alternatively, the container 598 may include a transparent or translucent viewing window through which the level of the solution may be monitored. Although not shown, a removable cover (see, for example, the cover 542 in FIG. 19c) may be employed to seal the open end 602 of the container 598 prior to assembly of the mosquito trap 594. The composition in the container 598 includes at least one active agent as described above with respect to the mosquito trap 10 of FIGS. 1a and 1b.

To assemble the mosquito trap 594 of FIG. 22, one would remove the cover closing the open end 602 of the container 598 (if a cover is used) and add a liquid solvent (e.g., water) to the pellets in the container 598 to create a solution containing the active agent. The bottom of the enclosure 606 is then secured to the container 598 using an interference fit with the container 598. The usage of the mosquito trap 594 is substantially identical to the mosquito trap 10 of FIGS. 1a and 1b.

Figure 23:
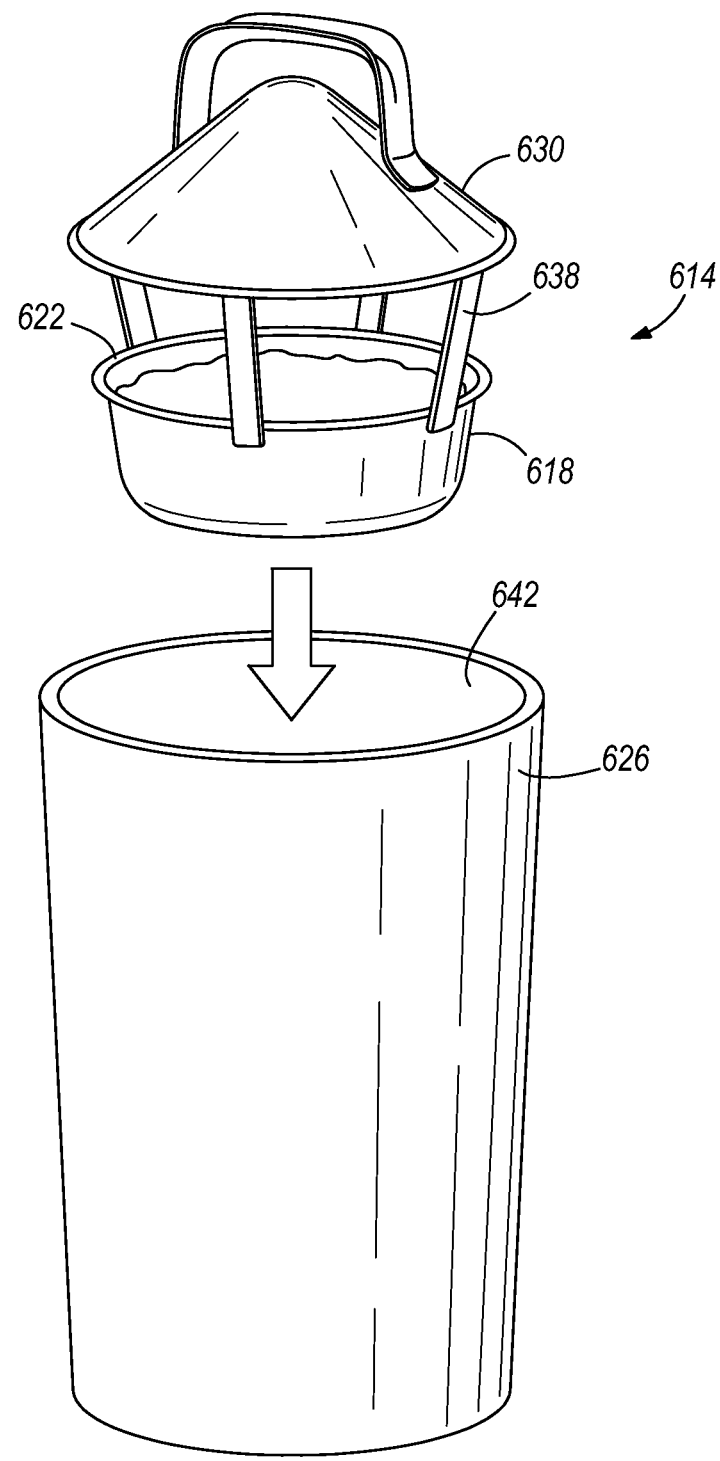
FIG. 23 illustrates a mosquito trap according to a twenty-second embodiment of the invention.

FIG. 23 illustrates a mosquito trap 614 according to a twenty-second embodiment of the invention. The mosquito trap 614 includes a container 618 having an open end 622 and an enclosure 626 protruding above the open end 622 of the container 618. The container 618 includes a cover 630 at least partially positioned above the open end 622 and spaced from the open end 622 by a plurality of arms 638 so as to not close the open end 622. The cover 630 is configured to deflect rain or any other falling liquid away from the open end 622 of the container 618 to substantially prevent additional water or other liquid from accumulating in the container 618. Although not shown in FIG. 23, the container 618 may also include one or more apertures (see, for example, the apertures 334 in FIGS. 13a and 13b) positioned beneath the open end 622 of the container 618 to provide an overflow drain, thereby effectively limiting the amount of water or other liquid that may be accumulated within the container 618.

The enclosure 626 includes a generally cylindrical shape and includes an opening 642 defined by a top edge of the enclosure 626 which allows access into the interior of the enclosure 626 and the open end 622 of the container 618. The enclosure 626 is made from a material that is sufficiently rigid to maintain its shape without any additional supporting structure. For example, the enclosure 626 may be made from a semi-rigid, pressed material (e.g., paperboard, palm fiberboard, hemp board, ligne board, biofoam, a biodegradable molded paper, or a plant fiber composite).

The enclosure 626 also includes at least one active agent to facilitate attracting mosquitoes to the trap 614, killing them, or a combination thereof. The active agent may be either impregnated in the material used in making the enclosure, or the active agent may be applied to the enclosure 626 as a coating. The active agent includes those discussed above with respect to the mosquito trap 10 of FIGS. 1a and 1b.

The mosquito trap 614 also includes a composition comprising at least one active agent, positioned in the container 618. Although not shown, a removable cover (see, for example, the cover 542 in FIG. 19c) may be employed to seal the open end 622 of the container 618 prior to assembly of the mosquito trap 614. The composition in the container 618 includes at least one active agent as described above with respect to the mosquito trap 10 of FIGS. 1a and 1b.

To assemble the mosquito trap 614 of FIG. 23, one would remove the cover closing the open end 622 of the container 618 (if a cover is used) and add a liquid solvent (e.g., water) to the pellets in the container 618 to create a solution containing the active agent. The container 618 is then positioned within the interior of the enclosure 626 and surrounded by the enclosure 626, such that the container 618 and the enclosure 626 are separately supportable by a common horizontal support surface (e.g., the ground). The usage of the mosquito trap 614 is substantially identical to the mosquito trap 10 of FIGS. 1a and 1b.

Figure 25B:
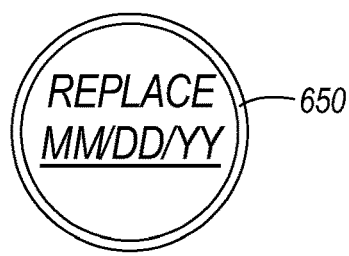
FIG. 25b illustrates an expiration label configured for use with any of the mosquito traps in FIGS. 1a-23.
Figure 25A:
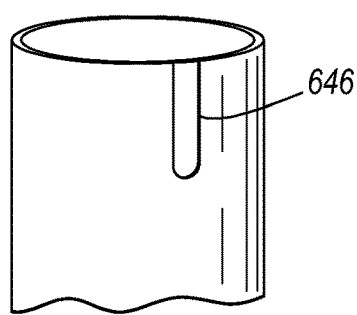
FIG. 25a illustrates an efficacy indicator configured for use with any of the mosquito traps in FIGS. 1a-23.

FIG. 25a illustrates an indicator 646 for coupling to the container of any of the mosquito traps disclosed herein. The indicator 646 is at least partially immersed in the active agent solution created in the containers and configured to visibly change in response to a change in efficacy of the active agent solution in the containers. Alternatively, the indicator 646 may be coupled to the enclosure of any of the mosquito traps disclosed herein. When used in this manner, the indicator 646 is configured to visibly change in response to a change in efficacy of the active agent on the enclosures. FIG. 25b illustrates an expiration label 650 coupled to at least one of the container and the enclosure of any of the mosquito traps disclosed herein for informing an individual when the active agent solution in the containers should be replaced, or when the enclosures of any of the mosquito traps disclosed herein should be replaced.

Figure 27:
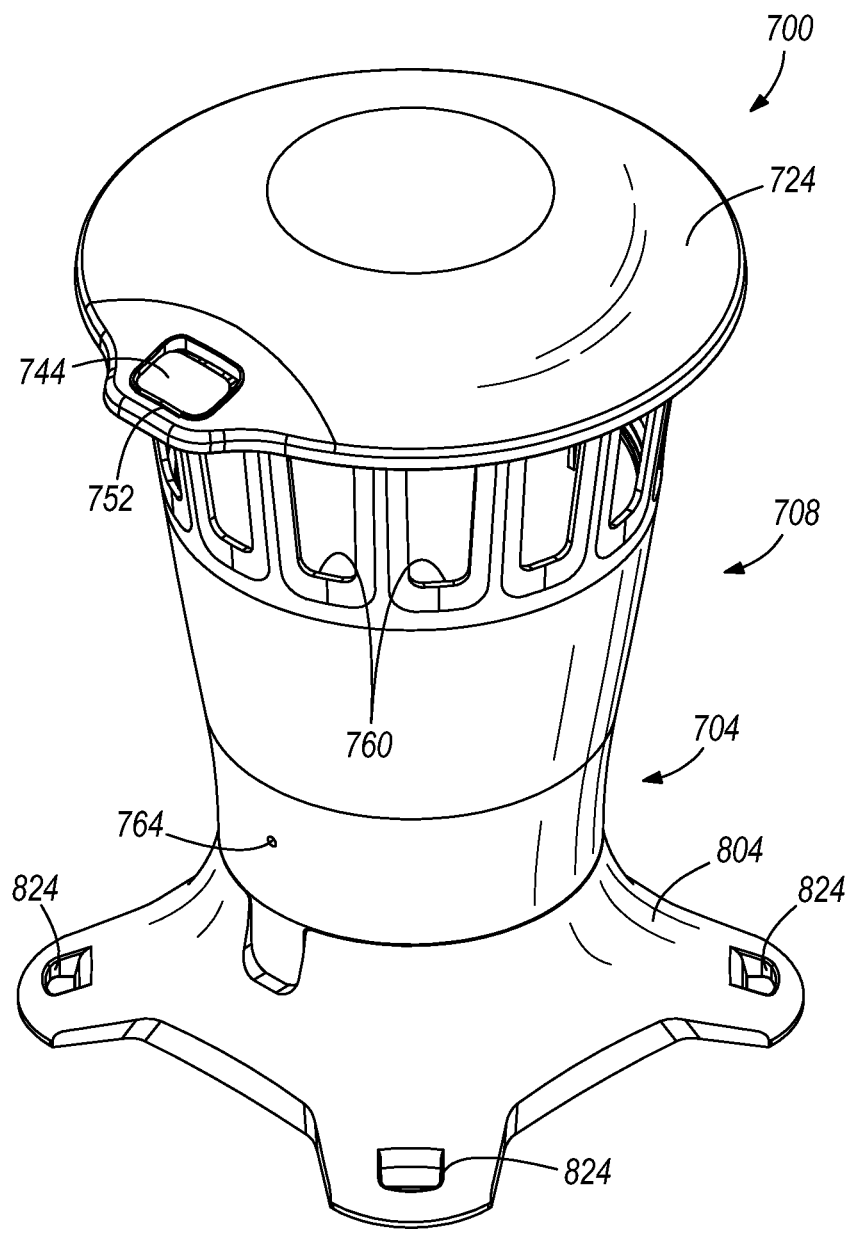
FIG. 27 illustrates a perspective view of a mosquito trap according to a twenty-third embodiment of the invention.
Figure 28:
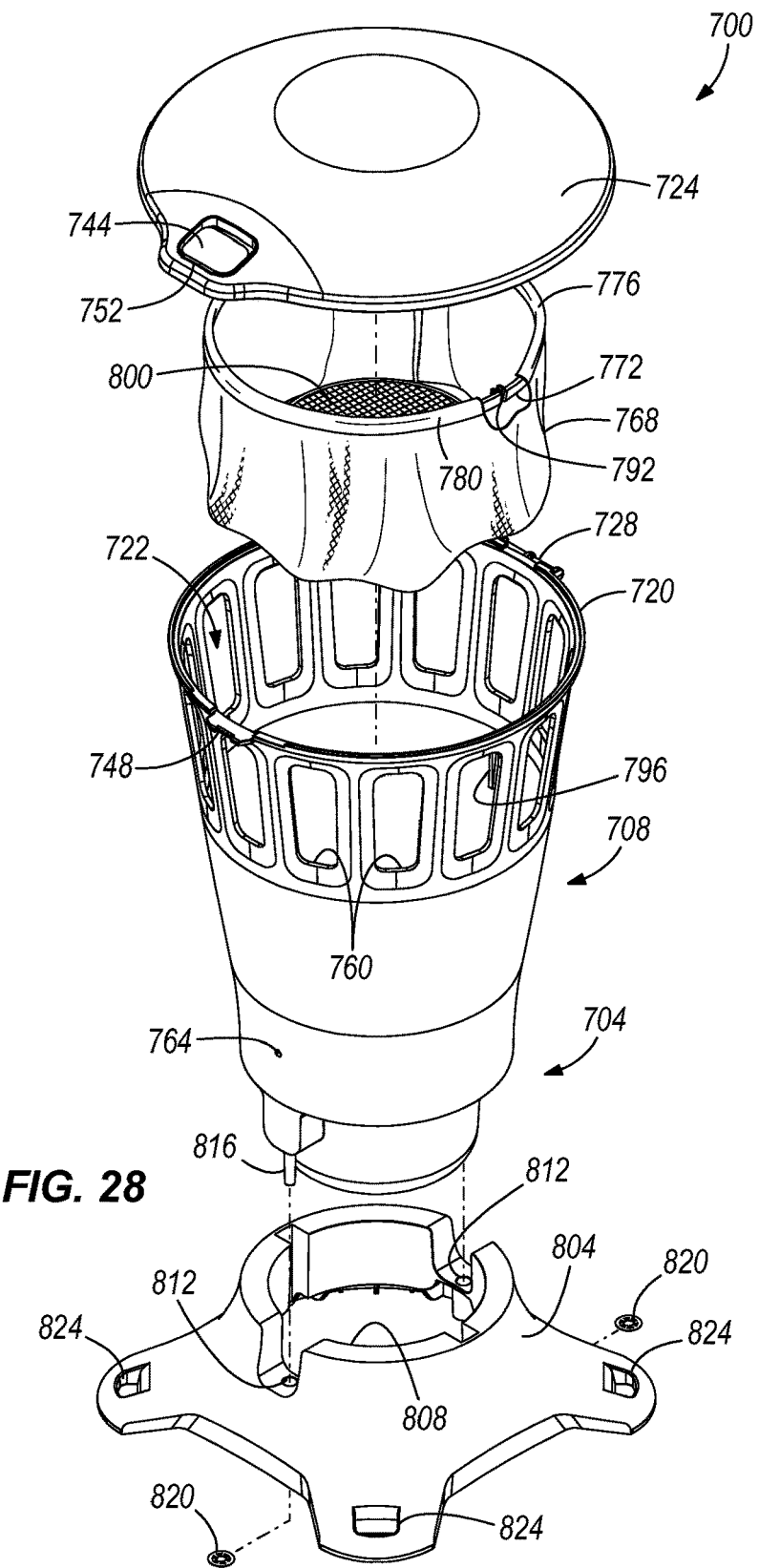
FIG. 28 illustrates an exploded view of the mosquito trap of FIG. 27.
Figure 29:
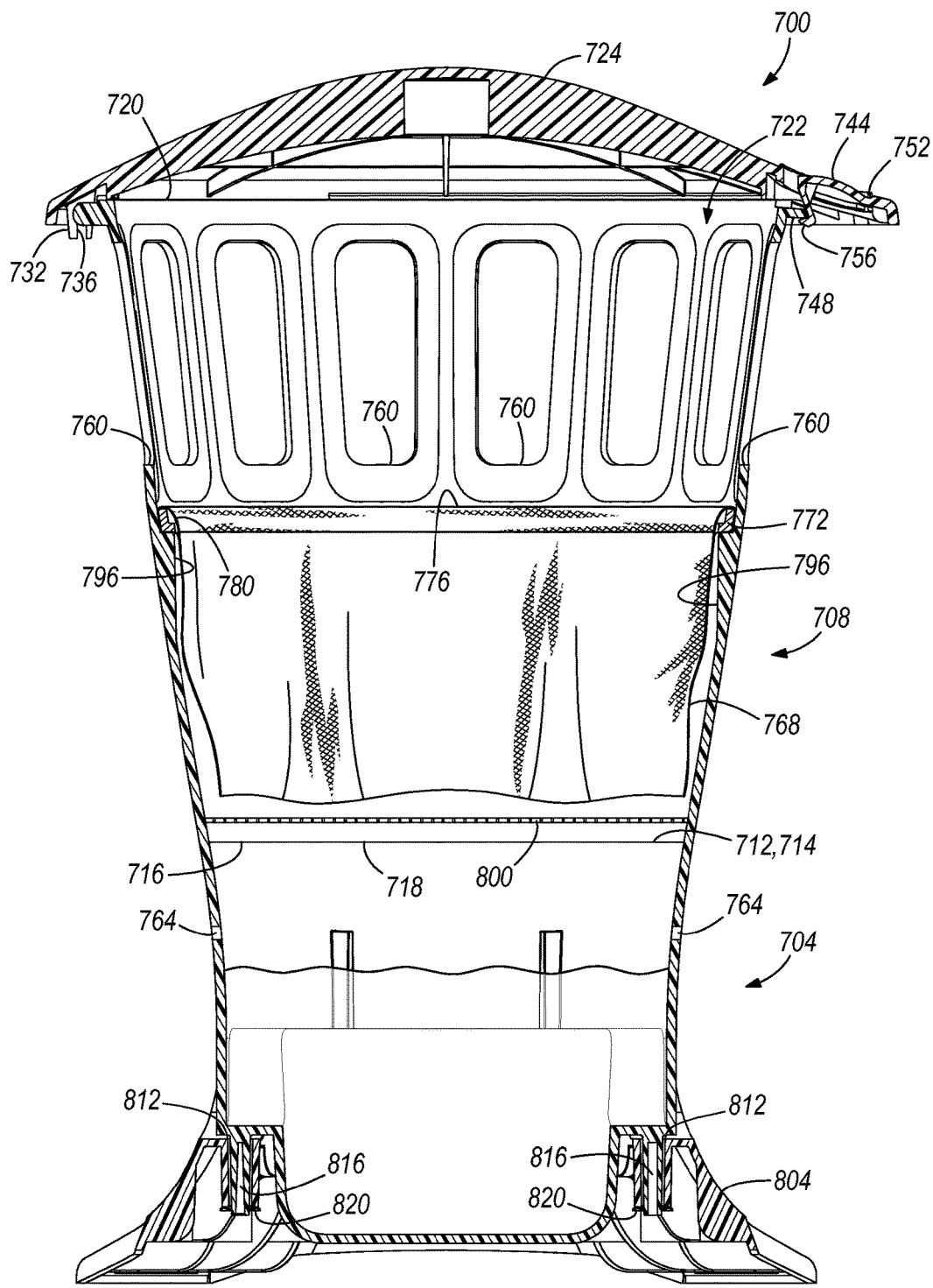
FIG. 29 illustrates a cross-sectional view of the mosquito trap of FIG. 27.

FIGS. 27-29 illustrate a mosquito trap 700 according to a twenty-third embodiment of the invention. The mosquito trap 700 includes a container 704 and an enclosure 708 that are integral with each other. In this manner, a bottom portion of the mosquito trap 700 that contains the active agent solution can be considered the container 704, while an upper portion of the mosquito trap 700 protruding above the solution can be considered the enclosure 708. In other words, a top edge 712 of the container 704 defines an open end 714 of the container 704 and is conjoined with a bottom edge 716 of the enclosure 708 (FIG. 29). The respective edges 712, 716, which coincide with a mold line 718 in FIG. 29, may or may not coincide with a physical edge demarcating the boundary between the container 704 and the enclosure 708. As such, the container 704 and the enclosure 708 may appear as a single, contiguous body without any physical markings or indicators suggesting the end of the container 704 and the beginning of the enclosure 708.

At least the bottom portion of the mosquito trap 700 may be made from a material that is substantially impermeable to water and other liquids to allow the active agent solution to be contained directly within the trap 700 without significantly degrading the bottom portion of the trap 700. In the illustrated construction of the trap 700, the container 704 and the enclosure 708 are integrally formed as a single piece from a sufficiently rigid material to maintain the respective shapes of the container 704 and the enclosure 708 without any additional supporting structure. For example, the container 704 and the enclosure 708 may be made from a plastic material (e.g., polypropylene). Alternatively, the container 704 and the enclosure 708 may be made from a semi-rigid, pressed material (e.g., paperboard, palm fiberboard, hemp board, ligne board, biofoam, a biodegradable molded paper, or a plant fiber composite). As a further alternative, the container 704 and the enclosure 708 may be made from a biodegradable plastic material (i.e., a "bioplastic" material), such as MIREL P1003 commercially available from Telles, LLC of Lowell, Mass., or CEREPLAST HYBRID-103 commercially available from Cereplast Inc. of El Segundo, Calif.

With reference to FIGS. 28 and 29, a top edge 720 of the enclosure 708 defines an opening 722 which allows access into the interior of the enclosure 708 and the open end 714 of the container 704. The mosquito trap 700 also includes a cover 724 pivotably coupled to the enclosure 708 to selectively close the opening 722. When in a closed position, the cover 724 closes the opening 722 and deflects rain or any other falling liquid away from the opening 722 in the enclosure 708 to substantially prevent additional water or other liquid from accumulating in the container 704. When in an open position (FIG. 30), the cover 724 is spaced from the opening 722 to provide access to the interiors of the enclosure 708 and the container 704, respectively. In the illustrated construction of the trap 700, the enclosure 708 includes an axle 728 located proximate the top edge 720 to which the cover 724 is pivotably coupled. The cover 724 includes two aligned fingers 732, each including a slot 736 within which the axle 728 is received. Each of the fingers 732 includes a ramped surface at least partially defining the slot 736 that is engaged by the axle 728 during the process of attaching the cover 724 to the enclosure 708, causing one side of each of the fingers 732 to resiliently deflect until the axle 728 is received within a circular portion 740 of each of the slots 736. After the axle 728 is received within the circular portion 740 of each of the slots 736, the fingers 732 resume their undeflected shape, thereby capturing the fingers 732 to the axle 728 and forming a hinge or pivot between the cover 724 and the enclosure 708. Alternatively, the locations of the axle 728 and the fingers 732 may be reversed such that the cover 724 may include the axle 728, and the enclosure 708 may include the fingers 732. As a further alternative, any of a number of different structural arrangements may be employed to provide a hinge or pivot between the cover 724 and the enclosure 708. The cover 724 may also be movable relative to the enclosure 708 in any of a number of different manners (e.g., by using a sliding arrangement, etc.).

Figure 30:
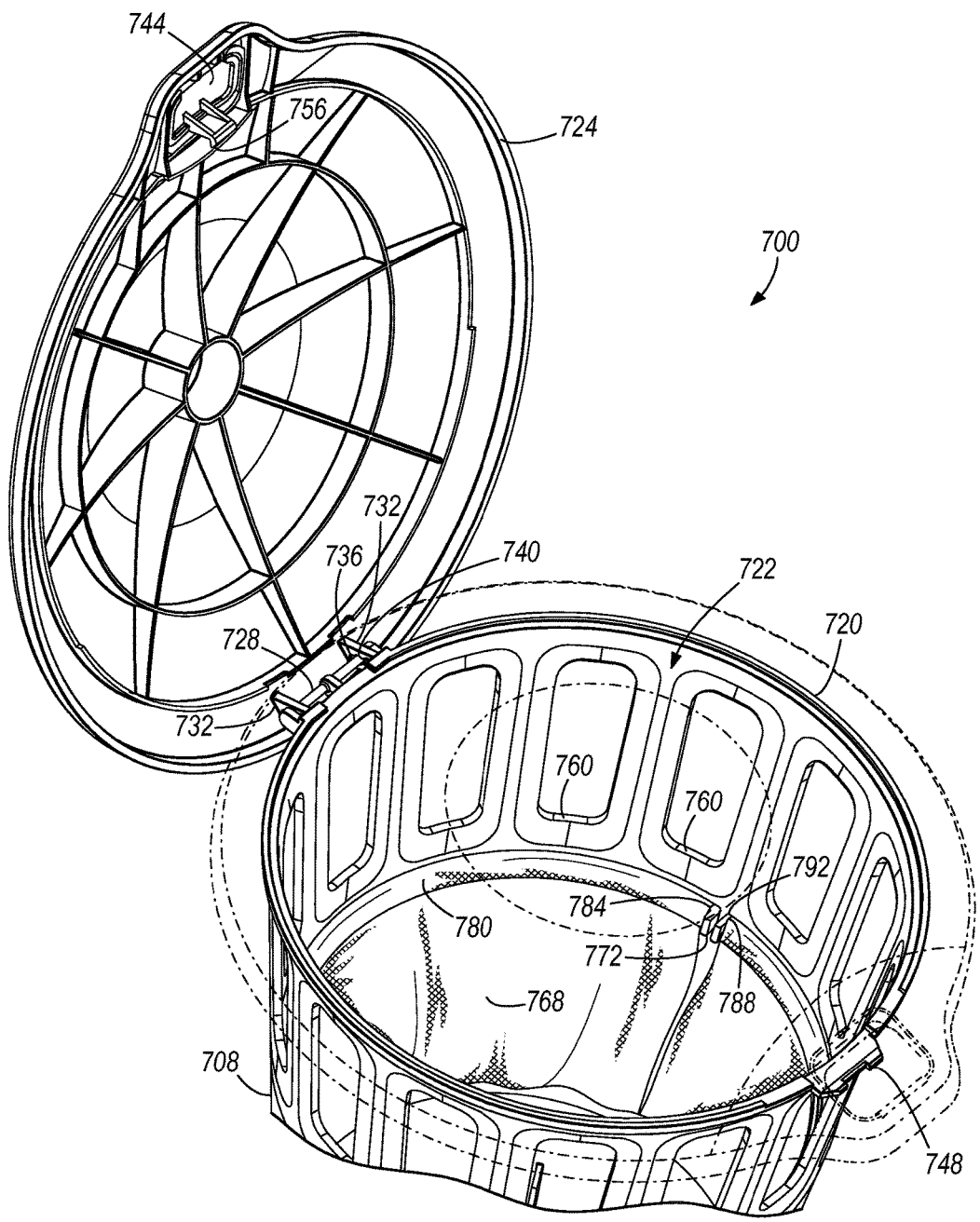
FIG. 30 illustrates an enlarged view of a portion of the mosquito trap of FIG. 27.

With continued reference to FIG. 30, the cover 724 includes a latch 744 that is engageable with a lip 748 proximate the top edge 720 of the enclosure 708 to secure the cover 724 in the closed position. In the illustrated construction of the trap 700, the latch 744 is integrally formed as a single piece with the cover 724 and coupled to the cover 724 by a living hinge 752 (FIG. 29). Alternatively, the latch 744 may be a separate and distinct component from the cover 724 that is attached using fasteners, adhesives, by welding, etc. To open the cover 724, one would first depress the latch 744 by an amount sufficient to clear the lip 748, then pivot the cover 724 toward the raised or open position. The latch 744 includes a ramped surface 756 engageable with the lip 748 when the cover 724 is lowered toward the closed position to resiliently deflect the latch 744 away from the lip 748, thereby permitting the cover 724 to be closed and secured to the enclosure 708 without separately or manually actuating the latch 744.

With reference to FIGS. 27-29, the enclosure 708 includes a plurality of openings 760 below the top edge 720 and spaced about the periphery of the enclosure 708 to provide mosquitos or other insects with access to the interiors of the enclosure 708 and the container 704, respectively, when the cover 724 is in the closed position.

With reference to FIG. 29, the container 704 includes an aperture 764 for providing an overflow drain, thereby effectively limiting the amount of water or other liquid that may be accumulated within the container 704. Although the open end 714 of the container 704 is schematically illustrated by the mold line 718, which is located above the aperture 764, the open end 714 of the container 704 may alternatively coincide with the location of the aperture 764 because the active agent solution in the container 704 cannot rise above the level of the aperture 764.

With reference to FIGS. 28 and 29, the enclosure 708 includes at least one active agent to facilitate attracting mosquitoes to the trap 700, killing them, or a combination thereof. In the illustrated construction of the trap 700, the active agent is provided by a net 768 supported within the enclosure 708. In the illustrated construction of the trap 700, the active agent is impregnated in the material of the net 768. Such a net 768 is commercially available under the trade name DURANET from Clarke Products of Roselle, Ill. Alternatively, the active agent may be either impregnated in the material used in making the enclosure 708, or the active agent may be applied to the enclosure 708 as a coating. The active agent includes those discussed above with respect to the mosquito trap 10 of FIGS. 1a and 1b.

Figure 31:
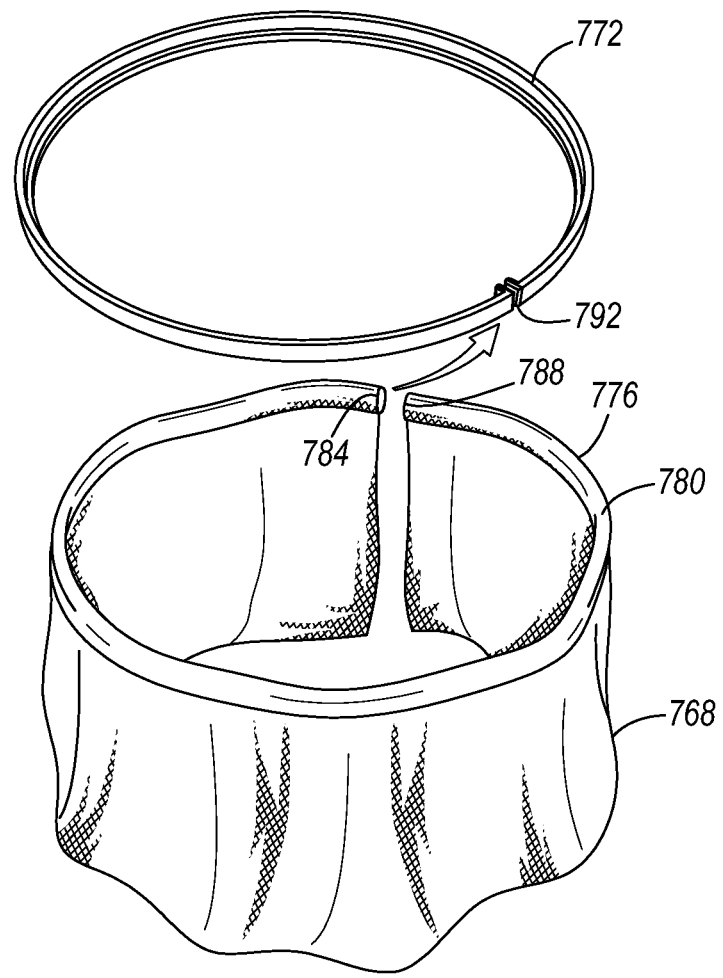
FIG. 31 illustrates an exploded view of an insecticide net and hoop of the mosquito trap of FIG. 27.

With reference to FIGS. 28 and 29, the mosquito trap 700 includes a hoop 772 coupled to a top edge 776 of the net 768 to support the net 768. In turn, both the hoop 772 and the net 768 are suspended within the interior of the enclosure 708. In the illustrated construction of the trap 700, the top edge 776 of the net 768 includes a loop 780 through which the hoop 772 is received to suspend the net 768 from the hoop 772 (FIG. 31). Particularly, the loop 780 is sewn or stitched into the net 768, which itself is sewn or stitched into a cylindrical shape from a rectangular piece of material. The loop 780 includes first and second ends 784, 788 between which the length of the loop 780 is defined. The hoop 772 includes a split 792 to permit the hoop 772 to be inserted through the first end 784 of the loop 780, and threaded or passed through the loop 780 along its length until the hoop 772 emerges from the second end 788 of the loop 780. Accordingly, the hoop 772 may be packaged separately from the net 768 with the remainder of the components of the trap 700, and subsequently assembled by the end user of the trap 700. Alternatively, the net 768 and hoop 772 may be pre-assembled from the manufacturer.

With reference to FIG. 29, the enclosure 708 includes a plurality of radially inwardly extending ribs 796 upon which the hoop 772 is supported. The ribs 796 are located high enough on the enclosure 708 to maintain the lower edge of the net 768 above the level of active agent solution in the container 704. Alternatively, the ribs 796 may be omitted, and the hoop 772 may be sized appropriately to provide an interference fit with the enclosure 708 to suspend the hoop 772 and the net 768 above the level of active agent solution in the container 704.

Optionally, the mosquito trap 700 may include a screen 800 positioned within the enclosure 708 above the open end 714 of the container 704 (FIGS. 28 and 29). The screen 800 includes an adhesive to trap mosquitos or other insects within the trap 700 to provide an indicator as to the number of mosquitos visiting the trap 700. As shown in FIG. 29, the screen 800 is located above the level of the active agent solution, and below the net 768. In the illustrated construction of the trap 700, the screen 800 includes a circular shape sized slightly smaller than the cross-sectional shape of the container 704 proximate the open end 714 of the container 704. As such, the screen 800 may be nested within the container 704 without requiring dedicated support structure on the container 704.

As previously alluded, the mosquito trap 700 also includes a composition comprising at least one active agent that is positioned in the container 704. The composition in the container 704 includes at least one active agent as described above with respect to the mosquito trap 10 of FIGS. 1a and 1b.

With reference to FIGS. 27-29, the mosquito trap 700 further includes a base 804 supporting the container 704 and the enclosure 708 relative to a horizontal support surface (e.g., the ground). In the illustrated construction of the trap 700, the base 804 includes a central aperture 808 (FIGS. 28 and 29) in which a lower portion of the container 704 is at least partially positioned. The base 804 also includes two additional apertures 812 through which respective posts 816 on the container 704 extend (FIG. 29). Respective retainer clips 820 are secured to the posts 816 to inhibit withdrawal of the posts 816 from the respective apertures 812, thereby effectively semi-permanently securing the container 704 and the enclosure 708 to the base 804. Alternatively, any of a number of different structural arrangements may be employed to fasten the container 704 and the enclosure 708 to the base 804. As a further alternative, the trap 700 may include quick-release structure to enable the container 704 and the enclosure 708 to be removed from the base 800, which may or may not be anchored to a horizontal support surface, to facilitate cleaning and reloading the trap 700. The base 804 includes a plurality of apertures 824 through which respective anchors or stakes 566 (see FIG. 26) are driven to secure the base 804 to the horizontal support surface.

To assemble the mosquito trap 700 of FIGS. 27-29, one would insert the active agent composition into the container 704 and add a liquid solvent (e.g., water) to dissolve the active agent composition (which, as discussed above, may take the form of pellets) and create a solution containing the active agent. Alternatively, the active agent composition may be provided in a porous bag (i.e., resembling a tea bag), and the bag may be positioned in the container 704 and immersed in the liquid solvent. Such a porous bag containing the active agent composition would facilitate cleaning and reloading the trap 700. The screen 800 is then optionally positioned within the container 704 above the level of the active agent solution. The net 768 and hoop 772 are pre-assembled as discussed above, and then suspended within the interior of the enclosure 708 by supporting the hoop 772 on the ribs 796. The base 804 and the cover 724 may be assembled to the container 704 and the enclosure 708, as discussed above, prior or subsequent to adding the active agent composition and the liquid solvent to the container 704. The stakes 566 (FIG. 26) may be driven into the horizontal support surface at any time after the trap 700 is positioned in its final location. The usage of the mosquito trap 700 is substantially identical to the mosquito trap 10 of FIGS. 1a and 1b.

Embodiments of the invention are further detailed in the examples below.

EXAMPLES

Example 1: Lethal Ovitraps Versus Alternative Oviposition Sites

Figure 32:
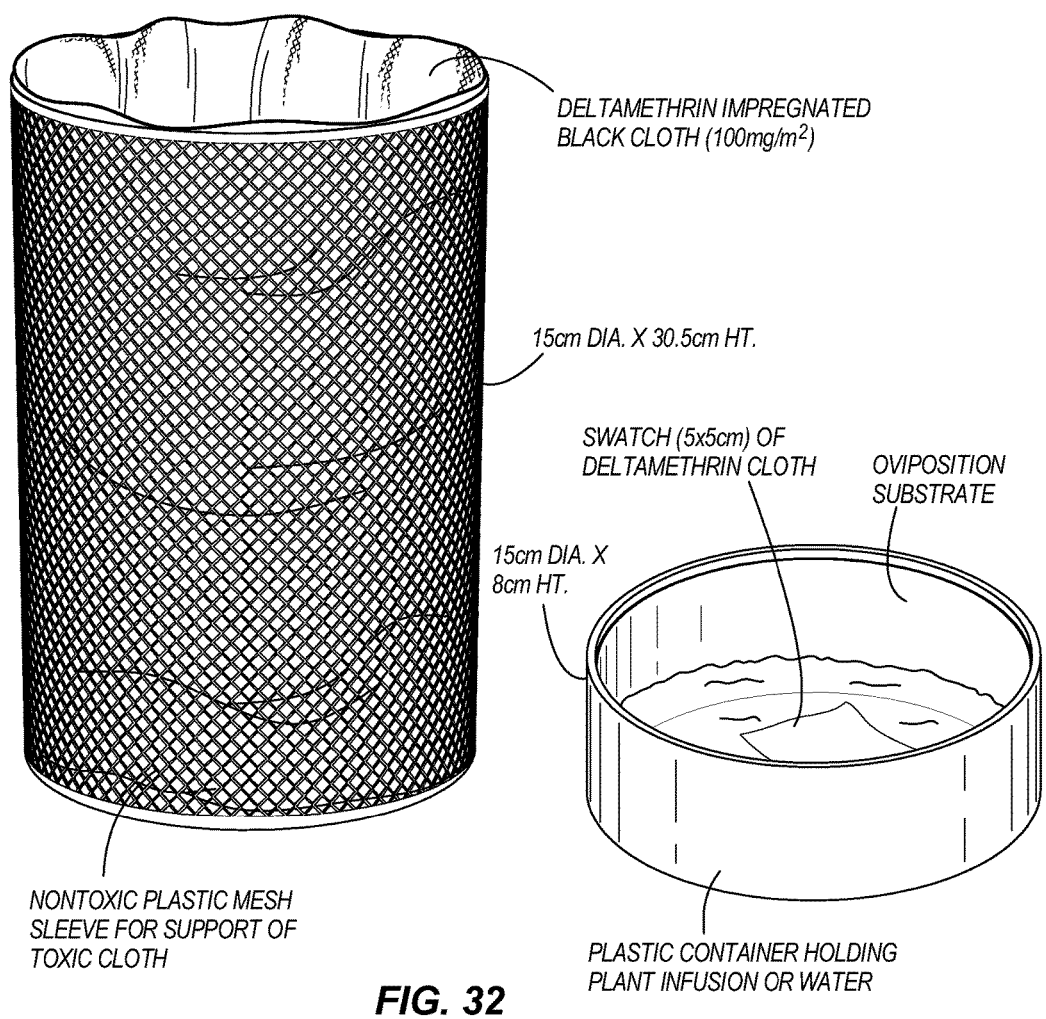
FIG. 32 illustrates parts of a mosquito trap examined in Example 1.

Mosquito traps with pieces as shown in FIG. 32 were tested against alternative oviposition sites. Each trap included a non-toxic plastic mesh sleeve for support of a toxic fabric or cloth. The toxic cloth was impregnated with deltamethrin, a toxic agent, at a concentration of approximately 100 mg/m$^2$. The mesh sleeve and toxic cloth were rolled to form a cylinder of 15 cm diameter and 30.5 cm height. The trap further included a plastic container (15 cm diameter and 8 cm height) filled with approximately 500 mL to 900 mL of 1× bamboo leaf (8.4 g of senescent leaves per liter of well water) infusion in water and a 2-inch by 2-inch swatch of cloth impregnated with deltamethrin at a concentration of approximately 100 mg/m$^2$. The traps were placed on a roof top where they were exposed to full sun and weather elements to age them. On a weekly basis for 12 consecutive weeks, four traps were transferred from the roof top and one trap was placed in the center of each of 4 walk-in cages. Each cage (4 m long by 4 m wide by 2 m tall) was constructed with a wooden frame covered with a translucent polypropylene net fabric and covered with white bed sheets with an outer layer of black plastic. Dual bulb fluorescent lights were placed in each corner of the walk-in cage, and crepuscular light was provided by a single incandescent bulb. Also placed in each of the four corners of each walk-in cage were four alternative oviposition sites. Each alternative oviposition site was a black can (1-gallon nominal) filled with 600 mL of well water. All lethal oviposition traps and alternative oviposition sites included a strip of paper that acted as an oviposition strip. After the lethal oviposition trap was transferred to the center of the cage, 50 gravid *Aedes aegypti* gravid mosquitoes (blood-fed 4 days before) were transferred into each walk-in cage for 24 h. After 24 h, all mosquitoes were collected, including ones in the traps, on the floor, dead or alive. All mosquitoes were dissected, and eggs were counted. All eggs on the oviposition strips were also counted. The traps were evaluated initially and then each week afterward, another set of four traps were removed and tested, resulting in traps being aged for a total of 12 weeks.

Figure 33:
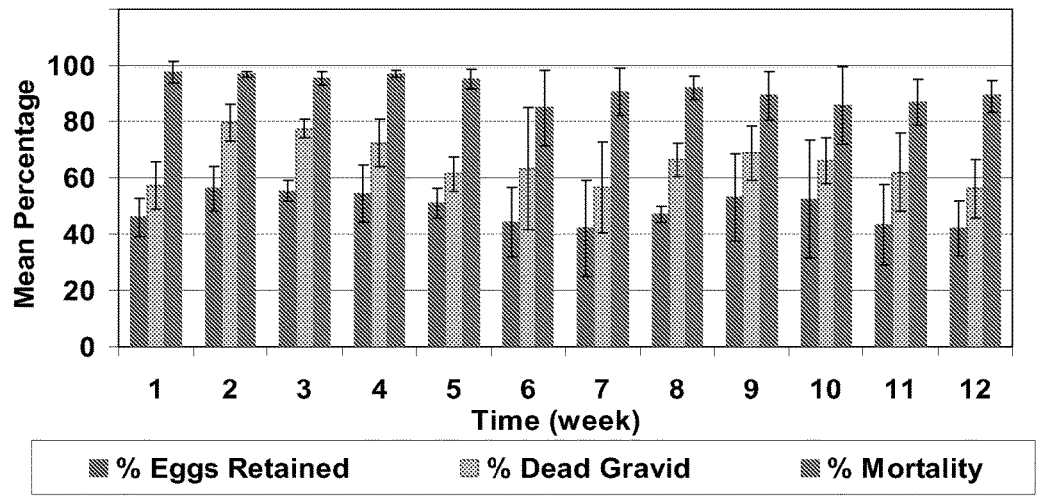
FIG. 33 is a graph of the mean percentage of mosquito eggs retained, the mean percentage of trapped mosquitoes that were gravid, and the mean percentage of mosquito mortality over the course of 12 weeks using the trap illustrated in FIG. 32.

Results of the 12-week experiment are shown in FIG. 33. As shown, the traps effectively killed mosquitoes and were stable outdoors over a 12 week period. The oviposition traps diverted a large percentage of gravid mosquitoes from laying eggs in the alternative oviposition containers.

Example 2: Lethal Oviposition Traps With and Without a Toxic Strip

Mosquito traps similar to those described in Example 1 were tested against alternative oviposition sites. Each trap included a non-toxic plastic mesh sleeve for support of a toxic cloth. The toxic cloth was impregnated with deltamethrin at a concentration of approximately 100 mg/m$^2$. The mesh sleeve and toxic cloth were rolled to form a cylinder of 15 cm diameter and 30.5 cm height. The trap further included a plastic container (15 cm diameter and 8 cm height) filled with approximately 500 mL to 900 mL of 0.5× white oak leaf infusion in water (4.2 g of senescent leaves per liter of well water), with or without a 2-inch by 2-inch swatch of mesh impregnated with deltamethrin at a concentration of approximately 100 mg/m$^2$. A trap was placed in the middle of a walk-in cage. Each cage (4 m long by 4 m wide by 2 m tall) was constructed with a wooden frame covered with a translucent polypropylene net fabric and covered with white bed sheets with an outer layer of black plastic. Dual bulb fluorescent lights were placed in each corner of the walk-in cage, and crepuscular light was provided by a single incandescent bulb. Also placed in each of the four corners of the walk-in cage were four alternative oviposition sites. Each alternative oviposition site was a black can filled with 600 mL of well water. All traps and alternative oviposition sites included a strip of paper that acted as an oviposition strip. In each of 4 walk-in cages, 50 gravid *Aedes aegypti* mosquitoes (blood-fed 4 days before) were released for 24 h. After 24 h, all mosquitoes were collected, including ones in the traps, on the floor, dead or alive. All mosquitoes were dissected, and eggs were counted. All eggs on the oviposition strips were also counted.

Figure 34:
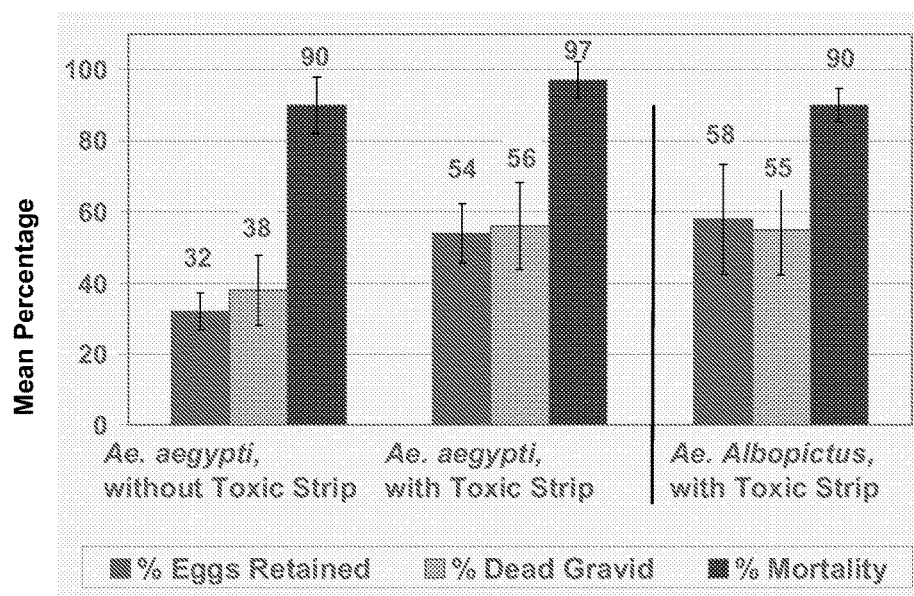
FIG. 34 is a graph of the mean percentage of mosquito eggs retained, the mean percentage of trapped mosquitoes that were gravid, and the mean percentage of mosquito mortality using a mosquito trap with and without a toxic strip in the water.

Results of the experiment are shown in FIG. 34. As shown, the traps more effectively killed mosquitoes when the toxic strip was included in the plastic container with the white oak leaf infusion in water.

Example 3: Lethal Oviposition Traps Versus Common Backyard Containers

Mosquito traps similar to those described in Example 1 were tested against common backyard containers as alternative oviposition sites. Each trap included a non-toxic plastic mesh sleeve for support of a toxic cloth. The toxic cloth was impregnated with deltamethrin at a concentration of approximately 100 mg/m$^2$. The mesh sleeve and toxic cloth were rolled to form a cylinder of 15 cm diameter and 30.5 cm height. The trap further included a plastic container (15 cm diameter and 8 cm height) filled with approximately 500 mL of 0.5× white oak leaf infusion in water (4.2 g senescent leaves per liter of water). One trap was placed in the middle of a walk-in cage. Each cage (4 m long by 4 m wide by 2 m tall) was constructed with a wooden frame covered with a translucent polypropylene net fabric and covered with white bed sheets with an outer layer of black plastic. Dual bulb fluorescent lights were placed in each corner of the walk-in cage, and crepuscular light was provided by a single incandescent bulb. Also placed in each of the four corners of the walk-in cage were four common backyard containers as alternative oviposition sites. The alternative oviposition sites included a terra cotta plant pot dish filled with 250 mL well water, a red plastic cup filled with 200 mL well water, a stainless steel bowl filled with 600 mL well water, and a white plastic food storage container filled with 300 mL well water. All traps and alternative oviposition sites included a strip of paper that acted as an oviposition strip. 50 gravid *Aedes aegypti* mosquitoes (blood-fed 4-5 days before) were released into the walk-in cage for 24 h. After 24 h, all mosquitoes were collected, including ones in the traps, on the floor, dead or alive. All mosquitoes were dissected, and eggs were counted. All eggs on the oviposition strips were also counted.

Figure 35:
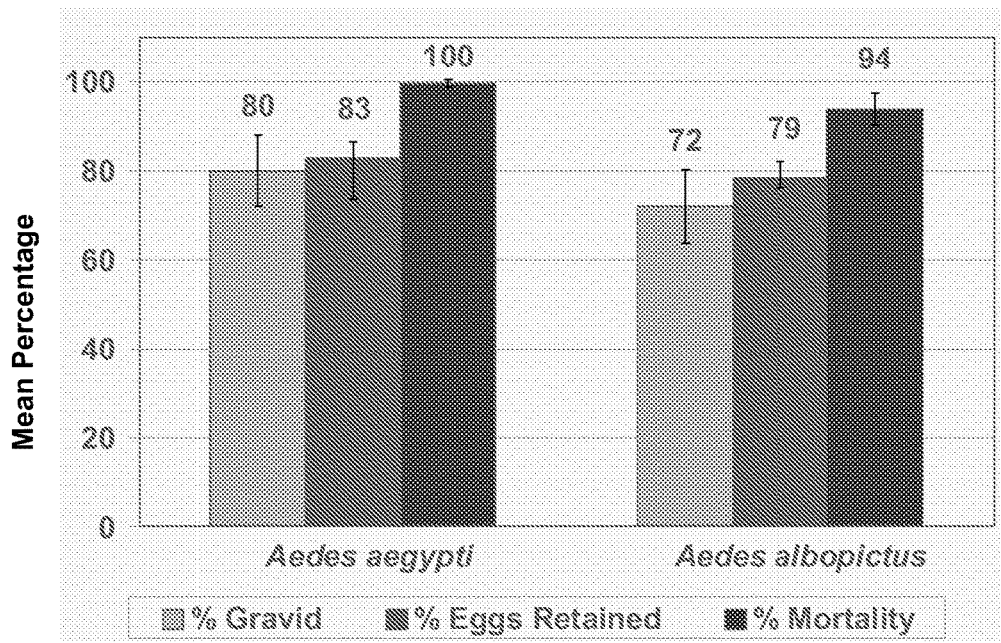
FIG. 35 is a graph of the mean percentage of mosquito eggs retained, the mean percentage of trapped mosquitoes that were gravid, and the mean percentage of mosquito mortality using a mosquito trap with common backyard containers as alternative oviposition sites.

Results of the experiment are shown in FIG. 35. As shown, the traps were more effective in killing gravid mosquitoes and diverting gravid mosquitos from laying eggs in common backyard containers as alternative oviposition sites than the alternative oviposition sites of Examples 1 and 2.

Example 4: Contribution of Fabric Versus Water for Killing Mosquitoes

Mosquito traps similar to those described in Example 1 were tested against alternative oviposition sites. Four types of trap were used according to Table 1. Each trap included a non-toxic plastic mesh sleeve supporting a cloth and a plastic container (15 cm diameter and 8 cm height) filled with well water and oviposition strip. Each plastic container also included a 2-inch by 2-inch swatch of mesh impregnated with deltamethrin at a concentration of approximately 100 mg/m$^2$. The mesh sleeve and cloth were rolled to form a cylinder of 15 cm diameter and 30.5 cm height. Some cloths were toxic. Some plastic containers included bamboo leaf infusion or white oak leaf infusion in addition to the toxic deltamethrin and well water.

TABLE 1

| Components of traps tested. | | | | |
|---|---|---|---|---|
| | Trap 1 | Trap 2 | Trap 3 | Trap 4 |
| cloth is non-toxic | x | | | |
| cloth is toxic (100 mg/m$^2$ deltamethrin) | | x | x | x |
| plastic container filled with only well water and deltamethrin swatch | x | x | | |
| plastic container filled with well water and 1X bamboo infusion and deltamethrin swatch | | | x | |
| plastic container filled with well water and 0.5X oak infusion and deltamethrin swatch | | | | x |

A lethal oviposition trap was placed in the middle of each of four walk-in cages. Each cage (4 m long by 4 m wide by 2 m tall) was constructed with a wooden frame with a translucent polypropylene net fabric and covered with white bed sheets with an outer layer of black plastic. Dual bulb fluorescent lights were placed in each corner of the walk-in cage, and crepuscular light was provided by a single incandescent bulb. Also placed in each of the four corners of the walk-in cage were four alternative oviposition sites. Each alternative oviposition site was a black can (one gallon nominal) filled with 600 mL well water. All traps and alternative oviposition sites included a strip of paper that acted as an oviposition strip. 50 gravid *Aedes aegypti* mosquitoes (blood-fed 4-5 days before) were released into each walk-in cage for 24 h. After 24 h, all mosquitoes were collected, including ones in the traps, on the floor, dead or alive. All mosquitoes were dissected, and eggs were counted. All eggs on the oviposition strips were also counted.

Figure 36:
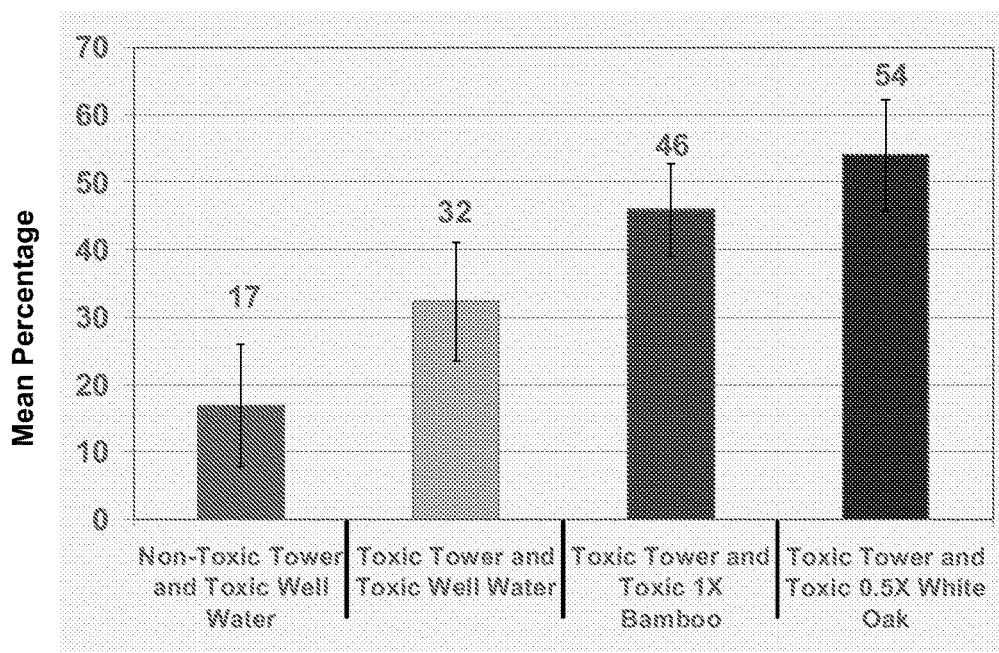
FIG. 36 is a graph of the mean percentage of *Aedes aegypti* mosquito eggs retained using a mosquito trap with or without a toxic fabric, with or without toxic water, and with or without bamboo infusion.
Figure 37:
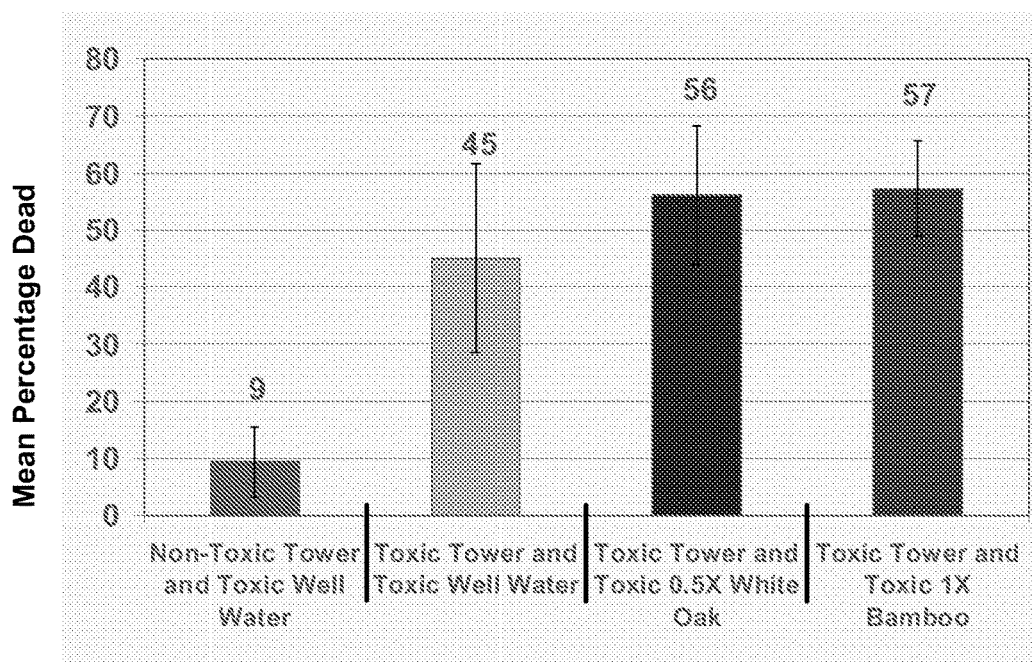
FIG. 37 is a graph of the mean percentage of dead *Aedes aegypti* mosquitoes retained that were gravid using a mosquito trap with or without a toxic fabric, with or without toxic water, and with or without bamboo infusion.
Figure 38:
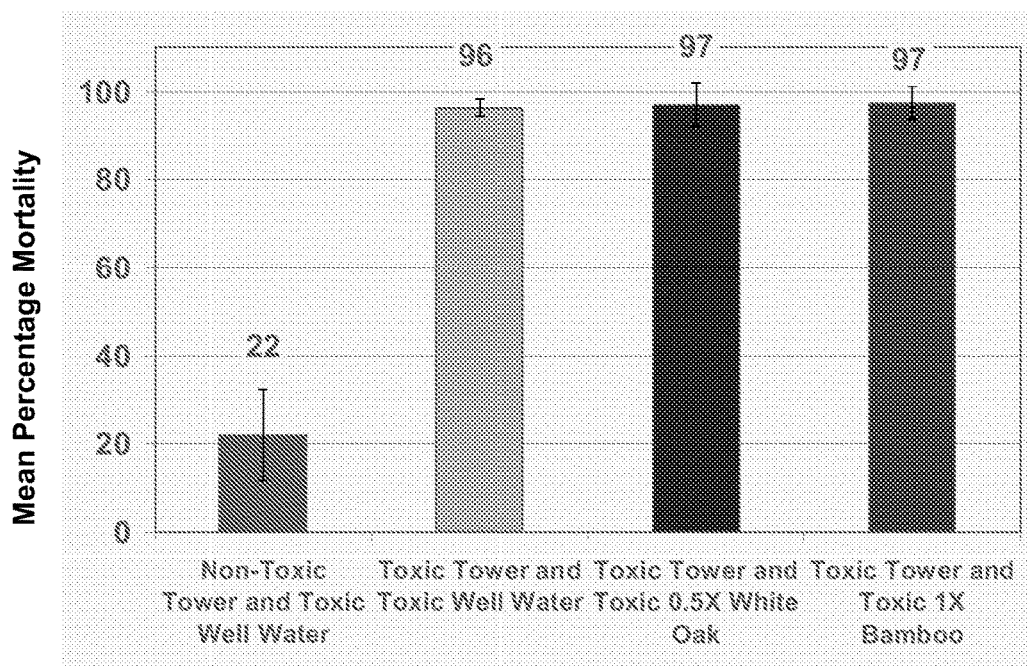
FIG. 38 is a graph of the mean percentage mortality of *Aedes aegypti* mosquito adults using a mosquito trap with or without a toxic fabric, with or without toxic water, and with or without bamboo infusion.

Results of the experiment are shown in FIG. 36, FIG. 37, and FIG. 38. As shown, the lethal oviposition traps were more effective in killing mosquitoes when they included the toxic fabric (tower). Addition of oak leaf or bamboo leaf infusion to the lethal oviposition trap attracted more females to the trap, increasing the proportion of eggs diverted from being laid in alternative oviposition containers. Addition of oak leaf or bamboo leaf infusion to the lethal oviposition trap increased the percentage of dead females that contained eggs.

Example 5: Hanging Trap

Mosquito traps similar to those described in Example 1 were tested against alternative oviposition sites. Each trap included a non-toxic plastic mesh sleeve for support of a toxic cloth. The toxic cloth was impregnated with deltamethrin at a concentration of approximately 100 mg/m$^2$. The mesh sleeve and toxic cloth were rolled to form a cylinder of 15 cm diameter and 30.5 cm height. The trap further included a plastic container (15 cm diameter and 8 cm height) filled with approximately 500 mL to 900 mL of 0.5× white oak leaf infusion in water (4.2 g senescent leaves per liter of water) or 1× bamboo leaf infusion in water (8.4 g senescent leaves per liter of water), with a 2-inch by 2-inch swatch of mesh impregnated with deltamethrin at a concentration of approximately 100 mg/m$^2$. One trap was placed in the middle of a walk-in cage. Instead of being placed on the ground as described in the previous Examples, the traps were hung above the ground. Each cage (4 m long by 4 m wide by 2 m tall) was constructed with a wooden frame covered with a translucent polypropylene net fabric and covered with white bed sheets with an outer layer of black plastic. Dual bulb fluorescent lights were placed in each corner of the walk-in cage, and crepuscular light was provided by a single incandescent bulb. Also placed in each of the four corners of each walk-in cage were four alternative oviposition sites. Each alternative oviposition site was a black can filled with 600 mL of well water. All traps and alternative oviposition sites included a strip of paper that acted as an oviposition strip. In each of 4 walk-in cages, 50 gravid *Aedes aegypti* mosquitoes (blood-fed 4 days before) were released for 24 h. After 24 h, all mosquitoes were collected, including ones in the traps, on the floor, dead or alive. All mosquitoes were dissected, and eggs were counted. All eggs on the oviposition strips were also counted. The study was carried out for three consecutive weeks.

Figure 39:
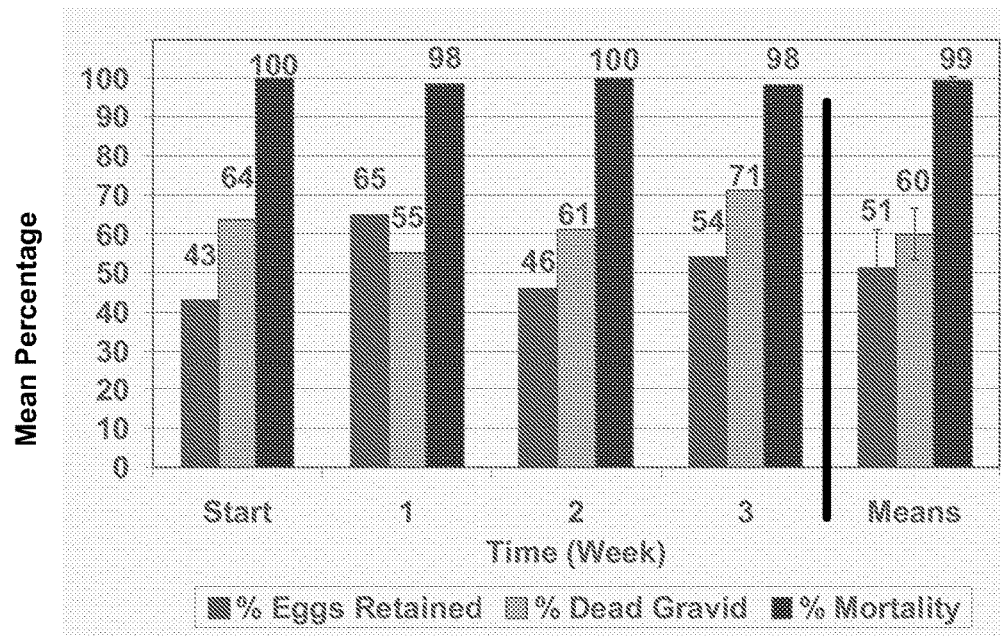
FIG. 39 is a graph of the mean percentage of mosquito eggs retained, the mean percentage of trapped, dead mosquitoes that were gravid, and the mean percentage of mosquito mortality using a hanging mosquito trap.

Results of the experiment are shown in FIG. 39. When compared to the previous Examples, the hanging traps were just as effective in killing mosquitoes as the traps placed on the ground. The hanging trap was as effective in diverting gravid females from laying eggs in alternative oviposition containers as the previous Examples.

Example 6: Mosquito Traps of Different Colors

Mosquito traps similar to those described in Example 1 were tested against alternative oviposition sites. Each trap included a non-toxic plastic mesh sleeve for support of a toxic cloth. The toxic cloth was impregnated with deltamethrin at a concentration of approximately 100 mg/m$^2$. The mesh sleeve and toxic cloth were rolled to form a cylinder or tower of 15 cm diameter and 30.5 cm height. The cylinder was green, blue, or black. The trap further included a plastic container (15 cm diameter and 8 cm height) filled with approximately 500 mL of 0.5× bamboo infusion in water, with a 2-inch by 2-inch swatch of mesh impregnated with deltamethrin at a concentration of approximately 100 mg/m$^2$. One trap was placed in the middle of each of 4 walk-in cages. Each cage (4 m long by 4 m wide by 2 m tall) was constructed with a wooden frame covered with a translucent polypropylene net fabric and covered with white bed sheets with an outer later of black plastic. Dual bulb fluorescent lights were placed in each corner of the walk-in cage, and crepuscular light was provided by a single incandescent bulb. Also placed in each of the four corners of each walk-in cage were four alternative oviposition sites. Each alternative oviposition site was a black can filled with 600 mL of well water. All traps and alternative oviposition sites included a strip of paper that acted as an oviposition strip. In each of 4 walk-in cages, 50 gravid *Aedes aegypti* mosquitoes (blood-fed 4-5 days before) were released into the walk-in cage for 24 h. After 24 h, all mosquitoes were collected, including ones in the traps, on the floor, dead or alive. All mosquitoes were dissected, and eggs were counted. All eggs on the oviposition strips were also counted.

Figure 40:
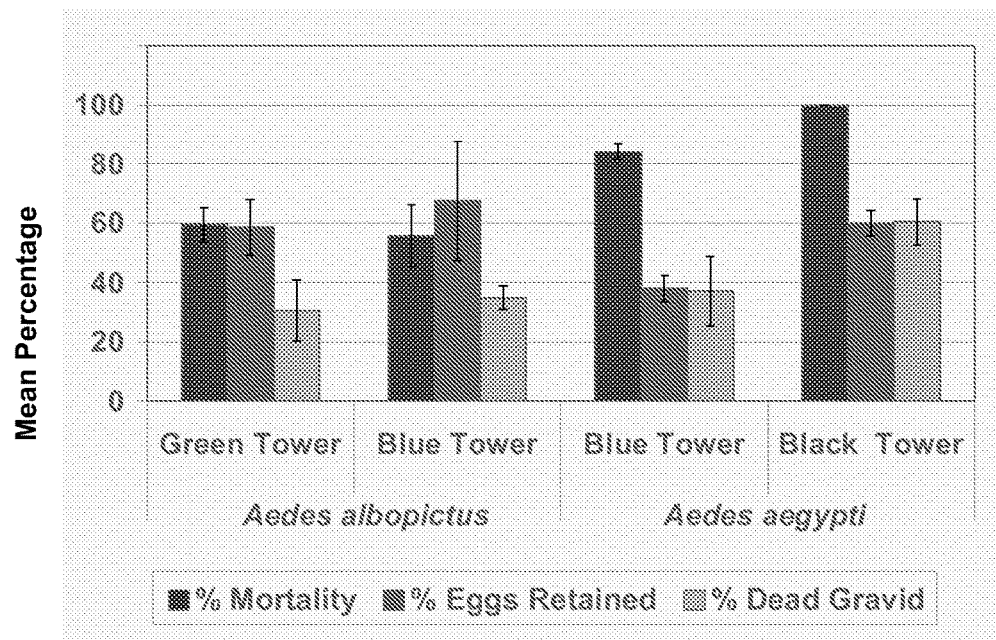
FIG. 40 is a graph of the mean percentage of mosquito eggs retained, the mean percentage of trapped, dead mosquitoes that were gravid, and the mean percentage of mosquito mortality using mosquito traps of different colors.

Results of the experiment are shown in FIG. 40. As shown, black traps were more effective in killing mosquitoes.

Example 7: Evaluation of a Cover with Sticky Traps

Mosquito traps similar to those described in Example 1 were tested against alternative oviposition sites. Each trap included a non-toxic plastic mesh sleeve for support of a non-toxic cloth. The mesh sleeve and non-toxic cloth were rolled to form a cylinder or tower of 15 cm diameter and 30.5 cm height. The non-toxic cloth was made sticky with glue. The trap further included a plastic container (15 cm diameter and 8 cm height) filled with approximately 600 mL of well water or 600 mL of 0.5× white oak leaf infusion in water (4.2 g senescent leaves per liter of water). Some traps included a cover positioned a few inches above the top of the cylinder. The traps were placed in the middle of a walk-in cage. Each cage (4 m long by 4 m wide by 2 m tall) was constructed with a wooden frame covered with a translucent polypropylene net fabric and covered with white bed sheets with an outer layer of black plastic. Dual bulb fluorescent lights were placed in each corner of the walk-in cage, and crepuscular light was provided by a single incandescent bulb. Also placed in each of the four corners of each walk-in cage were four alternative oviposition sites. Each alternative oviposition site was a black can filled with 600 mL of well water. All traps and alternative oviposition sites included a strip of paper that acted as an oviposition strip. For 4 times, 50 gravid *Aedes aegypti* mosquitoes (blood-fed 5 days before) were released into each walk-in cage for 24 h. After 24 h, all mosquitoes were collected, including ones in the traps, on the floor, dead or alive. All mosquitoes were dissected, and eggs were counted. All eggs on the oviposition strips were also counted.

Figure 41:
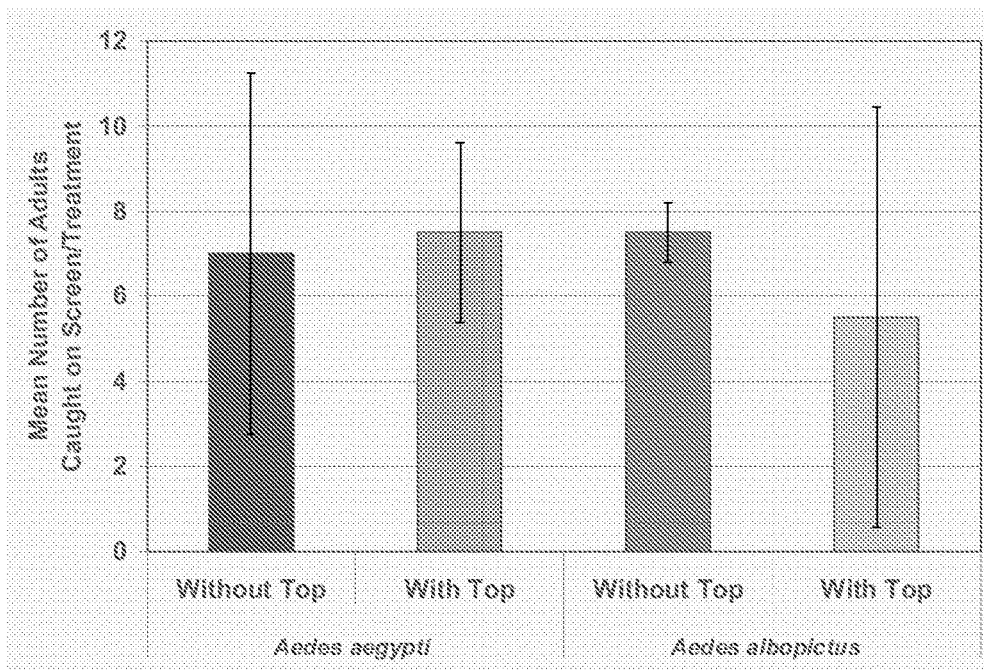
FIG. 41 is a graph of the mean number of mosquito adults trapped on a sticky screen for mosquito traps with and without a top and with only well water and no attractant.
Figure 42:
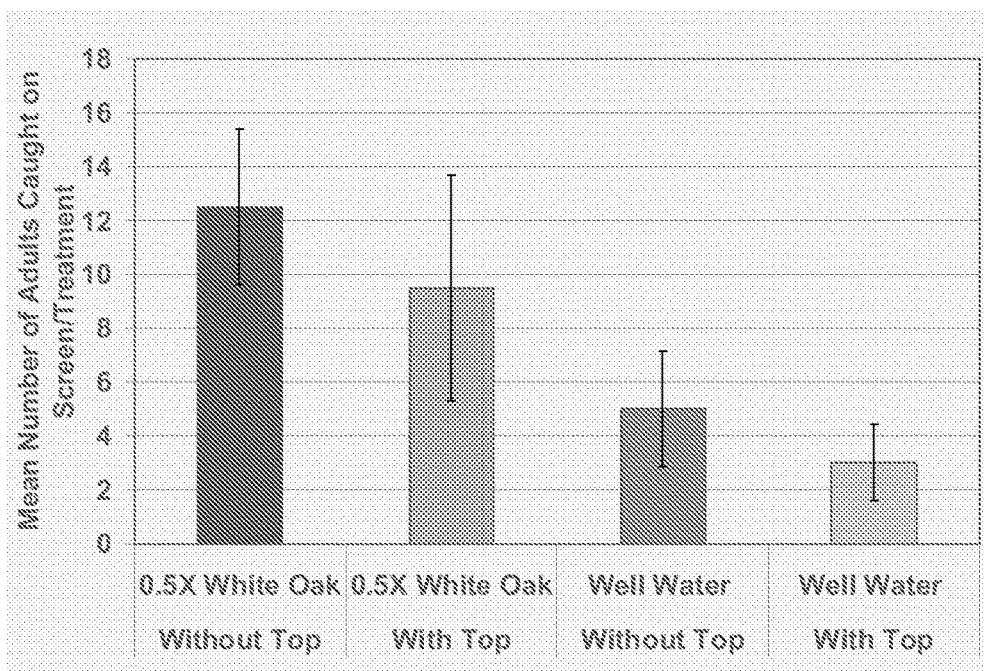
FIG. 42 is a graph of the mean number of *Aedes aegypti* mosquito adults trapped on a sticky screen for mosquito traps with and without a top and with or without leaf infusion in the water.
Figure 43:
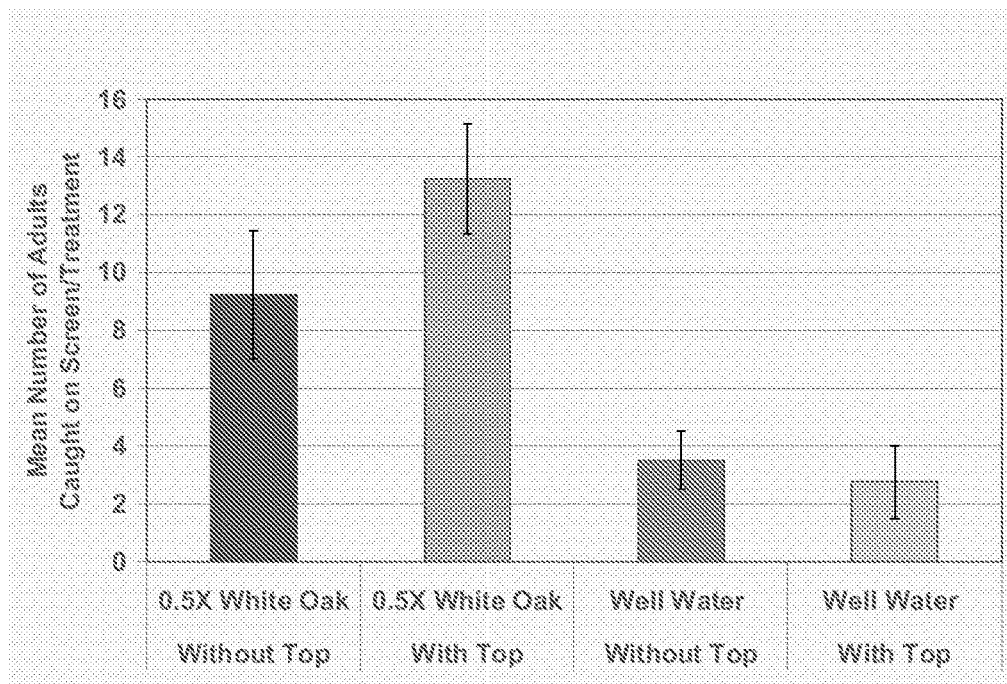
FIG. 43 is a graph of the mean number of *Aedes albopictus* mosquito adults trapped on a sticky screen for mosquito traps with and without a top and with or without leaf infusion in the water.

Results of the experiment are shown in FIG. 41, FIG. 42, and FIG. 43. As shown, the trap cover did not impede killing of mosquitoes. The trap cover did not affect the trap whether or not attractant was present in the plastic container.

Example 8: Evaluation of Oviposition Traps in a Field Trial

Lethal oviposition traps 700 (FIGS. 27-31) were tested in a field trial for 9 weeks. Lethal oviposition traps were placed in residential yards with an average of 2.25 to 2.59 traps per house per block in the 81-house 6-block treatment area. Sites with lethal oviposition traps were compared to a site without traps with 4 blocks and 87 houses. Additionally, mosquito activity and physiological condition was monitored with adult aspirator collections twice weekly. Ovarian dissections were performed on all female mosquitoes to determine the portion that were parous, i.e. those that had previously bloodfed. Adult collections were made at every third house on a weekly basis so that no house was sampled more than once every three weeks. In comparing the parous mosquitoes in the two sites, all gravid and bloodfed mosquitoes were lumped into the parous category. The results showed that the site with lethal oviposition traps had less parous mosquitoes than the control site (a 30% reduction for *Aedes albopictus* and a 40% reduction for *Aedes aegypti* as compared to the control).

Example 9: Additional Experimentation

Response to Striped Containers

Response of gravid *Ae. aegypti* to contrasting colors on dark containers was evaluated in walk-in cage bioassays. One-gallon tin cans, painted black on the outer surface, were modified by adding diagonal, horizontal, and vertical red stripes using electrical tape. Tops were suspended above each can with nails fastened to the inside of each can with glue. Response to the stripe patterns was evaluated by placing one striped can or a solid black can in each corner of the bioassay cage or 1 m apart in the middle of the walk-in cage. The experiments were repeated 4 times, rotating the positions of the cans each time. Cans were filled with 500 mL well water, and black sticky panels were inserted into each can. For each trial, 50 gravid NOLA strain gravid *Ae. aegypti* mosquitoes were released into each walk-in cage. Results showed that there was no difference between the solid black can and any of the striped cans whether they were placed in close proximity or in the corners of the cage.

Response to Size and Color of Trap Cover

Effect of color and size of the cover of the trap was investigated using 3 different sized covers. Two-choice, walk-in cage, sticky panel bioassays were used to compare the performance of a black, one-gallon can with a black cover to a black can with a red cover. Each of the three red covers was a different size. Each of the three cover sizes were evaluated four times. Well water (500 mL) was added to each can, which also contained a sticky panel. 50 gravid New Orleans, La. (NOLA) strain *Aedes aegypti* mosquitoes were released into each walk-in cage. Black cans fitted with black tops out performed the cans with the two smallest sized red covers, but differences in numbers of females trapped were small. Traps fitted with the largest red cover caught 50% of the gravid females, suggesting that cover size affects mosquito response. The red color of trap covers did not appear to increase the number of gravid females caught on sticky panel traps contained in black cans.

Effects of Light Level on Response to Red Can and Black Can

Effects of light level on the response of gravid NOLA strain *Ae. aegypti* to a red and black one gallon tin cans fitted with covers were evaluated in walk-in bioassay cages. Red cans were constructed by wrapping red velour paper around black cans. One can of each color was placed in diagonal corners of a bioassay cage. One corner was dimly lit while the opposing corner had 10× brighter light levels. Each trial consisted of rotating the cans through all four corners of the cage. Four trials were completed, resulting in the completion of 16 replicate evaluations. The cans were filled with 500 mL well water and each was fitted with a sticky screen. Fifty gravid NOLA strain *Ae. aegypti* were released into three walk-in cages on the same date. After a 24-h exposure period, the numbers of females caught on each sticky screen were counted and converted to percentages. Overall, cans in well lit corners caught a higher percentage of mosquitoes than cans in dimly lit corners regardless of can color.

Capture Efficiency of Sticky Screen vs. Sticky Panel

Experiments were conducted to evaluate the relative capture efficiency of sticky screens and sticky panels. Two black one gallon tin cans were placed 1 m apart in walk-in bioassay cages. Well water (500 mL) was added to each container. In one can, a sticky screen was inserted, and the opposing can was lined with a black sticky panel. Gravid NOLA strain *Ae. aegypti* (n=50) were released. Experiments were repeated three times with the position of the cans reversed. Traps lined with sticky panels caught a mean of 95.3% (±SD=3.9%) and sticky screen traps caught an average of 4.7% (±3.9%).

Evaluation of Trap 700 (FIGS. 27-31) with Insecticidal Netting

Netting impregnated with deltamethrin or alpha-cypermethrin insecticides was evaluated. The trap was lined with the netting, the trap was filled with well water (500 mL), it was placed in the middle of the walk-in cage, and 50 gravid NOLA strain *Ae. aegypti* were released. Both treatments were replicated four times. Both nets performed well, with the deltamethrin netting killing a slightly higher mean percentage of gravid mosquitoes. Combining a sticky screen and deltamethrin netting proved to be optimal since there were no live free mosquitoes in the walk-in cages after the 24-h bioassay period.

Evaluation of Trap 700 (FIGS. 27-31) Containing Insecticidal Fabric or Netting Against Iquitos Strain *Aedes aegypti*

Trap 700 (FIGS. 27-31) fitted with DURANET, a net containing alpha-cypermethrin sleeve, or deltamethrin impregnated fabric and netting were evaluated against Iquitos strain *Ae. aegypti* in walk-in cage trials. A trap filled with 450 mL of well water was placed in the center of each walk-in cage. Each trap was lined with an insecticidal net. Gravid females (n=50) were released into walk-in cages, and after 24 h all mosquitoes (dead and living) were collected and counted. The mean percentage mortality of mosquitoes was 86% for DURANET, 81% for the alpha-cypermethrin sleeve, and 90% for the deltamethrin impregnated fabric and netting. The black deltamethrin impregnated fabric killed more mosquitoes than the DURANET or the alpha-cypermethrin netting.

Control Mortality in Walk-in Bioassay Cages

To understand the "true" mortality caused by the trap 700 (FIGS. 27-31), the level of mortality resulting from environmental conditions in the walk-in bioassay cages was established. The traps were cleaned thoroughly. Each trap was filled with 500 mL of Raleigh city tap water, and 100 mg of lyophilized bacterial beads were added. A trap was placed in the center of four different walk-in cages. Most of the 50 gravid NOLA strain *Ae. aegypti* released were retrieved alive at the end of the 24-h exposure period, indicating that environmental conditions caused minimal mortality of gravid mosquitoes. Temperature and relative humidity were not uniform between bioassay rooms despite efforts to stabilize these variables.

Evaluation of Deltamethrin Netting and Plastic Container and DURANET Netting

Toxic netting was evaluated using a visually attractive cylinder of black, non-toxic fabric. A lethal oviposition trap was assembled using heavy plastic mesh as a support for non toxic black fabric. Deltamethrin impregnated netting was placed on the inside of the fabric cylinder. The cylindrical trap was then inserted over a clear plastic container which was filled with 500 mL of well water. A trap was placed in the center of a walk-in cage, and 50 gravid NOLA *Aedes aegypti* were released into the cage. After 24 h the experiment was terminated, and live and dead mosquitoes were collected and counted.

In similar trials, DURANET netting was placed inside of the trap. The lethal oviposition trap was placed in the center of walk-in cages, and 30 or 50 gravid NOLA strain *Ae. aegypti* were released. High mortality was achieved with both kinds of traps, i.e., for both DURANET and deltamethrin netting.

Efficacy of a Black Deltamethrin Fabric Trap Against Gravid and Host Seeking *Culex Quinquefasciatus*

A trap (FIG. 32) was evaluated against gravid and host-seeking *Culex quinquefasciatus* in walk-in bioassay cages. A deltamethrin fabric cylinder was placed over a plastic container filled with 500 mL of well water. The trap was placed in the center of each of three walk-in cages, and 50 mosquitoes were released. After 24 h, live and dead mosquitoes were collected and counted. In the first trial, mortality of gravid females was unexplainably low. However, in the second trial high levels of mortality were observed. Mortality of host-seeking females was moderately high, indicating that mosquitoes were using the trap as a resting site.

Various features of the invention are set forth in the following claims.

What is claimed is:

1. A mosquito trap comprising:
   a container having an open end and an opening through an outer wall of the container beneath the open end, wherein the opening is configured to limit an amount of liquid that can be held by the container;
   a composition positioned in the container, the composition comprising at least one active agent;
   an enclosure protruding above the open end of the container, the enclosure including an opening through which a mosquito can access an interior of the enclosure and the open end of the container;
   a net supported within the enclosure above the open end of the container, the net being impregnated with a toxic agent, wherein a bottom end of the net is open; and
   a hoop coupled to a top edge of the net,
   wherein the hoop and the net are suspended within the interior of the enclosure.

2. The mosquito trap of claim 1, wherein the enclosure is made from one of a rigid, molded material and a biodegradable material.

3. The mosquito trap of claim 1, wherein the container is made from one of a rigid, molded material and a biodegradable material.

4. The mosquito trap of claim 1, wherein the enclosure opening is defined along a top edge of the enclosure.

5. The mosquito trap of claim 4, further comprising a cover at least partially positioned above the enclosure opening.

6. The mosquito trap of claim 5, wherein the cover is pivotably coupled to the enclosure.

7. The mosquito trap of claim 5, wherein the cover is movable between a first position in which the enclosure opening is accessible, and a second position in which the enclosure opening is closed.

8. The mosquito trap of claim 4, wherein the opening is a first opening, and wherein the enclosure includes a second opening positioned below the top edge of the enclosure through which the interior of the enclosure and the open end of the container are accessible.

9. The mosquito trap of claim 1, wherein the container and the enclosure are integrally formed as a single piece, and wherein a top edge of the container defining the open end is conjoined with a bottom edge of the enclosure.

10. The mosquito trap of claim 1, wherein a solution including the at least one active agent is created in the container upon adding a liquid solvent to the composition in the container, and wherein at least a portion of the container is translucent to facilitate viewing the active agent solution.

11. The mosquito trap of claim 1, wherein the enclosure includes a substantially conical shape.

12. The mosquito trap of claim 1, further comprising a base supporting the container relative to a horizontal support surface.

13. The mosquito trap of claim 12, wherein the base includes one of a recess and an aperture in which the container is at least partially positioned.

14. The mosquito trap of claim 12, wherein the enclosure is supported by the base relative to the horizontal support surface.

15. The mosquito trap of claim 1, further comprising
   a base supporting the container relative to a horizontal support surface, and
   at least one anchor configured to secure the base to the horizontal support surface.

16. The mosquito trap of claim 15, wherein the at least one anchor includes a plurality of stakes.

17. The mosquito trap of claim 1, wherein the composition positioned in the container is solid and liquid-soluble.

18. The mosquito trap of claim 1, wherein the at least one active agent in the composition is a toxic agent.

19. The mosquito trap of claim 18, wherein the toxic agent is an insecticide.

20. The mosquito trap of claim 1, wherein the at least one active agent in the composition is an attractant.

21. The mosquito trap of claim 20, wherein the attractant is a mosquito attractant.

22. The mosquito trap of claim 1, wherein the top edge of the net includes a loop, and wherein the hoop is received within the loop to suspend the net from the hoop.

23. The mosquito trap of claim 22, wherein the loop includes first and second ends between which a length of the loop is defined, and wherein the hoop includes a split to permit the hoop to be inserted through one of the first and second ends of the loop.

24. The mosquito trap of claim 1, wherein the enclosure includes at least one support from which the hoop and the net are suspended.

25. The mosquito trap of claim 24, wherein the at least one support includes a plurality of radially inwardly extending ribs upon which the hoop is supported.

* * * * *

UNITED STATES PATENT AND TRADEMARK OFFICE
CERTIFICATE OF CORRECTION

PATENT NO. : 10,178,860 B2
APPLICATION NO. : 13/575242
DATED : January 15, 2019
INVENTOR(S) : Dawn Wesson et al.

It is certified that error appears in the above-identified patent and that said Letters Patent is hereby corrected as shown below:

In the Specification

Add the following paragraph at Column 1, Line 12:
--STATEMENT REGARDING FEDERALLY SPONSORED RESEARCH OR DEVELOPMENT
This invention was made with government support under grant number AI058303 awarded by the National Institutes of Health. The government has certain rights in the invention.--

Signed and Sealed this
Twentieth Day of February, 2024

Katherine Kelly Vidal
*Director of the United States Patent and Trademark Office*